US011412566B2

(12) United States Patent
Park et al.

(10) Patent No.: US 11,412,566 B2
(45) Date of Patent: Aug. 9, 2022

(54) UPLINK DOWNLINK SESSION DUPLICATION

(71) Applicant: Ofinno, LLC, Reston, VA (US)

(72) Inventors: Kyungmin Park, Vienna, VA (US); Esmael Hejazi Dinan, McLean, VA (US); Weihua Qiao, Herndon, VA (US); Jinsook Ryu, Oakton, VA (US); Peyman Talebi Fard, Sterling, VA (US)

(73) Assignee: Ofinno, LLC, Reston, VA (US)

( * ) Notice: Subject to any disclaimer, the term of this patent is extended or adjusted under 35 U.S.C. 154(b) by 121 days.

(21) Appl. No.: 16/988,748

(22) Filed: Aug. 10, 2020

(65) Prior Publication Data

US 2021/0100061 A1    Apr. 1, 2021

Related U.S. Application Data

(60) Provisional application No. 62/884,888, filed on Aug. 9, 2019.

(51) Int. Cl.
*H04W 76/25* (2018.01)
*H04W 28/02* (2009.01)
*H04W 76/27* (2018.01)

(52) U.S. Cl.
CPC ....... *H04W 76/25* (2018.02); *H04W 28/0263* (2013.01); *H04W 28/0268* (2013.01); *H04W 76/27* (2018.02)

(58) Field of Classification Search
CPC . H04W 76/25; H04W 76/27; H04W 28/0263; H04W 28/0268; H04W 29/08576; H04W 76/10; H04W 76/15
See application file for complete search history.

(56) References Cited

U.S. PATENT DOCUMENTS

2018/0367288 A1*  12/2018  Vrzic ................ H04W 36/22
2019/0082363 A1*  3/2019   Park ................. H04W 76/19
(Continued)

OTHER PUBLICATIONS

3GPP TS 23.501 V16.1.0 (Jun. 2019); Technical Specification; 3rd Generation Partnership Project; Technical Specification Group Services and System Aspects; System Architecture for the 5G System; Stage 2; (Release 16).
(Continued)

*Primary Examiner* — Mewale A Ambaye
(74) *Attorney, Agent, or Firm* — Trent W. Merrell; Kavon Nasabzadeh; Sachin Kandhari

(57) ABSTRACT

A wireless device receives, from a first base station, at least one radio resource control configuration message that includes, at least configuration parameters of: first bearer(s) of a first session and second bearer(s) of a second session; and non-access stratum information indicating that the second session is for: applying session duplication of downlink packets of the first session; and not applying session duplication of uplink packets of the first session. The uplink packets and the downlink packets are communicated via the first bearer(s) of the first session. Based on the non-access stratum information: the session duplication for transmission of packets via the at least one second bearer of the second session is not applied; and duplication of the downlink packets of the first session with the session duplication are received via the at least one second bearer of the second session.

20 Claims, 30 Drawing Sheets

(56) References Cited

U.S. PATENT DOCUMENTS

| | | | |
|---|---|---|---|
| 2019/0104562 A1* | 4/2019 | Tsai | H04W 28/065 |
| 2019/0239112 A1* | 8/2019 | Rao | H04W 28/06 |
| 2020/0014493 A1* | 1/2020 | Shao | H04W 72/042 |
| 2020/0045738 A1* | 2/2020 | Oh | H04W 72/1263 |
| 2020/0092934 A1* | 3/2020 | Dou | H04W 76/12 |
| 2020/0112879 A1* | 4/2020 | Shimoda | H04W 16/32 |
| 2021/0091901 A1* | 3/2021 | Sun | H04L 5/0094 |

OTHER PUBLICATIONS

3GPP TS 23.502 V16.1.1 (Jun. 2019); Technical Specification; 3rd Generation Partnership Project; Technical Specification Group Services and System Aspects; Procedures for the 5G System; Stage 2; (Release 16).

"3GPP TR 23.794 V1.0.0 (Mar. 2019); Technical Report; 3rd Generation Partnership Project; Technical Specification Group Services and System Aspects; Study on Enhanced IMS to 5GC Integration (Release 16)."

3GPP TS 24.501 V16.1.0 (Jun. 2019); Technical Specification; 3rd Generation Partnership Project; Technical Specification Group Core Network and Terminals; Non-Access-Stratum (NAS) protocol for 5G System (5GS); Stage 3 (Release 16).

3GPP TR 24.890 V15.1.0 (Mar. 2018); Technical Report; 3rd Generation Partnership Project; Technical Specification Group Core Network and Terminals; 5G System—Phase 1; CT WG1 Aspects; (Release 15).

3GPP TS 38.300 V15.6.0 (Jun. 2019); Technical Specification; 3rd Generation Partnership Project; Technical Specification Group Radio Access Network; NR; NR and NG-RAN Overall Description; Stage 2; (Release 15).

3GPP TS 38.331 V15.6.0 (Jun. 2019); Technical Specification; 3rd Generation Partnership Project; Technical Specification Group Radio Access Network; NR; Radio Resource Control (RRC) protocol specification; (Release 15).

3GPP TS 38.413 V15.4.0 (Jul. 2019); Technical Specification; 3rd Generation Partnership Project; Technical Specification Group Radio Access Network; NG-RAN; NG Application Protocol (NGAP); (Release 15).

3GPP TS 38.423 V15.4.0 (Jul. 2019); Technical Specification; 3rd Generation Partnership Project; Technical Specification Group Radio Access Network; NG-RAN; Xn application protocol (XnAP); (Release 15).

"S2-1905668_Rel-15_TS 23.502_SMF actions on rejection during handover; 3GPP TSG-SA WG2 Meeting #133; 8 May 13-17, 2019, Reno, NV, USA(Rev of S2-190xxxx); CR-Form-v112; ; Change Request."

"S2-1907075-redundancy_failure_23501.pa3; 3GPP TSG-SA WG2 Meeting #134; 5 Sapporo, Japan, Jun. 24-28, 2019(revision of S2-19xxxxx); CR-Form-v11.4; ; Change Request."

"S2-1907076-redundancy_failure_23502.pa1; 3GPP TSG-SA WG2 Meeting #134; 6 Sapporo, Japan, Jun. 24-28, 2019(revision of S2-19xxxxx); CR-Form-v11.4; ; Change Request."

"S2-1907077-draft-LS-redundancy-DC; 3GPP TSG-SA WG2 Meeting #134TD ; 7 Sapporo, Japan, Jun. 24-28, 2019.; ; Title:[Draft] Reply LS on Solution 1 of 5G_URLLC; Response to:LS (R3-193271) on Solution 1 of 5G_URLLC; Release:Rel-16."

"S2-1907078-reorder_redundancy_clarification_23501.pa3; 3GPP TSG-SA WG2 Meeting #134; 8 Sapporo, Japan, Jun. 24-28, 2019(revision of S2-19xxxxx); CR-Form-v11.4; ; Change Request."

"S2-1907160 Clarifications on URLLC support—23.501; 3GPP TSG-SA WG2 Meeting #134 ; 0 Jun. 24-28, 2019, Sapporo, Japan; CR-Form-v11.2; ; Change Request."

"S2-1907281_URLLC_CR1547; 3GPP TSG-SA WG2 Meeting #134; 1 Jun. 24-28, 2019, Sapporo, Japan; CR-Form-v11.2; ; Change Request."

"S2-1907689; 3GPP TSG-SA2 Meeting #134; 9 Sapporo, Japan, Jun. 24, 2019-Jun. 28, 2019 (revision of S2-19xxxxx) ; ; Source:LG Electronics; Title:Discussion on RSN allocation between two SMFs; Document for: Discussion. "

"S2-1907691; 3GPP TSG-SA2 Meeting #134; 1 Sapporo, Japan, Jun. 24, 2019-Jun. 28, 2019; CR-Form-v11.4; ; Change Request."

"S2-1907692; 3GPP TSG-SA2 Meeting #134; 2 Sapporo, Japan, Jun. 24, 2019-Jun. 28, 2019; CR-Form-v11.4; ; Change Request."

"S2-1908296_7075-redundancy_failure_23501.pa6; 3GPP TSG-SA WG2 Meeting #134; 6 Sapporo, Japan, Jun. 24-28, 2019(revision of S2-1907075); CR-Form-v11.4; ; Change Request."

"S2-1908297_7076-redundancy_failure_23502.pa3; 3GPP TSG-SA WG2 Meeting #134; 7 Sapporo, Japan, Jun. 24-28, 2019(revision of S2-1907076); CR-Form-v11.4; ; Change Request."

"S2-1908298_7077-draft-LS-redundancy-DC_r3; 3GPP TSG-SA WG2 Meeting #134TD ; 8 Sapporo, Japan, Jun. 24-28, 2019.; ; Title:[Draft] Reply LS on Solution 1 of 5G_URLLC; Response to:LS (R3-193271) on Solution 1 of 5G_URLLC; Release:Rel-16."

"S2-1908352_7078-reorder_redundancy_clarification_23501.pa4; 3GPP TSG-SA WG2 Meeting #134; 2 Sapporo, Japan, Jun. 24-28, 2019(revision of S2-1907078); CR-Form-v11.4; ; Change Request."

"S2-1908353_was 7282; 3GPP TSG-SA WG2 Meeting #134; 3 Jun. 24-28, 2019, Sapporo, Japanrevision of S2-197282; CR-Form-v11.2; ; Change Request."

"S2-1908450_8297_7076-redundancy_failure_23502.pa4; 3GPP TSG-SA WG2 Meeting #134; 0 Sapporo, Japan, Jun. 24-28, 2019(revision of S2-1907076); CR-Form-v11.4; ; Change Request."

"S2-1908452_8298_7077-draft-LS-redundancy-DC_r5; 3GPP TSG-SA WG2 Meeting #134TD ; 2 Sapporo, Japan, Jun. 24-28, 2019.; ; Title:[Draft] Reply LS on Solution 1 of 5G_URLLC; Response to:LS (R3-193271) on Solution 1 of 5G_URLLC; Release:Rel-16."

"S5-186290 New SID on Charging Aspects of Network Slicing in 5G Phase 2; 3GPP TSG SA WG5 (Telecom Management) Meeting #121; Kochi,India, Oct. 8-12, 2018 (revision of S5-186111); ; Source:Huawei Technology ; Title:New SID on Charging Aspects of Network Slicing; Document for:Approval."

3GPP TR 32.845 V0.12.0 (20189-1101); Technical Report; 3rd Generation Partnership Project; Technical Specification Group Services and System Aspects; Charging management; Study on Charging Aspects of Network Slicing;; (Release 16).

"WID-approved S2-1906833_e-mail_rev3_S2-1906718_New Work Item 5GIS; SA WG2 Meeting #133S2-1906833 May 13-May 17, 2019, Reno, USA(e-mail revision 3 of S2-1906718); ; Source:Tencent, China Telecom, China Mobile,China Unicom, OPPO, ZTE, Samsung, Xiaomi, Broadcom, vivo, AT&T, KT, Verizon UK LTD, Huawei, Hisilicon; Title:New Work Item on 5G System Enhancement for Advanced Interactive Services; Document for:Approval."

* cited by examiner

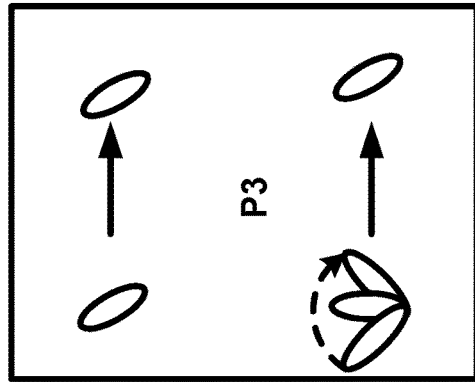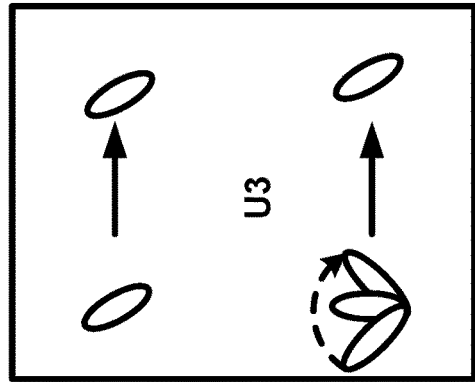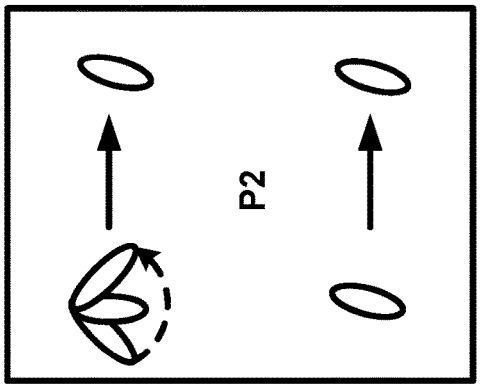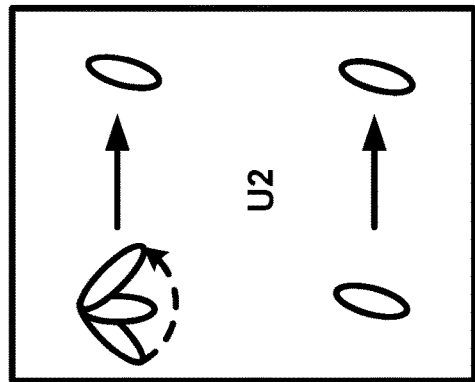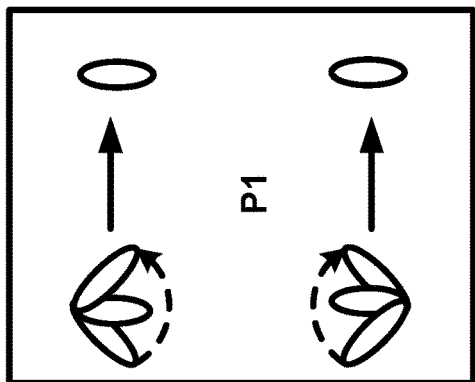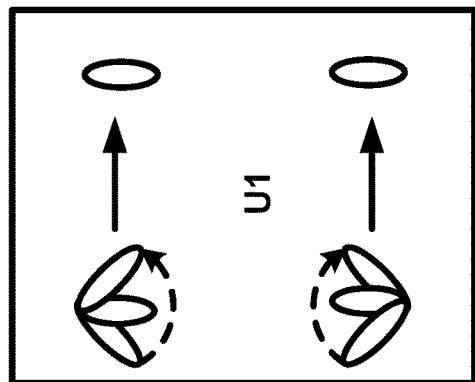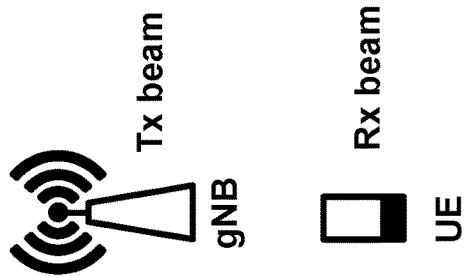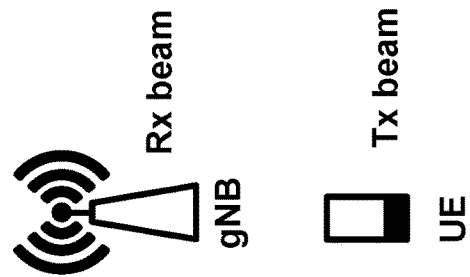
FIG. 12A
FIG. 12B

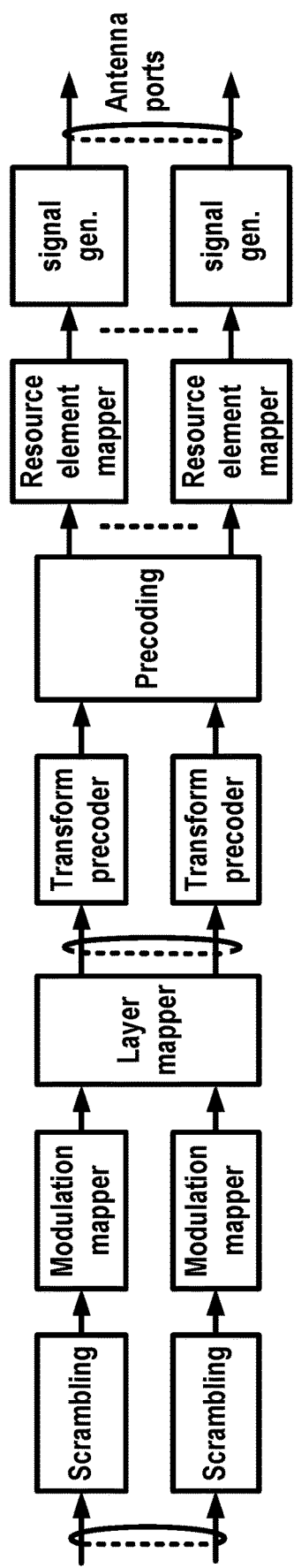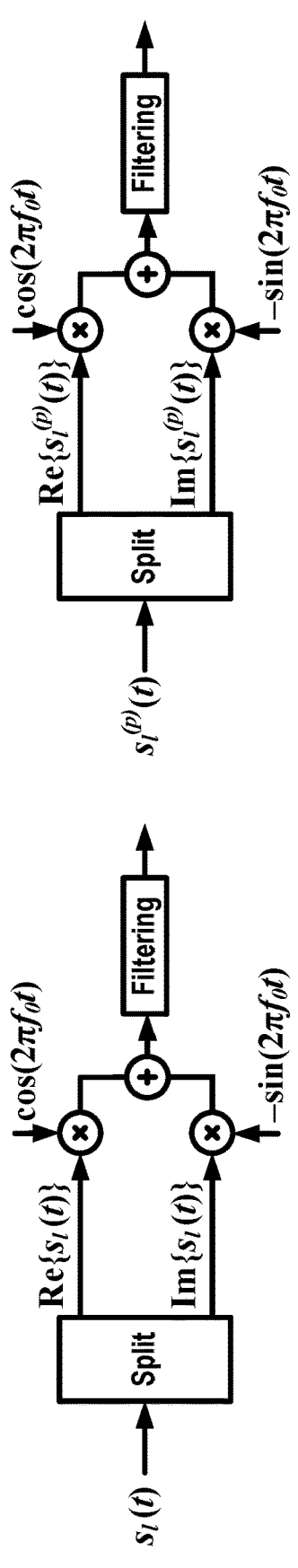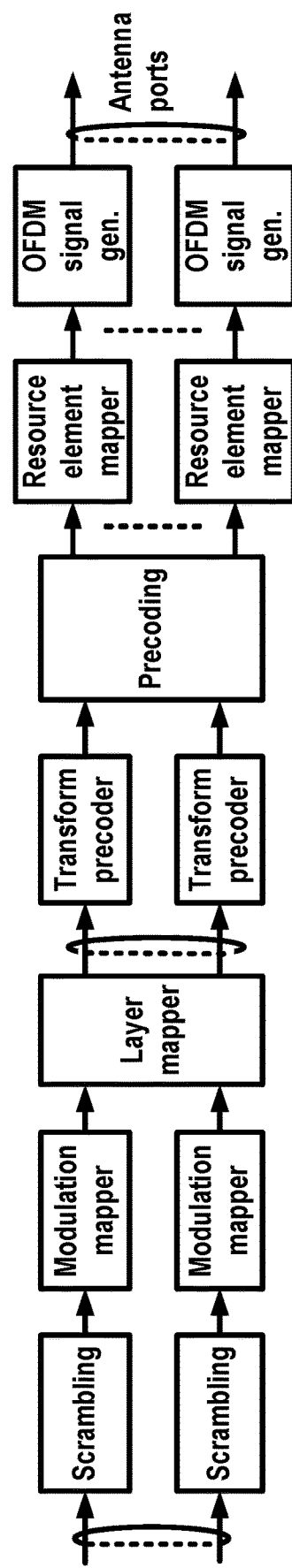
FIG. 16A  FIG. 16B  FIG. 16C  FIG. 16D ns bodiment of the present disclosure.

UPLINK DOWNLINK SESSION DUPLICATION

CROSS-REFERENCE TO RELATED APPLICATIONS

This application claims the benefit of U.S. Provisional Application No. 62/884,888, filed Aug. 9, 2019, which is hereby incorporated by reference in its entirety.

BRIEF DESCRIPTION OF THE DRAWINGS

Examples of several of the various embodiments of the present disclosure are described herein with reference to the drawings.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

DETAILED DESCRIPTION

Figure 1A:
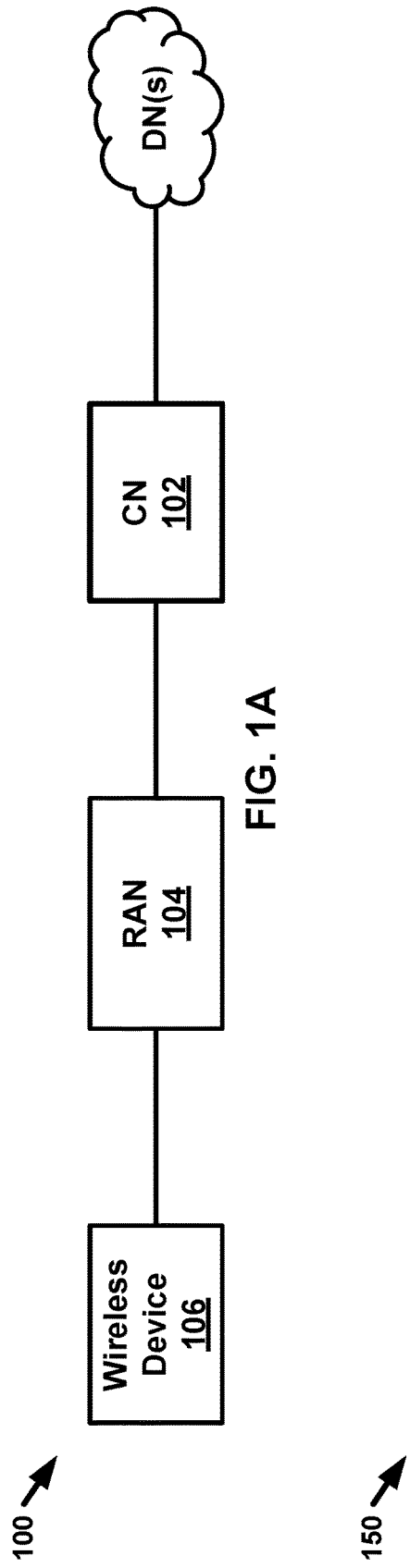
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
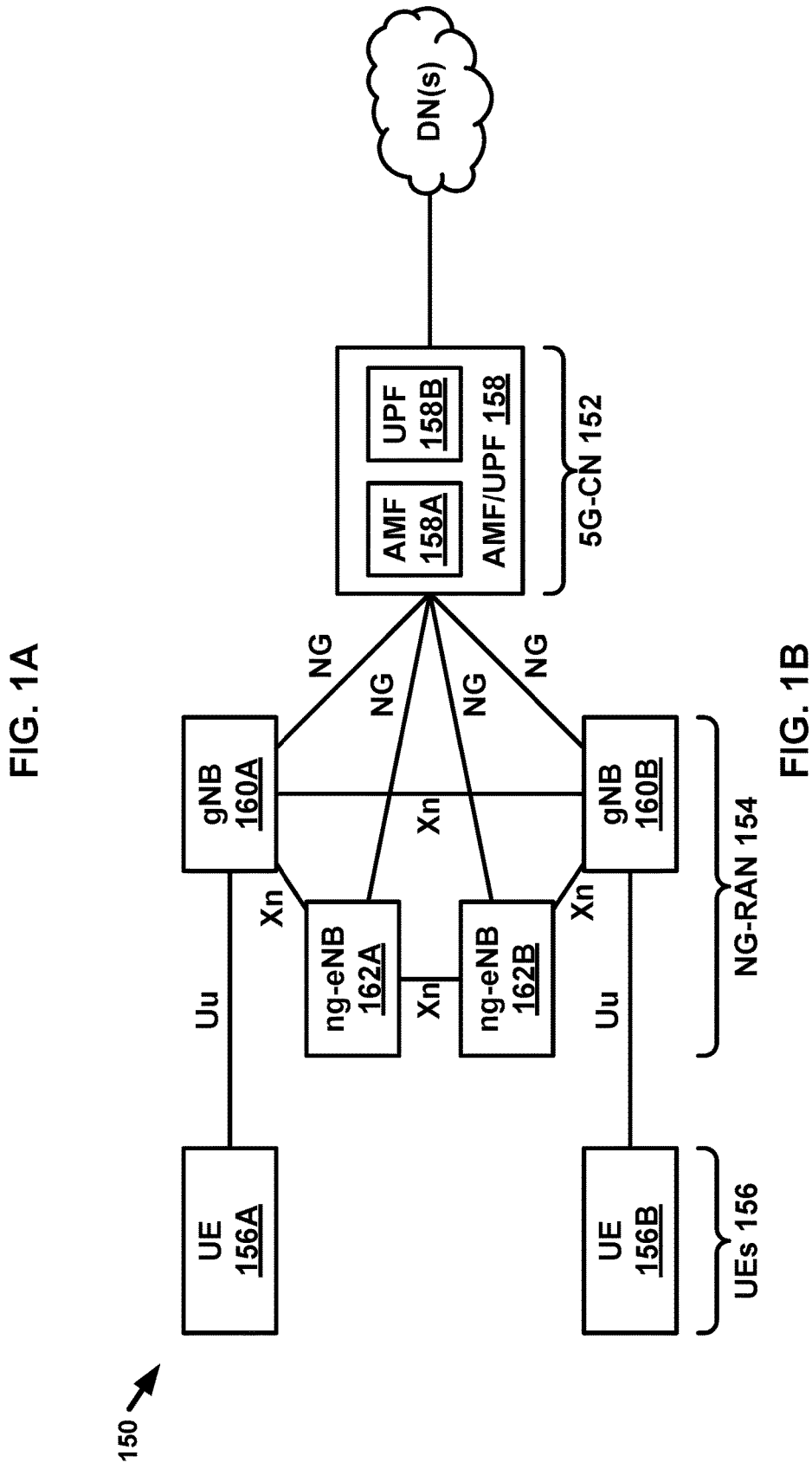

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
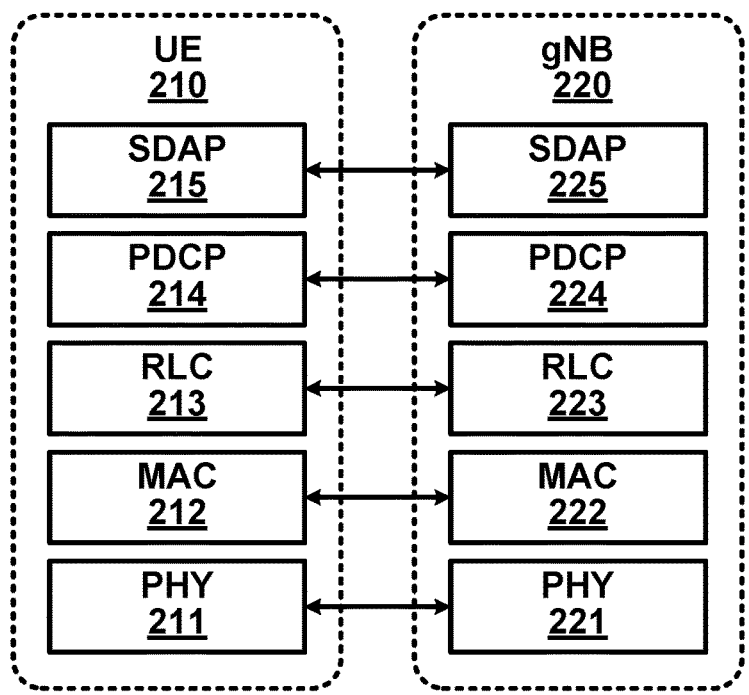
FIG. 2A and FIG. 2B respectively illustrate a New Radio (NR) user plane and control plane protocol stack.
Figure 2B:
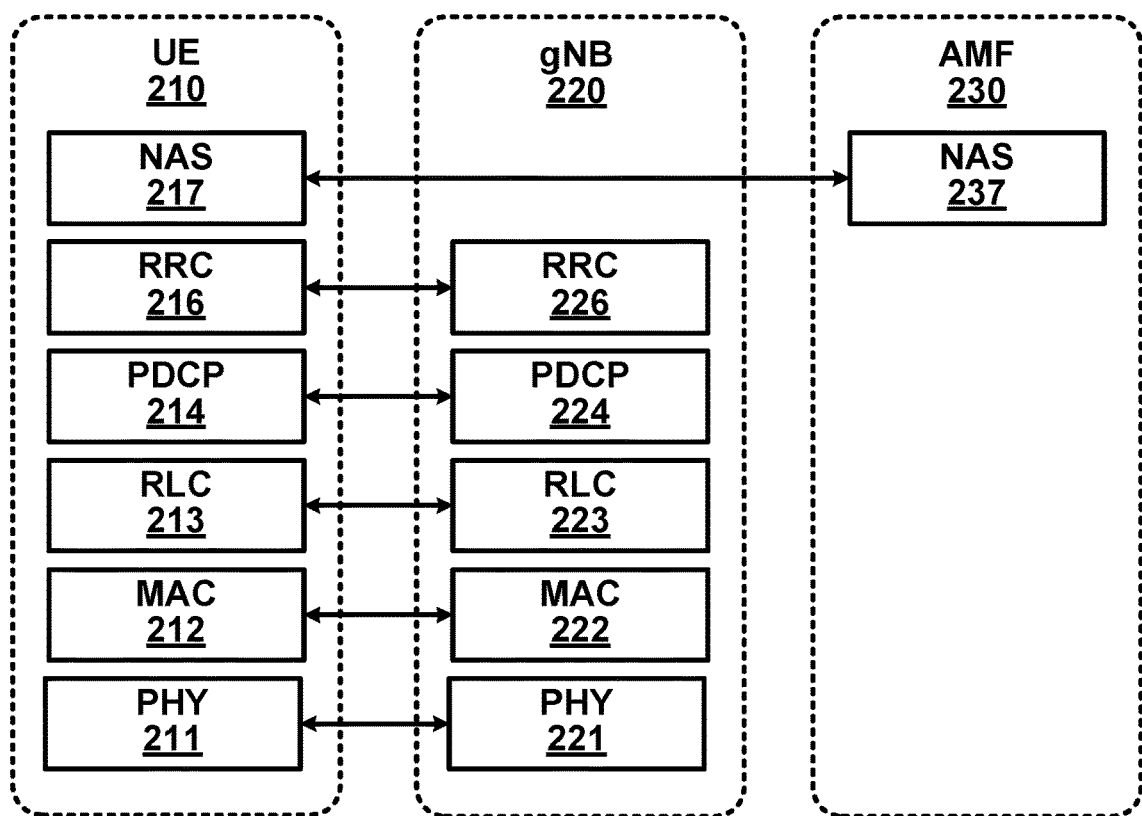

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
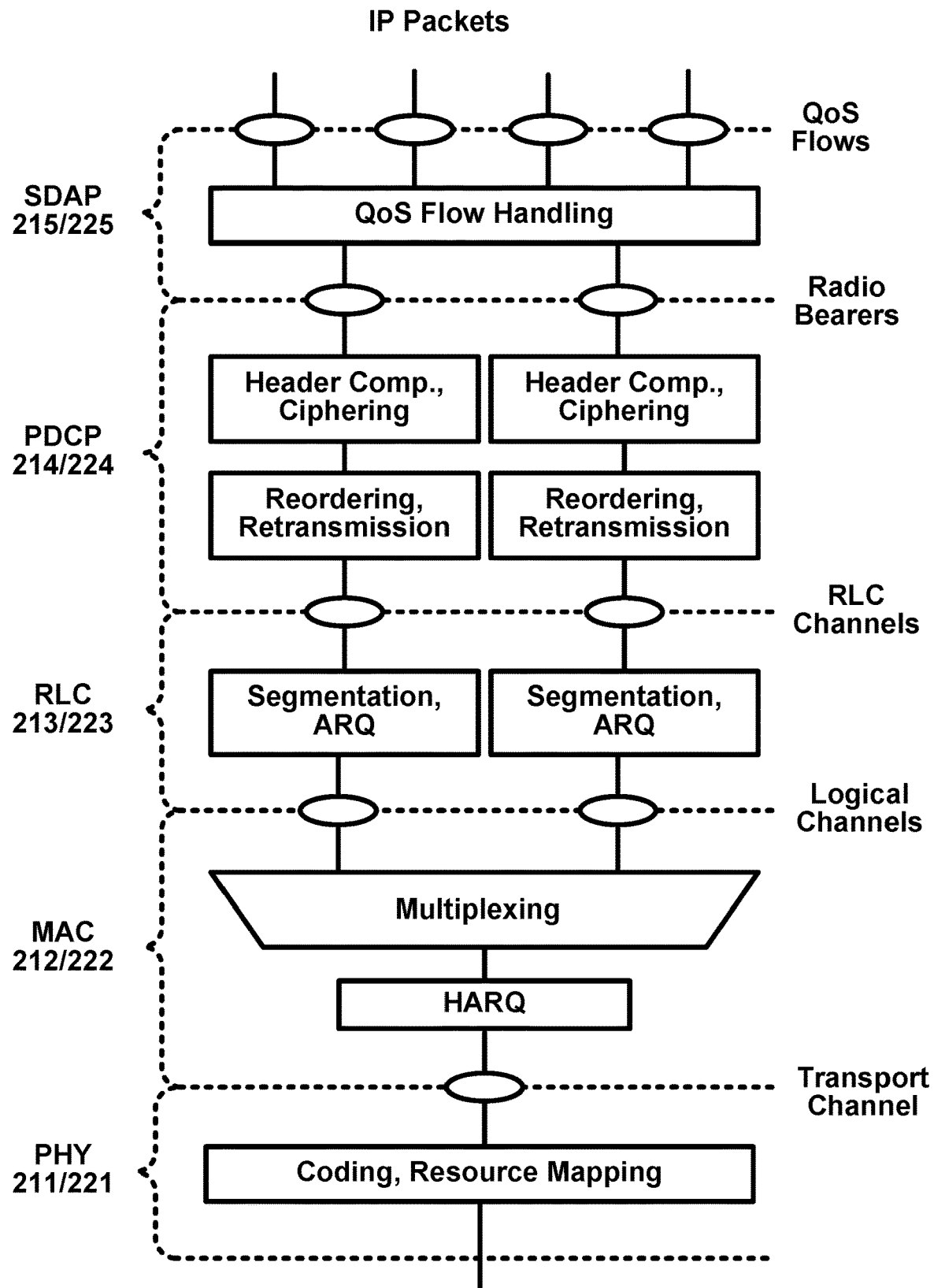
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
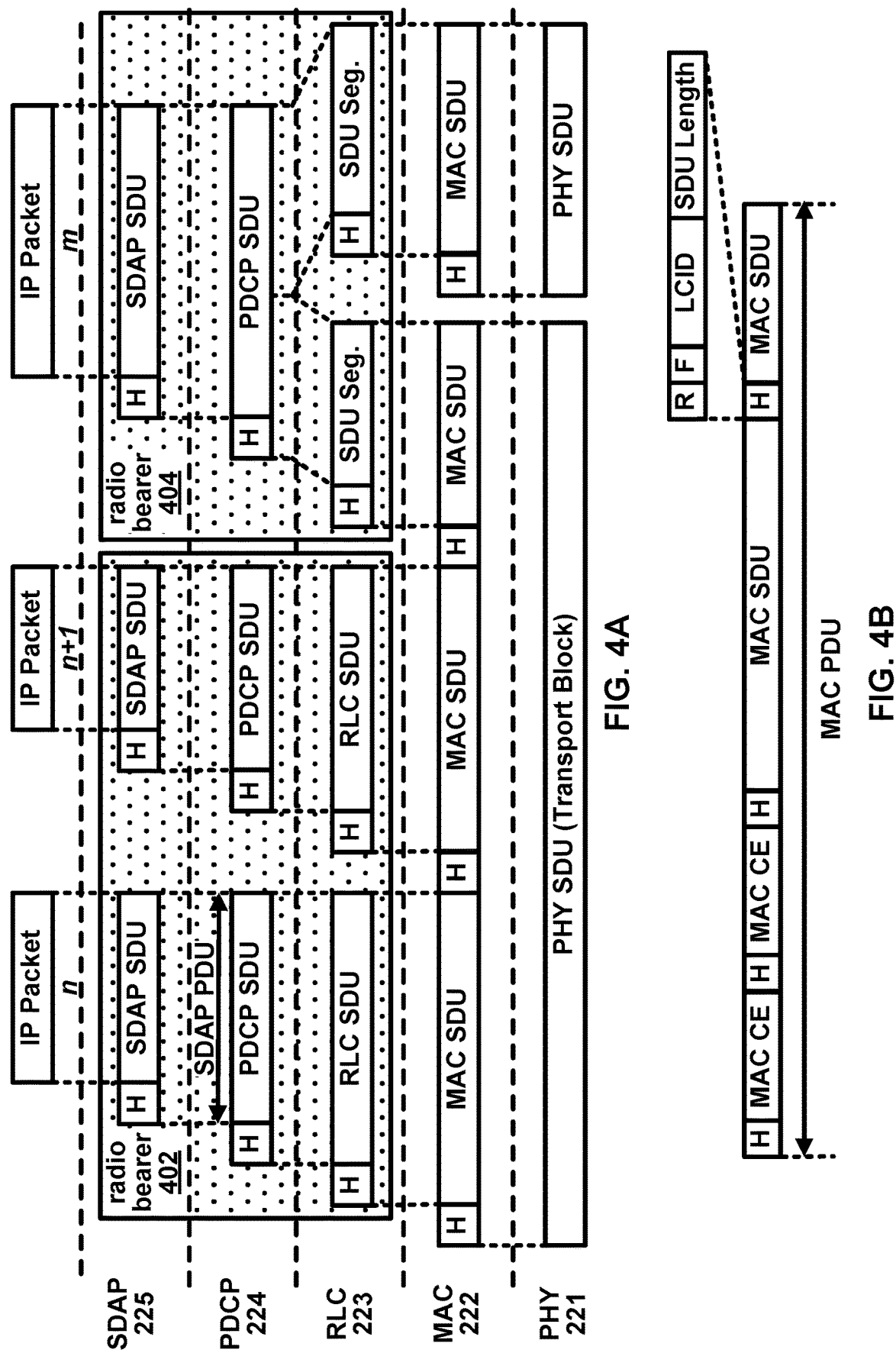
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A.

In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
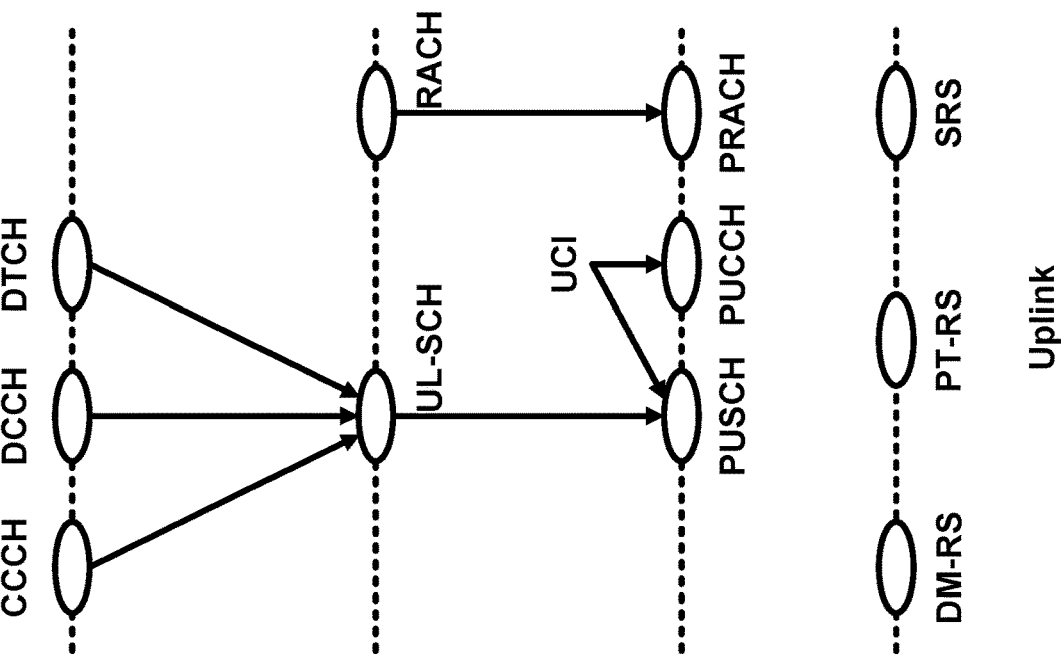
FIG. 5A and FIG. 5B respectively illustrate a mapping between logical channels, transport channels, and physical channels for the downlink and uplink.
Figure 5A:
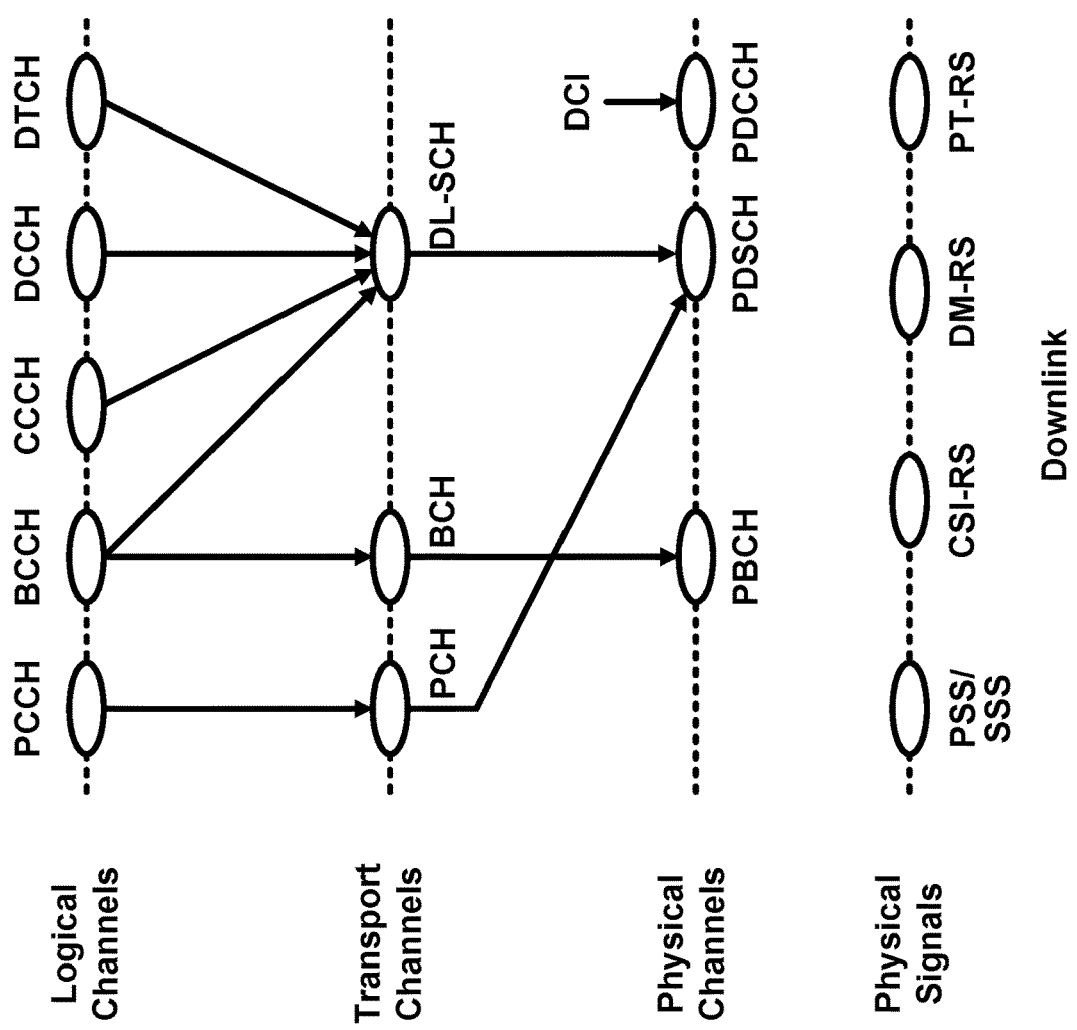

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and
- a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
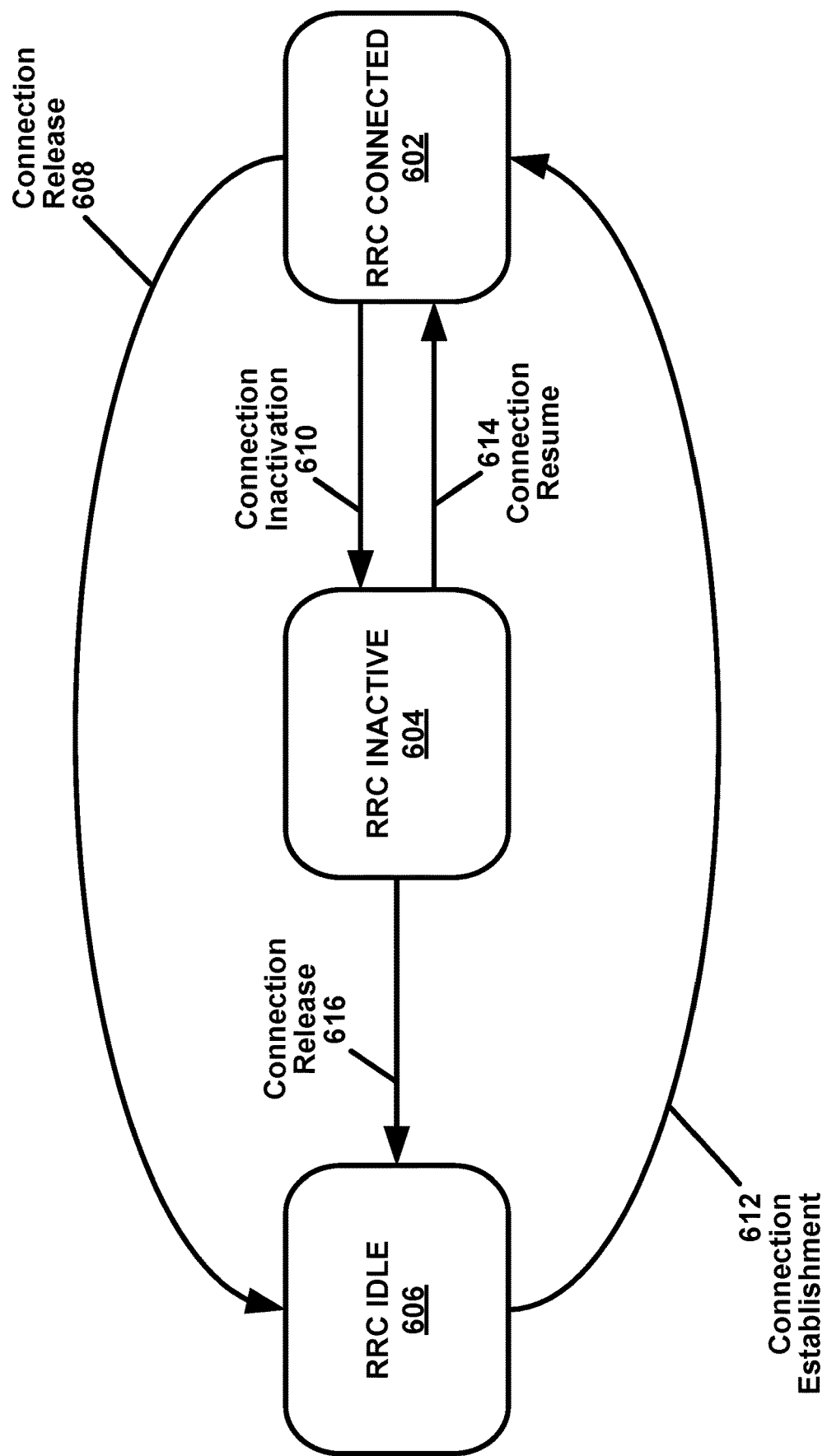
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
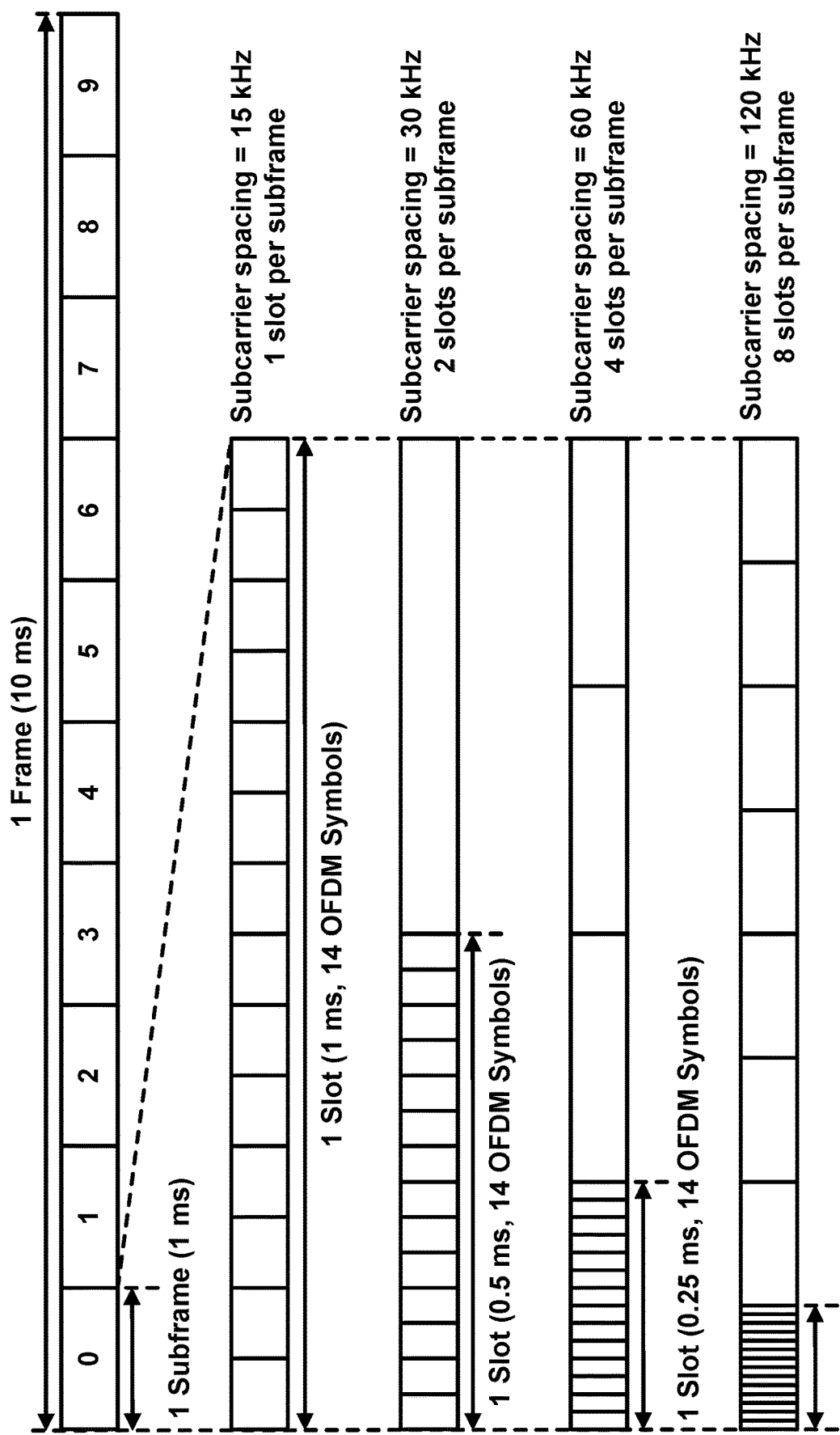
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
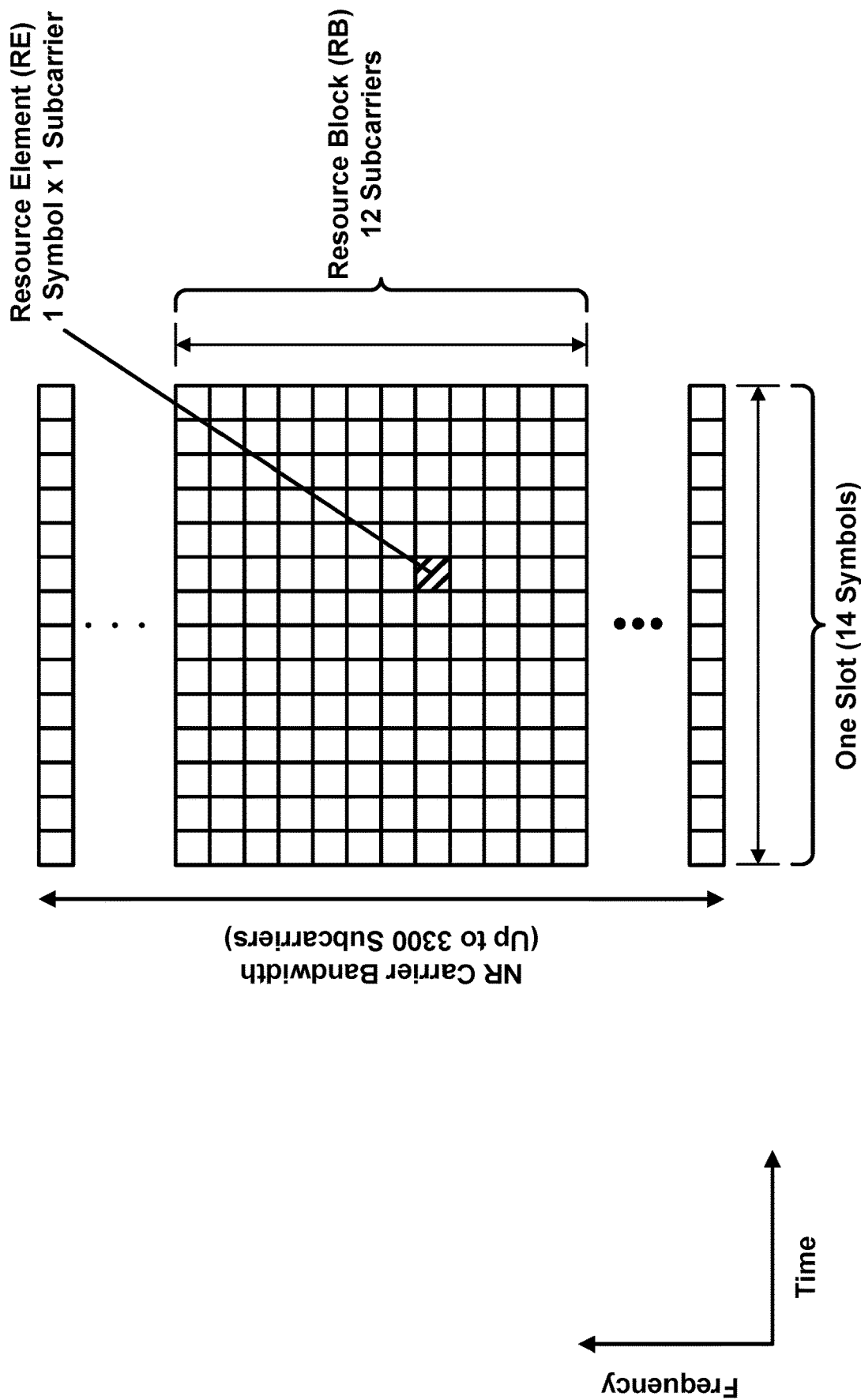
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
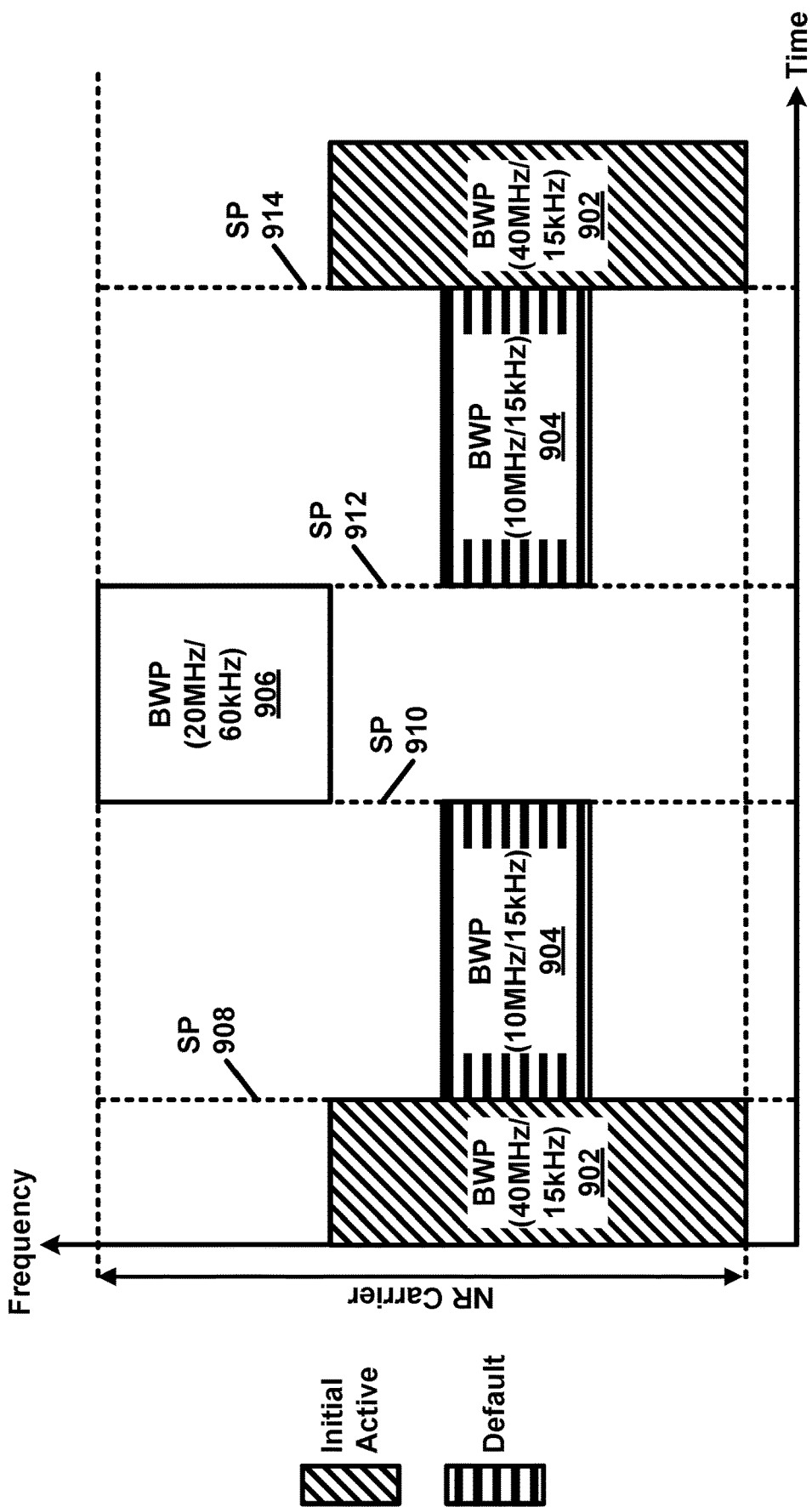
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
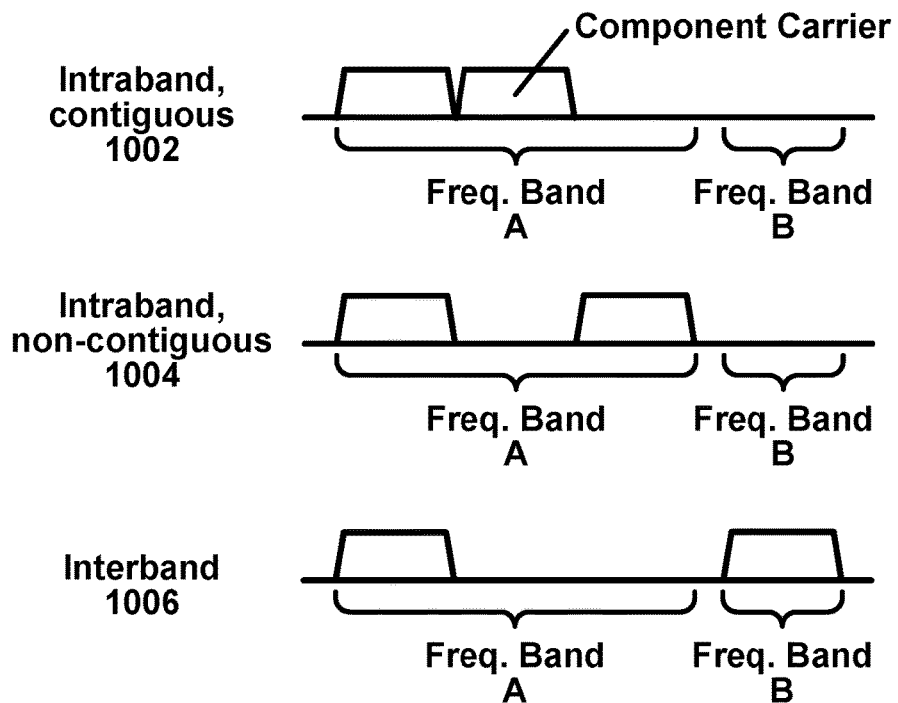
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
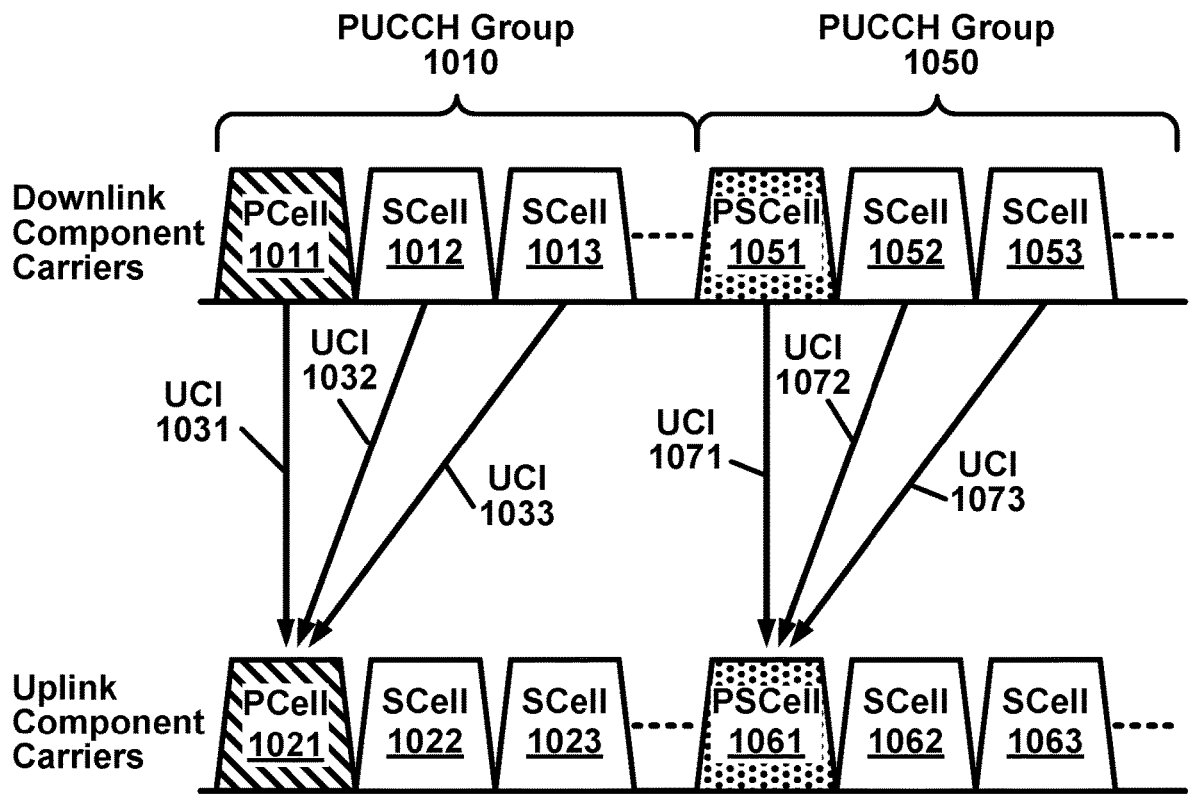
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/ physical broadcast channel (PBCH) block that includes the PSS, the SSS, and the PBCH. The base station may periodically transmit a burst of SS/PBCH blocks.

Figure 11A:
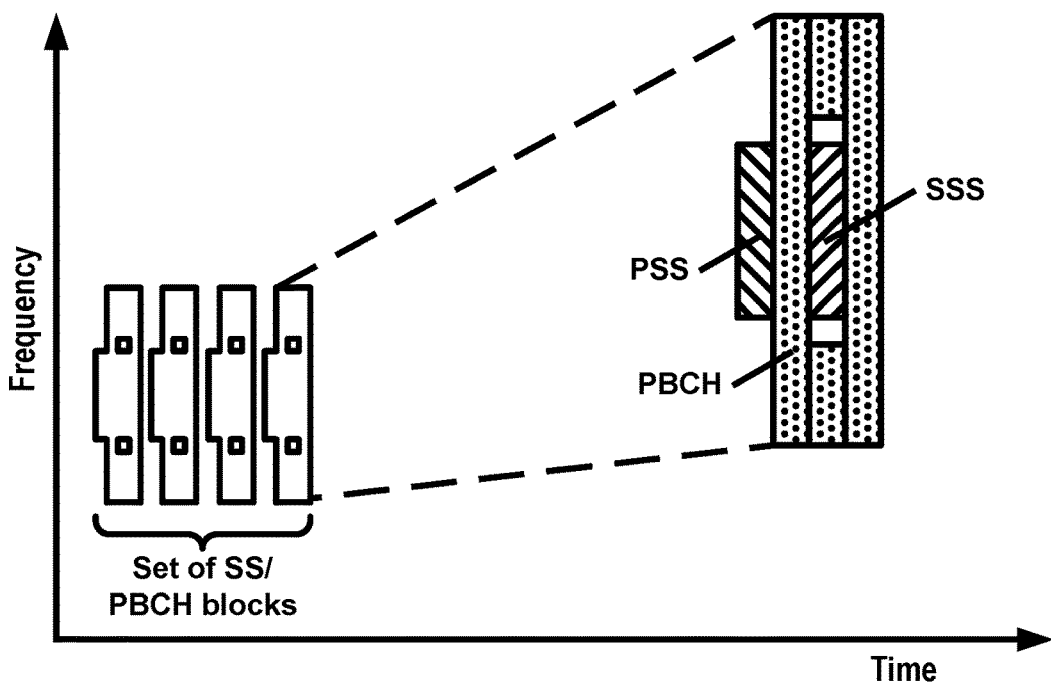
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
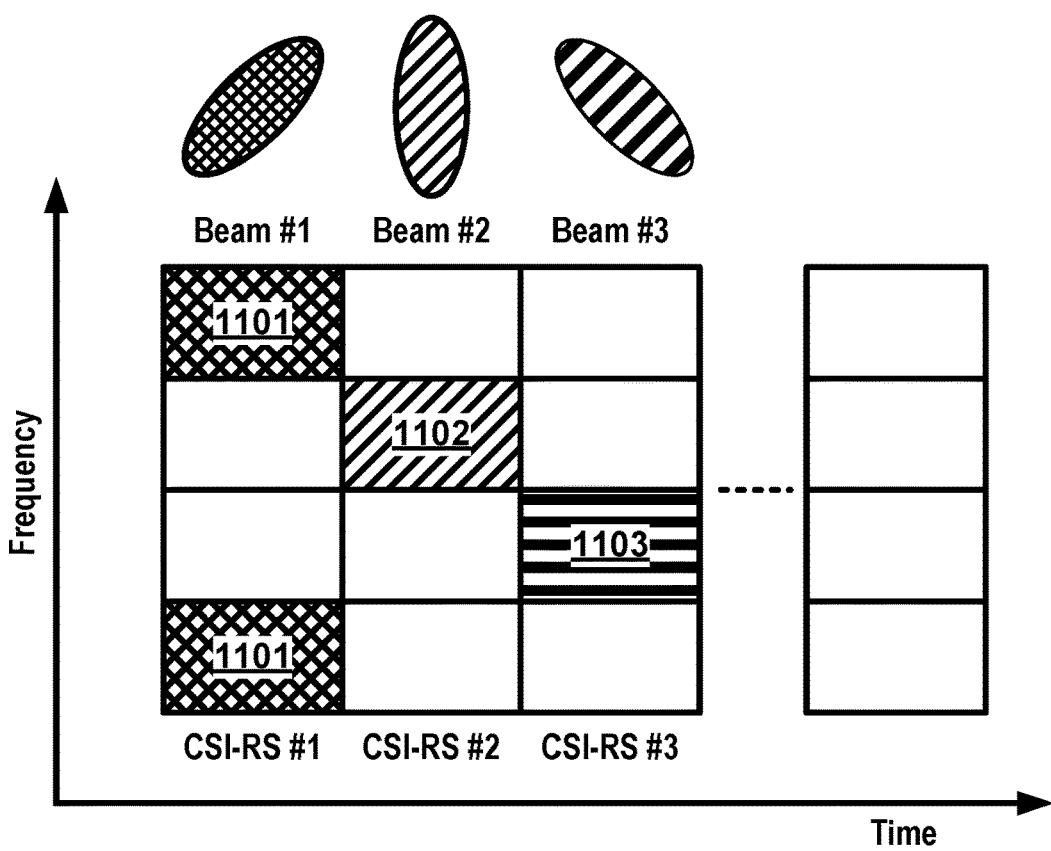
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement. The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
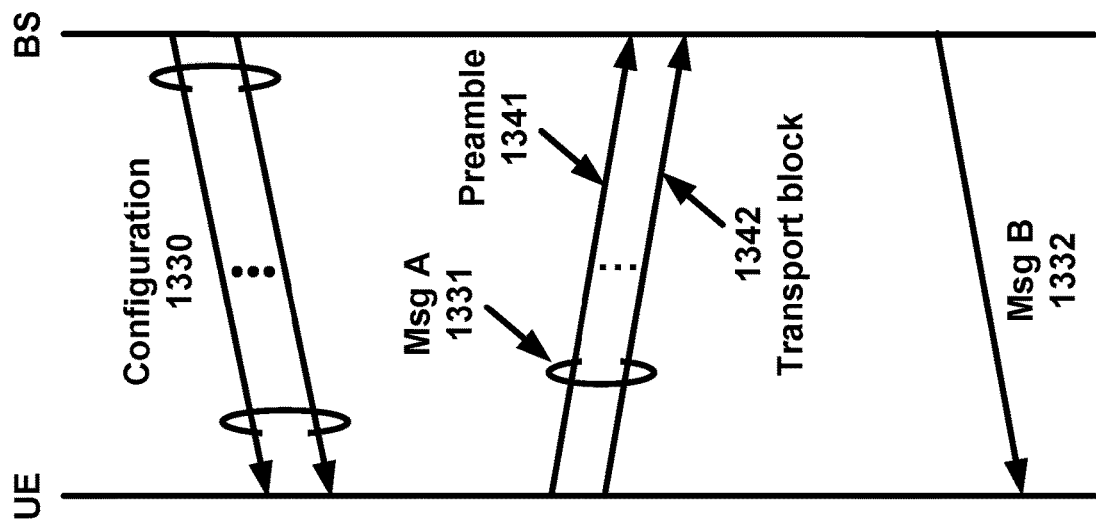
FIG. 13A, FIG. 13B, and FIG. 13C respectively illustrate a four-step contention-based random access procedure, a two-step contention-free random access procedure, and another two-step random access procedure.
Figure 13B:
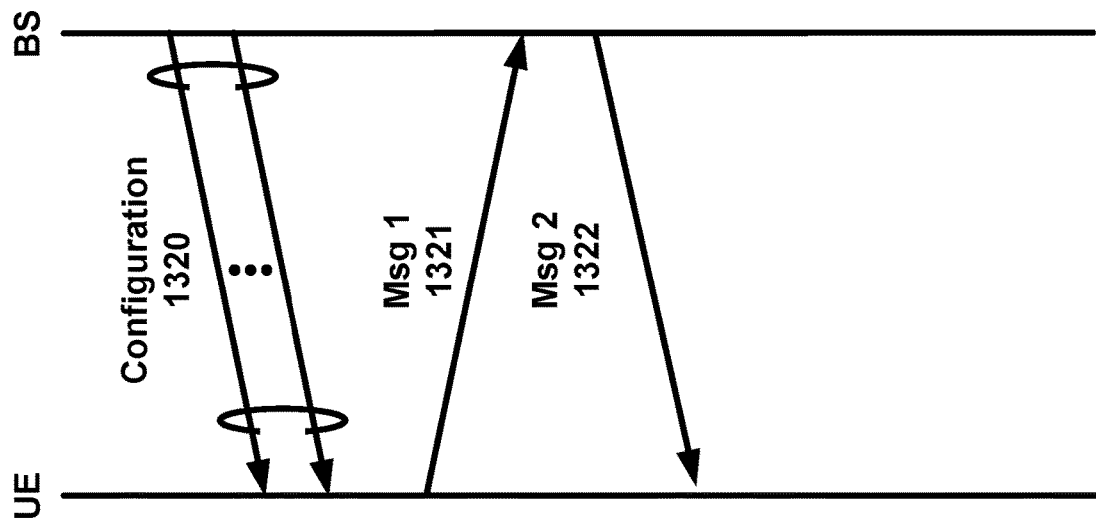
Figure 13A:
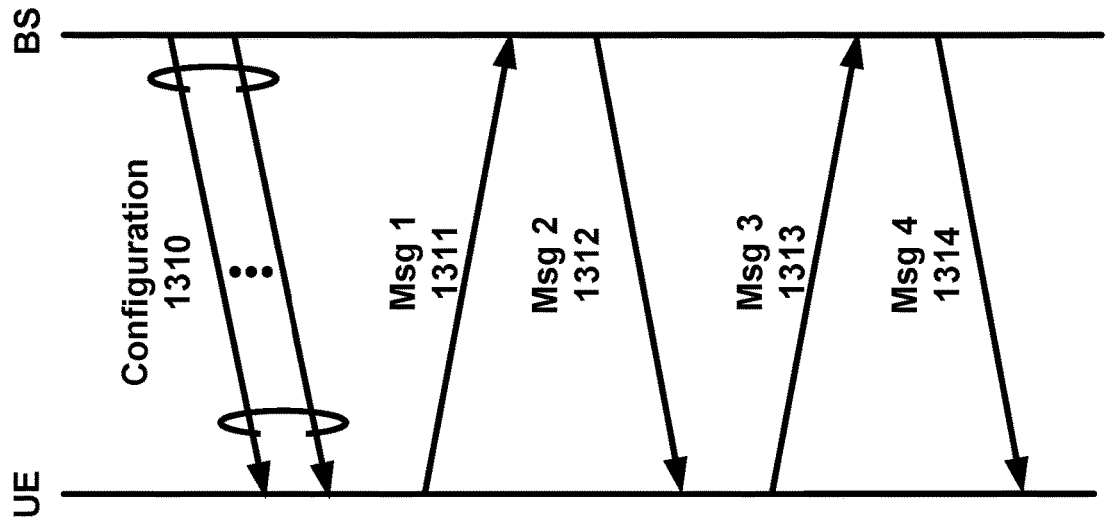

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0<s_id<14), t_id may be an index of a first slot of the PRACH occasion in a system frame (e.g., 0<t_id<80), fid may be an index of the PRACH occasion in the frequency domain (e.g., 0<f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
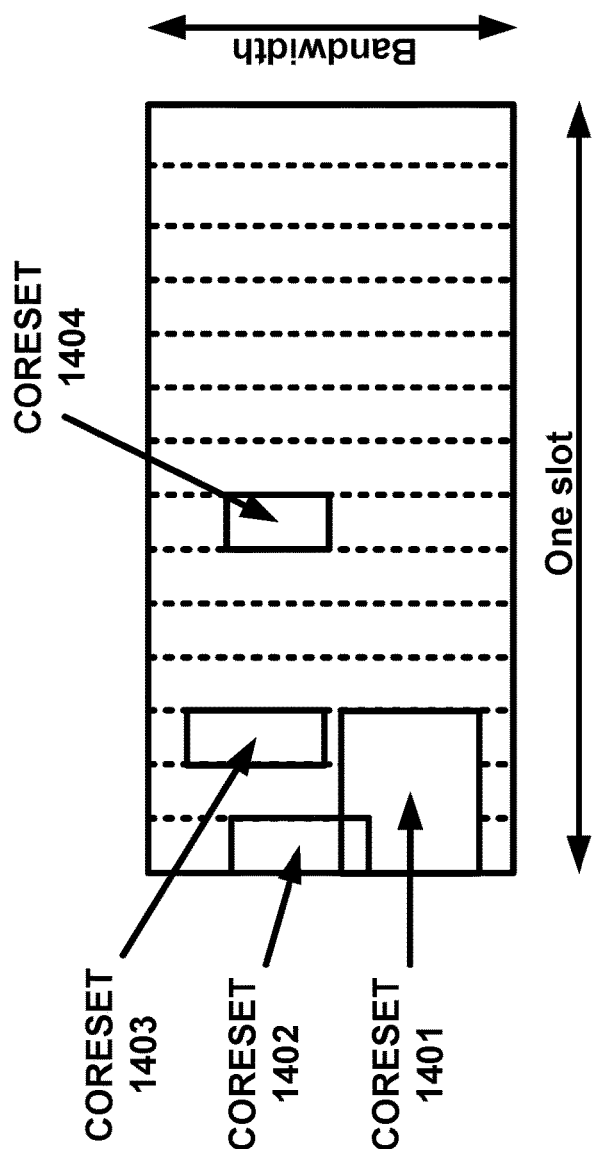
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
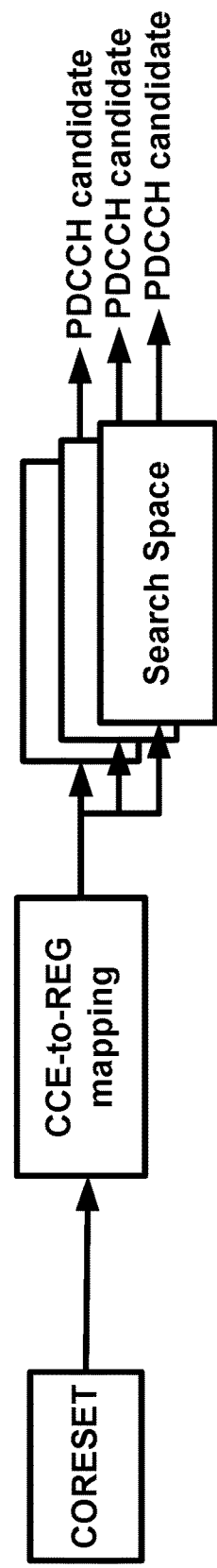
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
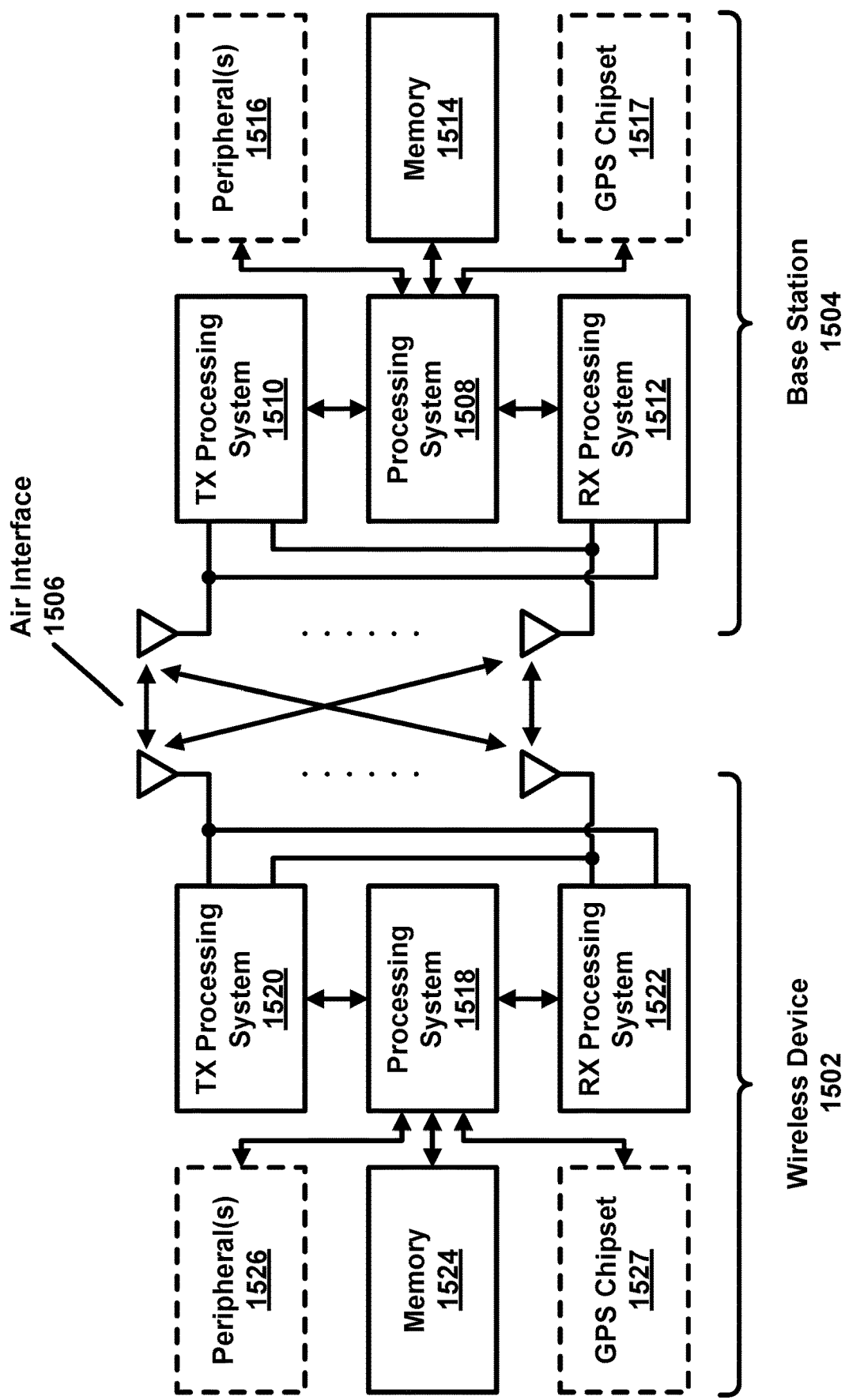
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A wireless device may use an asymmetric uplink downlink service, which has different quality-of-service (QoS) requirements in the uplink and downlink directions. In an example, a cloud gaming scenario may need low-latency and high-reliability uplink packet transmission for control signaling (e.g., URLLC: ultra-reliable and low-latency communication) and may need high-bandwidth but less-reliable downlink packet transmission for audio and video streaming (e.g., eMBB: enhanced mobile broadband). In existing technologies, packet duplication per session between a wireless device and a core network node may be configured to enhance packet transmission reliability. When a wireless device uses an asymmetric uplink downlink service, duplicating both uplink and downlink packets for a session may decrease resource utilization efficiency at least for one of the uplink or downlink that needs less-reliable packet transmission compared to the other.

Example embodiments may provide selective packet duplication for one of uplink or downlink transmission based on QoS requirements of the uplink or downlink transmission of a session. In an example embodiment, a wireless device may be configured with a session for an asymmetric uplink downlink service and a duplicate session for one of uplink or downlink transmission of the session. Example embodiments may increase resource utilization efficiency and packet transmission capacity for communication between a wireless device and a core network node.

For cloud gaming (e.g., interactive services), rendering may be performed on the network side, which means sensor/pose data may be transmitted to the network side in the uplink direction and rendered data may be transmitted to the UE side in the downlink direction. In the uplink direction, the sensor/pose data may require treatment within the network system such that the sensor/pose data is transmitted with low latency and high reliability (e.g., 10E-4). In the downlink direction, the rendered data (e.g., audio & video) may require treatment such that the rendered data is transmitted with low latency and potentially high bandwidth (e.g., 100 Mbps or more). The reliability in the downlink direction may be less stringent than the uplink direction (e.g., 10E-3). Regarding potential data rates, a network may need to support up to 120 frames-per-second (FPS) and 4K-8K resolution. Cloud gaming services may have characteristics of real-time interaction with low latency requirements, and the required reliability for uplink sensor/pose data and downlink rendered audio/video traffic may be asymmetric. Buffering packets which exceeds the delay budget may be not meaningful for cloud gaming. Meanwhile, to support interactive cloud gaming services, the total delay including both uplink and downlink transmission times within a 5G system in two directions may need to be less than a threshold (e.g., 5 ms). Due to the asymmetric service requirements for uplink and downlink, the latency for uplink and downlink may not be equal or static. Existing QoS mechanisms (e.g., QCI, 5QI, etc.) may not meet the requirements for the asymmetric services.

In addition to clouding gaming services, which may require such interactive and asymmetric service provisioning, in unmanned aerial system (UAS) and/or unmanned aerial vehicles (UAV), the uplink traffic may require eMBB treatment and the downlink traffic may require URLLC treatment, which is opposite to cloud gaming. To support interactive services (e.g., UAS, cloud gaming, VR, AR, XR, etc.), the wireless network may need to be enhanced to support the interactive services with different key performance indicator (KPI) requirements in the uplink and downlink directions. Wireless networks may need latency enhancement for uplink transmission from UE to UPF and downlink transmission from UPF to UE. Wireless networks may need reliability enhancement for uplink sensor/pose data and downlink pre-rendered/rendered audio/visual data.

Wireless networks may need to support high data rate in the downlink direction to support KPIs including FPS and/or resolution.

Figure 21:
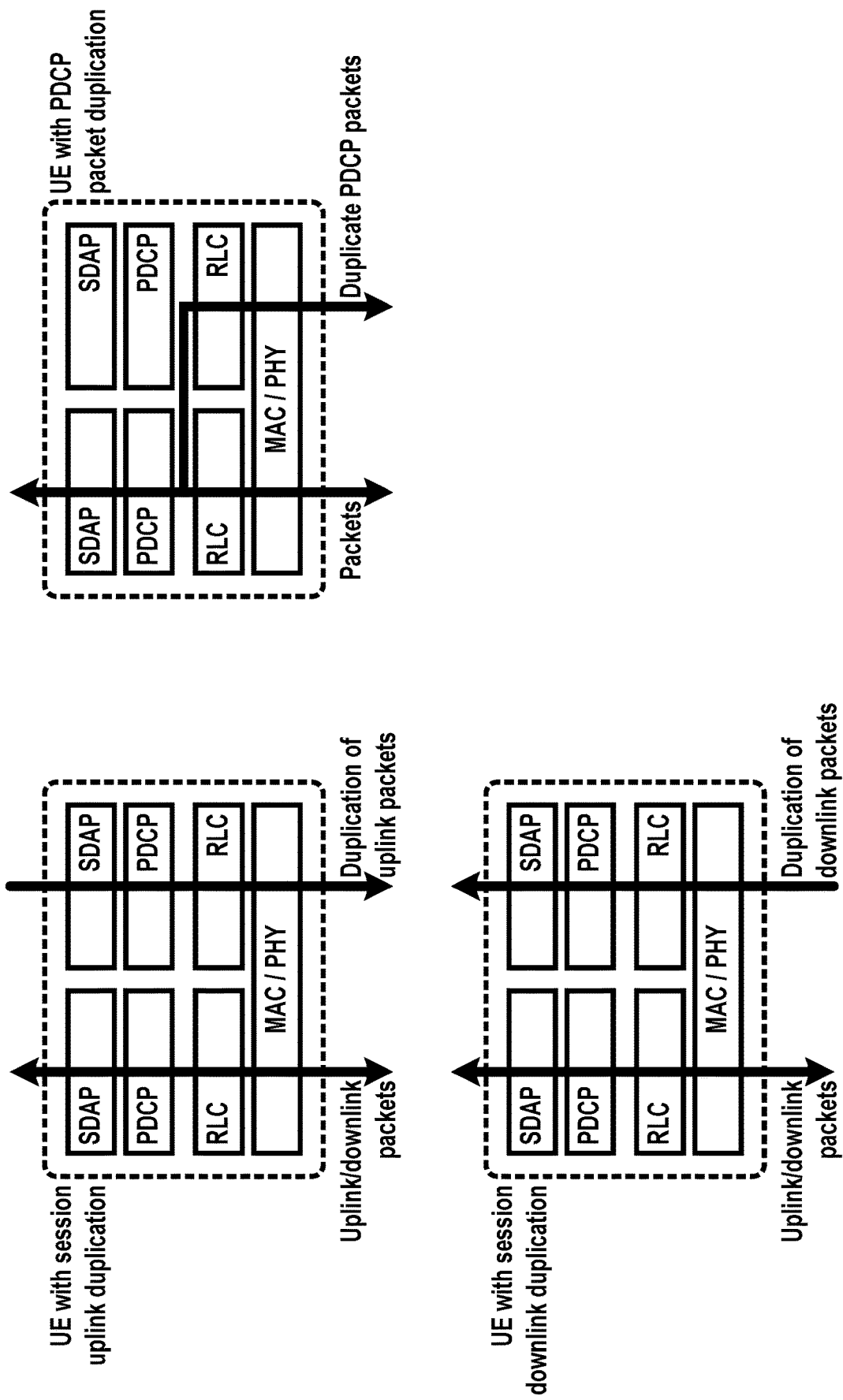
FIG. 21 is a diagram of an aspect of an example embodiment of the present disclosure.

In an example, as shown in FIG. 21, a packet duplication of a session is distinguished from a PDCP packet duplication. In a PDCP packet duplication, duplicated packets (e.g., both original packets and duplication of original packets) may be communicated in lower layers (e.g., RLC layer, MAC layer, PHY layer, etc.) of a base station, and a wireless device and may not be communicated in upper layers (e.g., SDAP layer, etc.) of a base station and a wireless device. For a PDCP packet duplication, when a PDCP layer receives packets of a bearer from an upper layer, the PDCP layer may duplicate the packets of the bearer and transmit, to a lower layer, the duplication of the packets and the original packets via separate bearers and/or logical channels (e.g., the original packets via a first bearer or a first logical channel; and the duplication of the packets via a second bearer or a second logical channel). For a PDCP packet duplication, when a PDCP layer receives duplication of packets and original packets from a lower layer, the PDCP layer may discard one of the duplication of packets or the original packets, and transmit the remaining packets (e.g., the original packets or the duplication of packets) to an upper layer.

In an example, in a session duplication (e.g., packet duplication of a session), duplicated packets (e.g., both original packets and duplication of original packets) may be communicated between a UPF and a wireless device. For a session duplication, when a UPF receives downlink packets associated with a session, the UPF may duplicate the downlink packets, and transmit, to a wireless device (e.g., via one or more UPFs and/or one or more gNBs), the duplication of the downlink packets and the original downlink packets via separate sessions (e.g., the original downlink packets via a first session; and the duplication of the downlink packets via a second session). For a session duplication, when a UPF receives uplink packets and duplication of the uplink packets from a wireless device (e.g., via one or more UPFs and/or one or more gNBs), the UPF may discard one of the duplication of uplink packets or the original uplink packets, and transmit the remaining uplink packets (e.g., the original uplink packets or the duplication of uplink packets) to a data network (e.g., another network).

Figure 22:
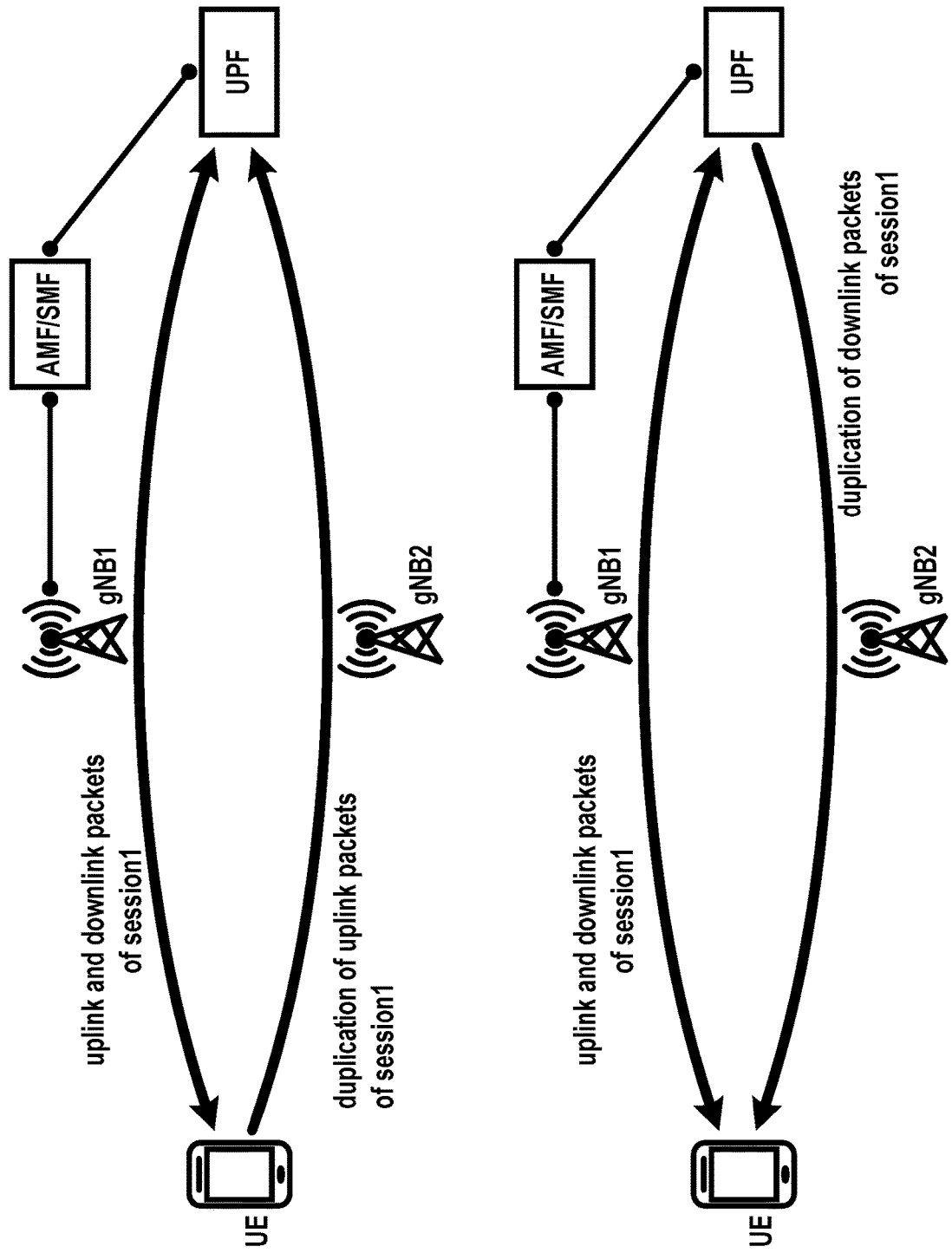
FIG. 22 is a diagram of an aspect of an example embodiment of the present disclosure.
Figure 23:
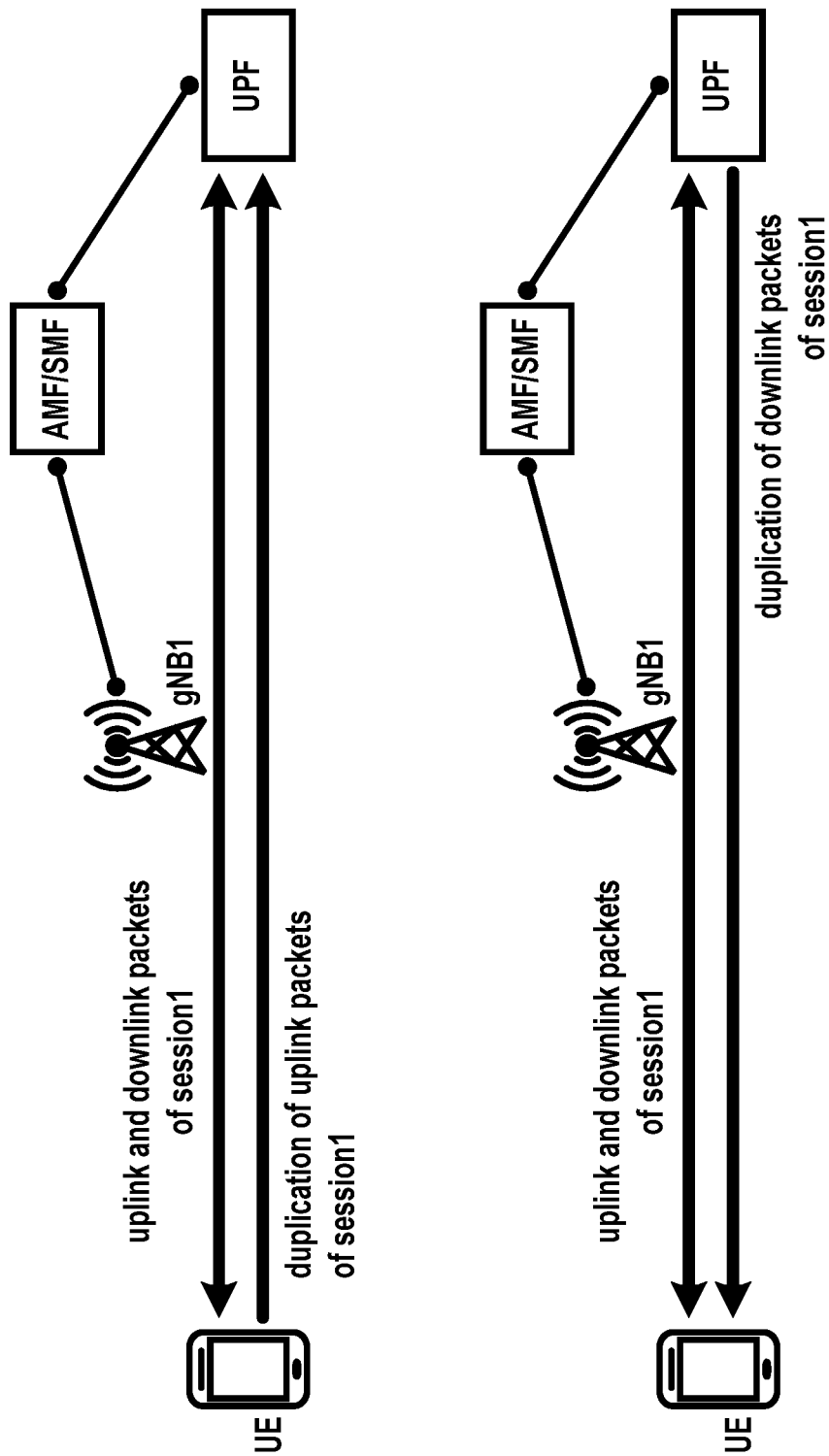
FIG. 23 is a diagram of an aspect of an example embodiment of the present disclosure.

In an example, as shown in FIG. 22 and/or FIG. 23, a first base station (e.g., gNB1, gNB, eNB, RNC, access node, RAN node, etc.) may serve a wireless device (e.g., UE, mobile terminal, remote-controlled device, remote controller, sensor device, etc.). An RRC connection may be established between the wireless device and the first wireless device. The first base station may have a control plane connection (e.g., N2 interface, S1 control plane interface, etc.) with an AMF and/or an SMF (e.g., or MME). The first base station may have a user plane connection (e.g., N3 interface, S1 user plane interface, etc.) with a UPF (e.g., or serving gateway and/or PDN gateway). The UPF may be a PDU session anchor (PSA) UPF. The first base station may be connected to the UPF via one or more intermediate UPFs.

In an example, the first base station may be connected to a second base station (e.g., gNB2, gNB, eNB, RNC, access node, RAN node, etc.) via a direct interface and/or an indirect interface. The direct interface may comprise at least one of an Xn interface, X2 interface, and/or the like. The indirect interface may comprise at least one of one or more N2 interfaces, one or more S1 interfaces, one or more core network nodes (e.g., one or more AMFs and/or one or more MMEs), and/or the like. The first base station may be a master base station providing a master cell group for the wireless device. The second base station may be a secondary base station providing a secondary cell group for the wireless device.

Figure 24:
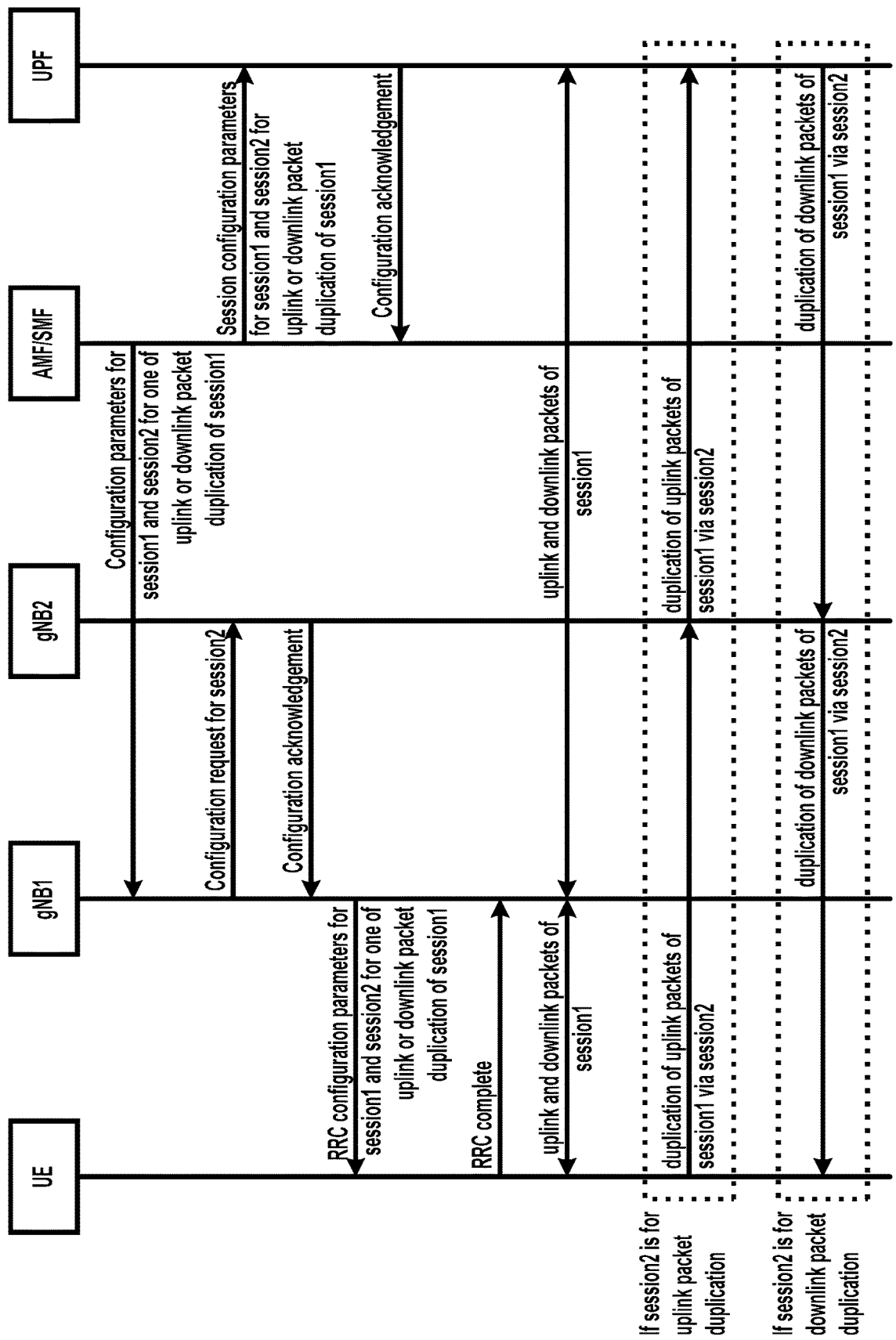
FIG. 24 is a diagram of an aspect of an example embodiment of the present disclosure.
Figure 25:
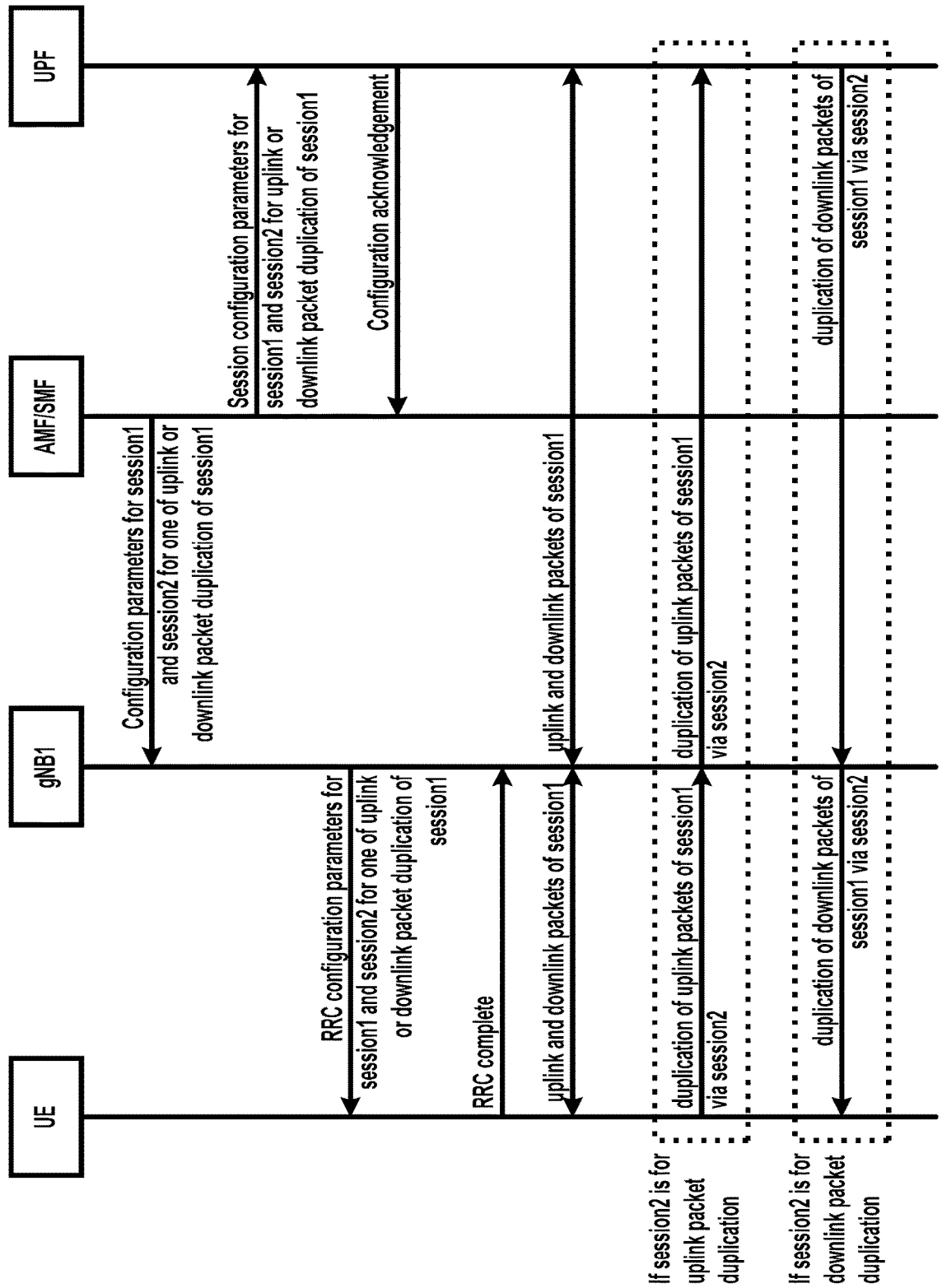
FIG. 25 is a diagram of an aspect of an example embodiment of the present disclosure.

In an example, as shown in FIG. 24 and/or FIG. 25, the SMF may receive, from a first network function (e.g., PCF, application function, NRF, second SMF, etc.) and/or the wireless device, QoS requirement information of a first session and/or of a service associated with the first session. The QoS requirement information of the service may indicate that the one of the uplink or downlink packets of the first session need at least one of: an ultra-reliable transmission and/or a low-latency transmission. The SMF may determine, based on the QoS requirement information, the duplication of one of uplink or downlink packets of the first session. In an example, the SMF may send, to the UPF, a session configuration request indicating that the second session is for transmitting the duplication of one of uplink or downlink packets of the first session. The SMF may receive, from the UPF, a session configuration request acknowledge indicating configuration of the first session and the second session. The session configuration request acknowledge may comprise at least one of: a first uplink tunnel endpoint identifier for the first session; and/or a second uplink tunnel endpoint identifier for the second session.

In an example, the first base station may receive, from the SMF via the AMF, a packet data unit (PDU) session configuration request. The PDU session configuration request may indicate that the second session is for transmitting the duplication of one of uplink or downlink packets of the first session. The first base station may send, to the SMF, a PDU session configuration request acknowledge in response to receiving the PDU session configuration request. The PDU session configuration request acknowledge may comprise at least one of: a first downlink tunnel endpoint identifier for the first session; and/or a second downlink tunnel endpoint identifier for the second session.

In an example, the wireless device may receive, from the first base station, at least one radio resource control (RRC) configuration message. The at least one RRC configuration message may comprise configuration parameters of at least one first bearer of the first session and/or at least one second bearer of the second session. The at least one RRC configuration message may be based on the PDU session configuration request that the first base station received from the SMF. The at least one RRC configuration message may comprise non-access stratum (NAS) information. The NAS information may indicate that the second session is for transmitting a duplication of one of uplink or downlink packets of the first session. The wireless device may communicate the uplink packets and the downlink packets via the at least one first bearer of the first session. The at least one RRC configuration message may be based on the PDU session configuration request that the SMF sends to the first base station. Based on the NAS information, the wireless device may perform one of: transmitting the duplication of the uplink packets of the first session via the at least one second bearer of the second session; or receiving the duplication of the downlink packets of the first session via the at least one second bearer of the second session.

In an example, the SMF may receive, from the first network function (e.g., PCF, application function, NRF, second SMF, etc.) and/or the wireless device, quality-of-service (QoS) requirement information of a first session and/or of a service for the wireless device. The service may be associated with the first session. In an example, the SMF may receive the QoS requirement information of the first session and/or the service directly or indirectly from the first network function. The first network function may be at least one of: a policy control function (PCF), an application function (AF), a network repository function (NRF), a second SMF (e.g., during an SMF relocation procedure for the wireless device), an operation and management (OAM) function, and/or the like.

In an example, the SMF may receive, from the wireless device, session establishment request for the first session. The session establishment request may indicate that one of uplink or downlink packets of the first session need at least one of: an ultra-reliable transmission; and/or a low latency transmission. The session establishment request may comprise the QoS requirement information of the first session and/or of the service for the wireless device. The session establishment request may indicate that the first session needs duplication of the one of uplink or downlink packets of the first session. The SMF may determine, based on the session establishment request, the duplication of the one of uplink or downlink packets of the first session.

In an example, the SMF may receive the QoS requirement information of the first session and/or the service directly or indirectly from the wireless device (e.g., via a PDU session establishment/modification request, a PDU session create/update SM context request, etc.) during a PDU session establishment procedure and/or a PDU session modification procedure. The PDU session establishment/modification request may be transmitted from the wireless device via an N1 SM container of a NAS message (e.g., comprising S-NSSAI(s), DNN, PDU Session ID, Request type (e.g., initial request; existing PDU session), and/or Old PDU Session ID of the first session and/or the service). The PDU session establishment/modification request may comprise at least one of: a PDU session ID, a requested PDU session type, a Requested SSC mode, a 5GSM capability, PCO, SM PDU DN Request Container, number of packet filters, a header compression configuration, UE integrity protection maximum data rate, always-on PDU session requested, and/or the like. The PDU session create/update SM context request (e.g., transmitted from the AMF to the SMF) may comprise, for the first session and/or the service, at least one of: SUPI, DNN, S-NSSAI(s), PDU Session ID, AMF ID, Request Type, PCF ID, priority access, small data rate control status, N1 SM container (e.g., comprising the PDU session establishment/modification request), user location information, access type, PEI, GPSI, UE presence in LADN service area, subscription for PDU session status notification, DNN selection mode, trace requirements, control plane CIoT 5GS Optimization indication, control plane only indicator, SM context ID, RAT type, and/or the like.

In an example, uplink packets of the first session may be associated with a first network slice. Downlink packets of the first session may be associated with a second network slice. In an example, a third network slice may comprise the first network slice and the second network slice. The first session may be for the third network slice. In an example, the QoS requirement information of the service and/or the first session may indicate the first network slice (e.g., first NSSAI, first S-NSSAI, etc.) for uplink transmission of the first session and/or the second network slice (e.g., second NSSAI, second S-NSSAI, etc.) for downlink transmission of the first session. In an example, the QoS requirement information of the service and/or the first session may indicate the third network slice (e.g., third NSSAI, third S-NSSAI, etc.) for the first session. In an example, the session establishment request (e.g., from the wireless device) for the first session may indicate at least one of: the first network slice (e.g., first NSSAI, first S-NSSAI, etc.) for uplink transmission of the first session; the second network slice (e.g., second NSSAI, second S-NSSAI, etc.) for downlink transmission of the first session; and/or the third network slice (e.g., third NSSAI, third S-NSSAI, etc.) for the first session.

In an example, the QoS requirement information of the service and/or the first session may indicate that the one of the uplink or downlink packets of the first session needs at least one of: an ultra-reliable transmission and/or a low-latency transmission. The QoS requirement information may indicate that the first session is for an asymmetric service and/or that the service is an asymmetric service. The asymmetric service may need different requirements for uplink packet transmission and downlink packet transmission from each other. To support the asymmetric service, QoS requirements for uplink packet transmission may be different from QoS requirements for downlink packet transmission. In an example, the asymmetric service may comprise at least one of remote drone/vehicle/plane control systems, cloud-based interactive video games, remote surgery systems, remote sensing/alert systems, and/or the like.

Figure 17:
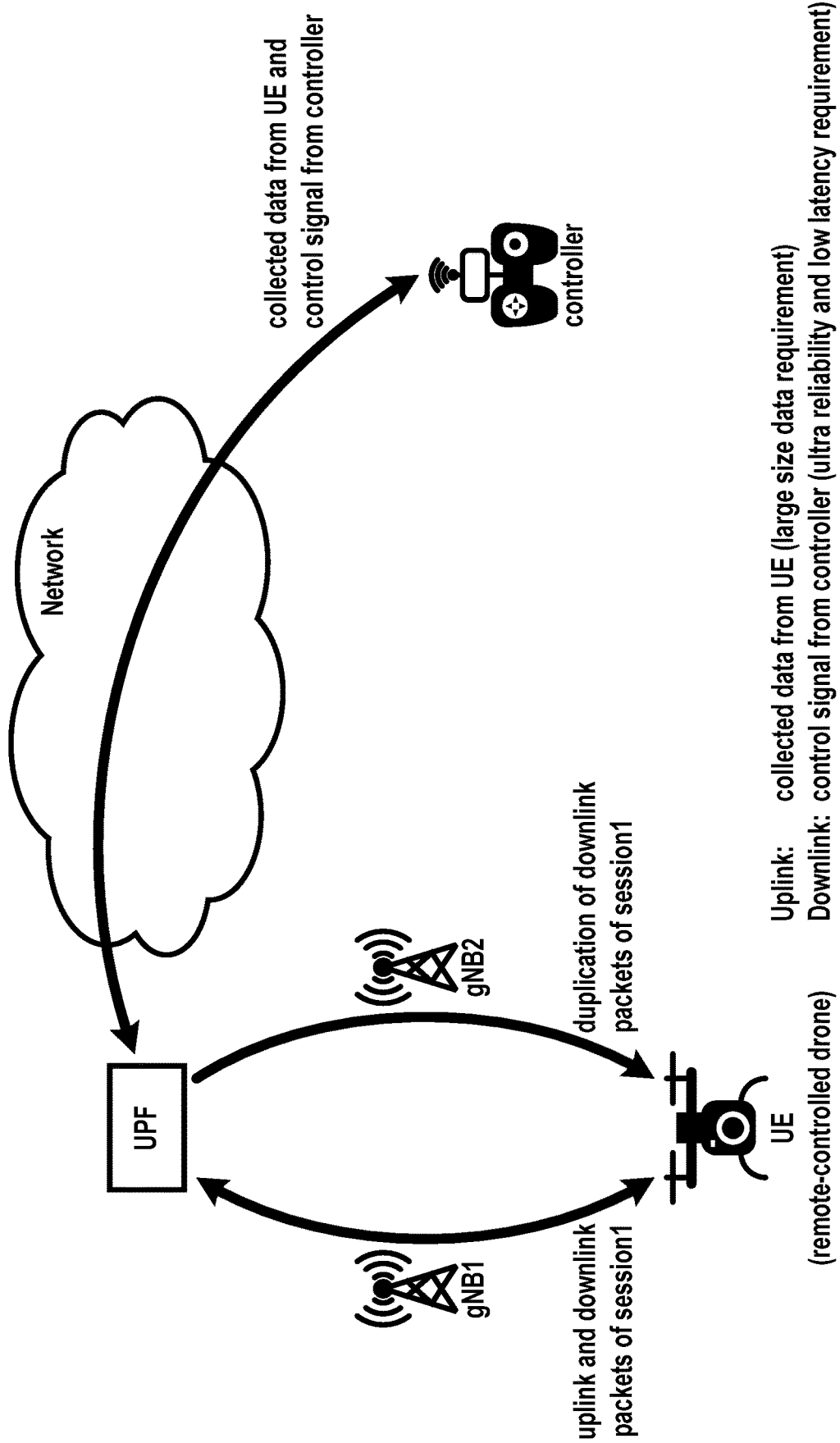
FIG. 17 is a diagram of an aspect of an example embodiment of the present disclosure.
Figure 18:
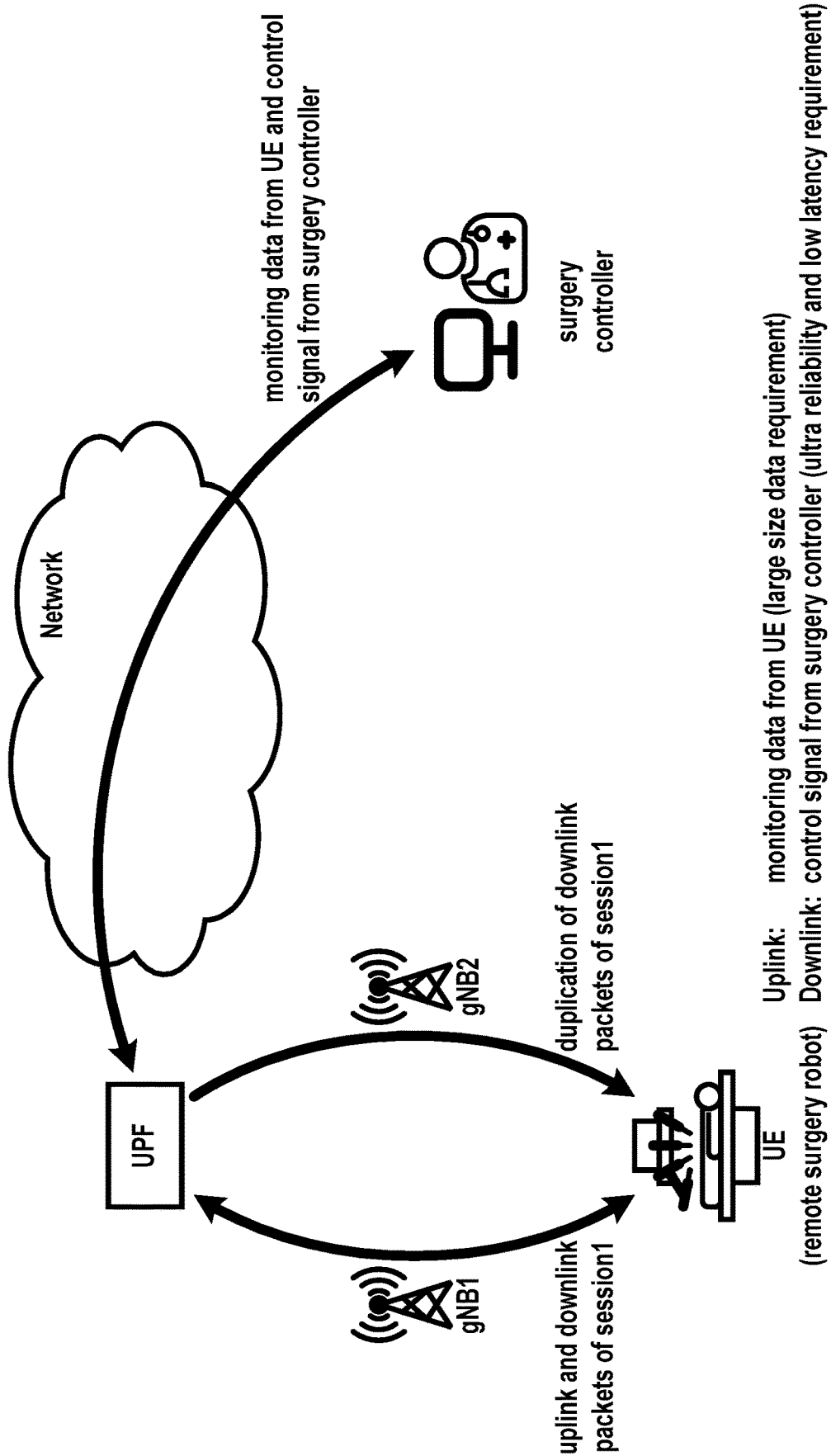
FIG. 18 is a diagram of an aspect of an example embodiment of the present disclosure.

In an example, as shown in FIG. 17 and/or FIG. 18, the asymmetric service (e.g., for the remote-controlled drone and/or for the remote surgery robot) may need URLLC requirements for downlink packet transmission (e.g., for control signal; small size data; low latency requirement) and may need large bandwidth data requirements for uplink packet transmission (e.g., collected data from drone and/or monitored data from robot: video/sound data, sensing data; large size and/or relatively untight latency requirement).

In FIG. 17, the downlink packet transmission may be for control signal from the controller. The control signal from the controller may be small size data and/or may need low latency (e.g., 1 ms) and high reliability (e.g., 0.0000000001% error rate). In FIG. 17, the uplink packet transmission may be for collected data (e.g., video/sound data, sensing data, etc.) from the remote-controlled drone. The collected data from the remote-controlled drone may be large size data and/or may need relatively untight latency requirement (e.g., latency-insensitive requirement: 10 ms to 100 ms). The collected data from the remote-controlled drone may need relatively less-reliability requirement (e.g., 0.01% error rate).

In FIG. 18, the downlink packet transmission may be for control signal from the surgery controller. The control signal from the surgery controller may be small size data and/or may need low latency (e.g., 0.5 ms) and high reliability (e.g., 0.000000000000001% error rate). In FIG. 18, the uplink packet transmission may be for surgery monitoring data (e.g., video/sound data, sensing data, etc.) from the remote surgery robot. The collected data from the remote surgery robot may be large size data and/or may need relatively untight latency requirement (e.g., latency-insensitive requirement: 10 ms to 100 ms). The collected data from the remote surgery robot may need relatively less-reliability requirement (e.g., 0.001% error rate).

Figure 19:
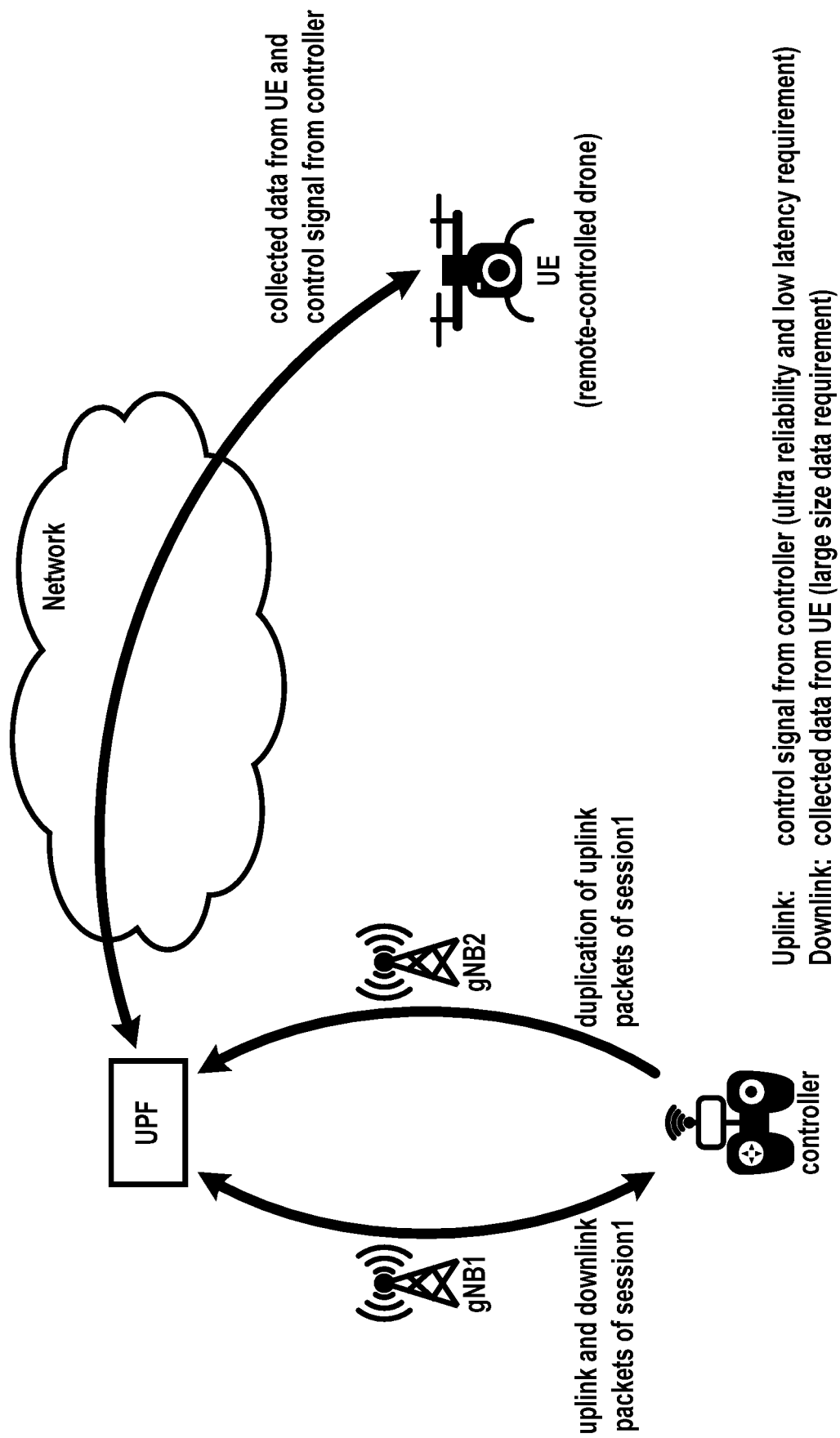
FIG. 19 is a diagram of an aspect of an example embodiment of the present disclosure.
Figure 20:
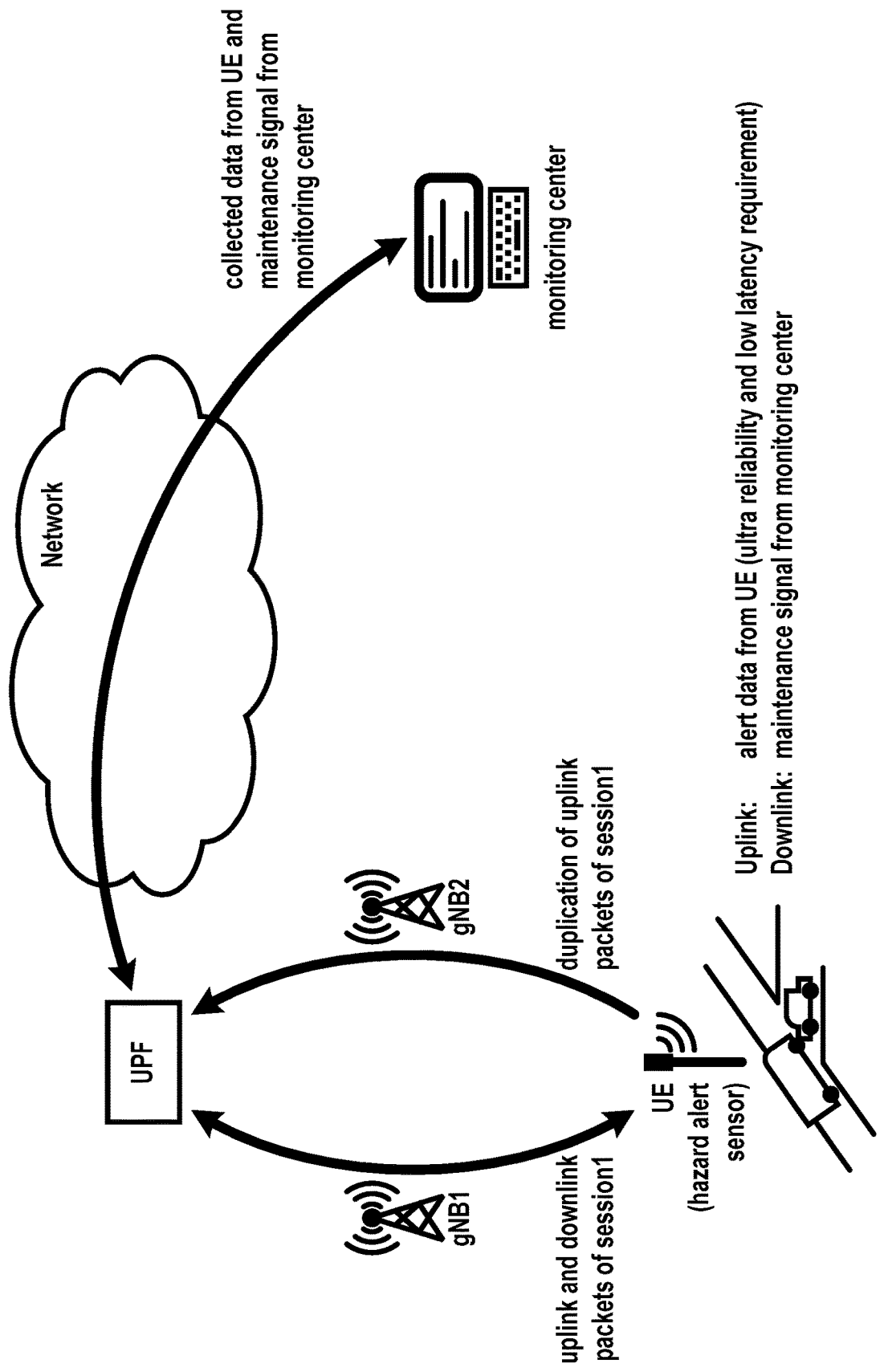
FIG. 20 is a diagram of an aspect of an example embodiment of the present disclosure.

In an example, as shown in FIG. 19 and/or FIG. 20, the asymmetric service (e.g., for controller, hazard alert sensor, etc.) may need relatively untight data requirements for downlink packet transmission (e.g., for collected data or maintenance signaling; e.g., video/sound data, sensing data, or maintenance command signal; large size and/or relatively untight latency requirement) and may need URLLC requirements for uplink packet transmission (e.g., for control signal from controller or hazard alert signal from alert sensor; small size data; low latency).

In FIG. 19, the downlink packet transmission may be for collected data (e.g., video/sound data, sensing data, etc.)

from the remote-controlled drone. The collected data from the remote-controlled drone may be large size data and/or may need relatively untight latency requirement (e.g., latency-insensitive requirement: 10 ms to 100 ms). The collected data from the remote-controlled drone may need relatively less-reliability requirement (e.g., 0.01% error rate). In FIG. 19, the uplink packet transmission may be for control signal from the controller. The control signal from the controller may be small size data and/or may need low latency (e.g., 1 ms, 0.5 ms) and high reliability (e.g., 0.0000000001% error rate).

In FIG. 20, the downlink packet transmission may be for maintenance signaling (e.g., maintenance command signal) from the monitoring center. The maintenance signaling from the monitoring center may need relatively untight latency requirement (e.g., latency-insensitive requirement: 10 ms to 100 ms). The maintenance signaling from the monitoring center may need relatively less-reliability requirement (e.g., 0.0001% error rate). In FIG. 20, the uplink packet transmission may be for alert signal (e.g., event notification) from the hazard alert sensor. The alert signal from the hazard alert sensor may be small size data and/or may need low latency (e.g., 1 ms) and high reliability (e.g., 0.0000000001% error rate).

In FIG. 17, FIG. 18, FIG. 19, and/or FIG. 20, the uplink and downlink packets of session1 may be transmitted via the gNB1, and the duplication of downlink or uplink packets of session1 may be transmitted via the gNB2 (e.g., different than the gNB1). In FIG. 17, FIG. 18, FIG. 19, and/or FIG. 20, the uplink and downlink packets of session1 and the duplication of downlink or uplink packets of session1 may be transmitted via the gNB1 (e.g., original packets and duplicated packets via the same gNB).

In an example, the SMF may determine, based on the QoS requirement information, duplication of one of uplink or downlink packets of the first session. The SMF may determine to configure/establish a second session for transmitting the duplication of the one of uplink or downlink packets of the first session. In an example, the SMF may receive, from another network node (e.g., PCF, CHF, NRF, the wireless device, etc.), session configuration policy and/or session configuration determination result (e.g., the duplication of the one of uplink or downlink packets of the first session) for the first session and/or the second session based on the QoS requirement information. The SMF may determine/configure the duplication of the one of uplink or downlink packets of the first session and/or may determine to configure/establish the second session, based on the session configuration policy and/or the session configuration determination result.

In an example, the second session may be for transmitting the duplication of uplink packets of the first session and not for transmitting the duplication of downlink packets of the first session. In an example, the second session may be for transmitting the duplication of downlink packets of the first session and not for transmitting the duplication of uplink packets of the first session. In an example, the second session may be one of: an uplink only session (e.g., if only uplink packets of the first session are duplicated); or a downlink only session (e.g., if only downlink packets of the first session are duplicated). The first session may be for at least one asymmetric service (e.g., the service).

In an example, if the service associated with the first session needs ultra-reliable and/or low-latency packet transmission for downlink and needs large data volume, less-reliable, and/or latency-insensitive (e.g., untight latency) packet transmission for uplink (e.g., the service as shown in FIG. 17 and/or FIG. 18), the SMF (e.g., and/or the another network node) may determine/configure duplication of downlink packets of the first session. The duplication of the one of uplink or downlink packets of the first session may comprise duplicating downlink packets of the first session and not-duplicating uplink packets of the first session. By duplicating downlink packets of the first session at the network (e.g., UPF, PSA UPF, etc.), the wireless device may reliably receive downlink packets, for example, due to transmission/reception path diversity and/or packet transmission repetition. For the duplication of downlink packets of the first session, the SMF (e.g., and/or another network node) may determine to configure the second session. Uplink and downlink packets of the first session may be transmitted via the first session. The duplication of downlink packets of the first session may be transmitted via the second session. Uplink packets of the first session may not be duplicated via the second session.

In an example, if the service associated with the first session needs ultra-reliable and/or low-latency packet transmission for uplink and needs large data volume, less-reliable, and/or latency-insensitive (e.g., untight latency) packet transmission for downlink (e.g., the service as shown in FIG. 19 and/or FIG. 20), the SMF (e.g., and/or the another network node) may determine/configure duplication of uplink packets of the first session. The duplication of the one of uplink or downlink packets of the first session may comprise duplicating uplink packets of the first session and not-duplicating downlink packets of the first session. By duplicating uplink packets of the first session (e.g., at the wireless device), the wireless device may reliably transmit uplink packets, for example, due to transmission/reception path diversity and/or packet transmission repetition. For the duplication of uplink packets of the first session, the SMF (e.g., and/or another network node) may determine to configure the second session. Uplink and downlink packets of the first session may be transmitted via the first session. The duplication of uplink packets of the first session may be transmitted via the second session. Downlink packets of the first session may not be duplicated via the second session.

In an example, the first session and/or the second session may be interpreted as at least one of: a packet flow, a QoS flow, a bearer (e.g., radio bearer, core bearer, EPS bearer, etc.), a PDU session, and/or the like.

In an example, the first session and the second session may have same PDU session identifier. In an example, a PDU session may comprise the first session and the second session. In an example, the second session may be part of the first session. In an example, the second session may be a separate/different PDU session from the first session and/or may have a separate/different/independent PDU session identifier from the first session.

In an example, the first session may be configured via a 3GPP network and the second session may be configured via a non-3GPP network (e.g., WiFi, WLAN, CDMA, WiMAX, 3GPP LTE network, 3GPP 3G network, etc.). A PDU session may be a multi-access PDU session, and the first session of the PDU session may be configured via the 3GPP network and the second session of the PDU session may be configured via the non-3GPP network. In an example, the first session may be configured via the non-3GPP network and the second session may be configured via the 3GPP network.

In an example, the first session may be configured between the wireless device and the UPF (e.g., PSA UPF) via the first base station, and the second session may be configured between the wireless device and the UPF (e.g., PSA UPF) via the second base station. In an example, the first session and the second session may be configured between the wireless device and the UPF via the first base station. In an example, the first session may be configured between the wireless device and the UPF via the first base station and the second session may be configured between the first base station and the UPF.

In an example, the first session and/or the second session may pass through one or more UPFs between the first base station and the UPF (e.g., the PSA UPF) and/or between the second base station and the UPF (e.g., the PSA UPF).

In an example, based on determining to configure the duplication of the one of uplink or downlink packets of the first session, the SMF may send, to the UPF (e.g., user plane core network node: serving gateway, PDN gateway, UPF, etc.), a session configuration request indicating that the second session is for transmitting the duplication of one of uplink or downlink packets of the first session. The session configuration request may be for configuration of the first session and the second session of the wireless device. The SMF may send the session configuration request to the UPF via an N4 interface that is setup between the SMF and the UPF. In an example, the second configuration request may comprise at least one of: a session establishment request message; a session modification request message; and/or the like. The session configuration request may comprise one or more information elements for the first session and/or the second session. The one or more information elements of the session configuration request may indicate at least one of: Node ID of the SMF, CP F-SEID (e.g., session identifier), Create PDR, Create FAR, Create URR, Create QER, Create BAR, Create Traffic Endpoint, PDN Type (e.g., IP PDN connection/PDU session; non-IP PDN connection/PDU session; and/or an Ethernet PDU session), SGW-C FQ-CSID, MME FQ-CSID, PGW-C FQ-CSID, ePDG FQ-CSID, TWAN FQ-CSID, User Plane Inactivity Timer, User ID of the wireless device, Trace Information, and/or the like. In an example, the SMF may send the session configuration request to the UPF via an N4 interface that may be setup between the SMF and the UPF.

In an example, the one or more information elements of the session configuration request may indicate first QoS information of the first session and/or second QoS information of the second session. The first QoS information may comprise QoS information of uplink packets of the first session and QoS information of downlink packets of the first session. The QoS information of uplink packets of the first session may be different from the QoS information of downlink packets of the first session. If the second session is for duplication of uplink packets of the first session (e.g., the QoS information of uplink packets of the first session is for URLLC service), the second QoS information may comprise QoS information of uplink packets of the second session (e.g., the QoS information of uplink packets of the second session may or may not same to the QoS information of uplink packets of the first session). If the second session is for duplication of downlink packets of the first session (e.g., the QoS information of downlink packets of the first session is for URLLC service), the second QoS information may comprise QoS information of downlink packets of the second session (e.g., the QoS information of downlink packets of the second session may or may not same to the QoS information of downlink packets of the first session). In an example, QoS information (e.g., the first QoS information, the second QoS information, the QoS information of uplink packets of the first session, the QoS information of downlink packets of the first session, the QoS information of uplink packets of the second session, the QoS information of downlink packets of the second session, QoS information of QoS flow of the first session and/or the second session, etc.) may comprise at least one of: QoS Class Identifier (QCI), 5G QoS Indicator (5QI: dynamic and/or non-dynamic), priority level, allocation and retention priority (ARP: priority level, pre-emption capability, pre-emption vulnerability, etc.), latency requirement (e.g., tolerable packet transmission latency/delay), reliability requirement (e.g., maximum error rate), session aggregate maximum bit rate (AMBR), session type (e.g., PDU session type: IP, non-IP, ethernet, IPv4, IPv6, IPv4v6, unstructured, etc.), QoS flow identifier, QoS flow level QoS parameters, averaging window, maximum data burst volume, packet delay budget, packet error rate, delay critical indication (e.g., critical or non-critical), maximum flow bit rate downlink, maximum flow bit rate uplink, guaranteed flow bit rate downlink, guaranteed flow bit rate uplink, notification control (e.g., indicating notification requested), maximum packet loss rate downlink, maximum packet loss rate uplink, and/or the like.

In an example, the one or more information elements of the session configuration request may indicate at least one of: first network slice information (e.g., first NSSAI, first S-NSSAI, etc.) of the first network slice for uplink packets of the first session; second network slice information (e.g., second NSSAI, second S-NSSAI, etc.) of the second network slice for downlink packets of the first session; third network slice information (e.g., third NSSAI, third S-NSSAI, etc.) of the third network slice of the first session; fourth network slice information (e.g., first NSSAI, first S-NSSAI, etc.) of the first network slice for uplink packets of the second session (e.g., when duplicating uplink packets of the first session); fifth network slice information (e.g., second NSSAI, second S-NSSAI, etc.) of the second network slice for downlink packets of the second session (e.g., when duplicating downlink packets of the first session); and/or the like.

In an example, the one or more information elements of the session configuration request may indicate at least one of: a first downlink tunnel endpoint identifier (TEID) of the first session; a second downlink TEID of the second session; and/or the like. In an example, the first downlink TEID may be an IP address of the first base station or the second base station. In an example, the second downlink TEID may be an address (e.g., IP address) of the first base station or the second base station. If the first session and the second session pass through the same base station, as shown in FIG. 23, the first downlink TEID and the second downlink TEID may be addresses (e.g., IP addresses) of the same base station (e.g., the first base station or the second base station). If the first session and the second session pass through different/separate base stations than each other, as shown in FIG. 22, the first downlink TEID and the second downlink TEID may be addresses (e.g., IP addresses) of different/separate base station (e.g., the first downlink TEID is for the first base station and the second downlink TEID is for the second base station; or the first downlink TEID is for the second base station and the second downlink TEID is for the first base station). In an example, if the first session and/or the second session pass through one or more UPFs between the UPF and the first base station and/or between the UPF and the second base station, the first downlink TEID and/or the second downlink TEID may be addresses (e.g., IP addresses) of the one or more UPFs.

In an example, based on the session configuration request, the UPF may configure the first session and the second session. The UPF may configure at least one of: a first uplink TEID of the first session; a second uplink TEID of the second session; and/or the like. The first uplink TEID and/or the second uplink TEID may be addresses (e.g., IP addresses) of the UPF. The UPF may apply, for the first session and/or the second session, the first QoS information of the first session and/or the second QoS information of the second session. The UPF may configure QoS parameters for the first session and/or the second session based on the first QoS information of the first session and/or the second QoS information of the second session. The UPF may apply the first downlink TEID for the first session and/or the second downlink TEID for the second session.

In an example, the SMF may receive, from the UPF, a session configuration request acknowledge indicating configuration of the first session and the second session. The session configuration request acknowledge may be a response/acknowledge for the session configuration request. The session configuration request acknowledge may comprise at least one of: the first uplink TEID for the first session; and/or a second uplink TEID for the second session. In an example, the session configuration request acknowledge may comprise at least one of: a session establishment response message; a session modification response message; and/or the like. The session configuration request acknowledge may indicate whether the UPF accepts the first session and/or the second session. The session configuration request acknowledge may indicate whether the UPF accepts one or more configurations of the first QoS information for the first session and/or one or more configurations of the second QoS information for the second session. In an example, the session configuration request acknowledge may comprise at least one of: Node ID of the UPF, Cause (e.g., for rejection of the one or more configurations of the first/second QoS information; for rejection of the first session and/or the second session), Offending IE (e.g., indicating the rejection is due to a conditional or mandatory IE missing or faulty), UP F-SEID, Created PDR, Load Control Information (e.g., if the UPF supports a load control feature and/or the load control feature is activated in the UPF), Overload Control Information (e.g., if the UPF supports an overload control feature and/or the overload control feature is activated in the UPF), SGW-U FQ-CSID, PGW-U FQ-CSID, Failed Rule ID (e.g., if the Cause IE indicates the rejection due to a rule creation or modification failure), Created Traffic Endpoint, and/or the like. In an example, the UPF may accept the first session and the second session. In an example, the UPF may accept the first session and reject the second session. In an example, the UPF may reject the first session and the second session. In an example, based on rejecting the first session (or in response to rejecting the first session), the UPF may reject the second session. In an example, the UPF may send the session configuration request acknowledge to the SMF via the N4 interface that may be setup between the SMF and the UPF.

In an example, the first base station may receive, from the SMF (e.g., via the AMF), a PDU session configuration request. In an example, the first base station may receive, from the AMF, the PDU session configuration request (e.g., the AMF may receive, from the SMF, PDU session parameters of the PDU session configuration request). The PDU session configuration request may be for configuration of the first session and the second session of the wireless device. The PDU session configuration request may indicate that the second session is for transmitting the duplication of the one of uplink or downlink packets of the first session. In an example, the first base station may receive the PDU session configuration request from the AMF via the control plane connection (e.g., N2 interface, S1 control plane interface, etc.). In an example, the PDU session configuration request may be at least one of: PDU session resource setup request message, PDU session resource modify request message, initial context setup request message, UE context modification request message, and/or the like. The PDU session configuration request may comprise one or more configuration information elements for the first session, the second session, and/or the wireless device. The one or more configuration information elements of the PDU session configuration request may comprise at least one of: Message Type of the PDU session configuration request, AMF UE NGAP ID (e.g., identifier of the wireless device), RAN UE NGAP ID (e.g., identifier of the wireless device), RAN Paging Priority, NAS-PDU (e.g., NAS message and/or NAS parameters for the wireless device), PDU session resource setup request list (e.g., for each PDU session: PDU session ID, PDU session NAS-PDU, network slice information, S-NSSAI, PDU session resource setup/modify request transfer (e.g., a message from the SMF to the first base station), etc.) for one or more PDU sessions (e.g., comprising the first session and/or the second session) of the wireless device, UE AMBR, and/or the like. In an example, the NAS-PDU and/or the PDU session NAS-PDU of the PDU session configuration request may comprise NAS information indicating that the second session is for transmitting the duplication of the one of uplink or downlink packets of the first session. In an example, the first base station may receive the NAS information (e.g., the NAS-PDU and/or the PDU session NAS-PDU) from the SMF and/or the AMF. The first base station may forward/send, to the wireless device (e.g., via at least one RRC message), the NAS information (e.g., the NAS-PDU and/or the PDU session NAS-PDU of the PDU session configuration request).

In an example, the PDU session configuration request and/or the PDU session resource setup/modify request transfer (e.g., the message from the SMF to the first base station) for the one or more PDU sessions of the PDU session configuration request may comprise one or more session parameters for the first session, the second session, and/or one or more sessions. The one or more session parameters may indicate at least one of: PDU session AMBR (e.g., of the first session, the second session, and/or the one or more sessions), UL NG-U UP TNL Information (e.g., the first uplink TEID for the first session, the second uplink TEID for the second session, etc.), Additional UL NG-U UP TNL Information, Data Forwarding Not Possible indication (e.g., for handover procedure), PDU Session Type (e.g., Ipv4, Ipv6, Ipv4v6, ethernet, unstructured, etc.), Security Indication (e.g., user plane integrity protection indication; confidentiality protection indication which indicates requirements on uplink integrity protection and/or ciphering for corresponding PDU sessions; maximum integrity protected data rate per UE for integrity protection for DRBs; etc.), Network Instance (e.g., for selecting a particular transport network resource), QoS Flow Setup Request List (e.g., for each QoS flow of corresponding PDU session: QoS Flow Identifier, QoS flow level QoS parameters, E-RAB ID, etc.), Common Network Instance, and/or the like.

In an example, the PDU session configuration request and/or the QoS flow level QoS parameters of the PDU session resource setup/modify request transfer (e.g., the message from the SMF to the first base station) may comprise the first QoS information of the first session and/or the second QoS information of the first session. The first QoS information may comprise QoS configuration parameters of uplink packets of the first session and QoS configuration parameters of downlink packets of the first session. If the second session is for duplication of uplink packets of the first session, the second QoS information may comprise QoS configuration parameters of uplink packets of the second session (e.g., the QoS configuration parameters of uplink packets of the second session may or may not same to the QoS configuration parameters of uplink packets of the first session). If the second session is for duplication of downlink packets of the first session, the second QoS information may comprise QoS configuration parameters of downlink packets of the second session (e.g., the QoS configuration parameters of downlink packets of the second session may or may not same to the QoS configuration parameters of downlink packets of the first session).

In an example, QoS configuration parameters (e.g., the first QoS information, the second QoS information, the QoS configuration parameters of uplink packets of the first session, the QoS configuration parameters of downlink packets of the first session, the QoS configuration parameters of uplink packets of the second session, the QoS configuration parameters of downlink packets of the second session, QoS configuration parameters (e.g., the QoS flow level QoS parameters) of QoS flow of the first session and/or the second session, etc.) may comprise at least one of: QoS Class Identifier (QCI), 5G QoS Indicator (5QI: dynamic and/or non-dynamic), priority level, allocation and retention priority (ARP: priority level, pre-emption capability, pre-emption vulnerability, etc.), latency requirement (e.g., tolerable packet transmission latency/delay), reliability requirement (e.g., maximum error rate), session aggregate maximum bit rate (AMBR), session type (e.g., PDU session type: IP, non-IP, ethernet, IPv4, IPv6, IPv4v6, unstructured, etc.), QoS flow identifier, QoS level parameters, averaging window, maximum data burst volume, packet delay budget, packet error rate, delay critical indication (e.g., critical or non-critical), maximum flow bit rate downlink, maximum flow bit rate uplink, guaranteed flow bit rate downlink, guaranteed flow bit rate uplink, notification control (e.g., indicating notification requested), maximum packet loss rate downlink, maximum packet loss rate uplink, and/or the like.

In an example, the PDU session configuration request and/or the PDU session resource setup/modify request transfer (e.g., the message from the SMF to the first base station) for the one or more PDU sessions of the PDU session configuration request may comprise the first network slice information (e.g., first NSSAI, first S-NSSAI, etc.) of the first network slice for uplink packets of the first session; the second network slice information (e.g., second NSSAI, second S-NSSAI, etc.) of the second network slice for downlink packets of the first session; the third network slice information (e.g., third NSSAI, third S-NSSAI, etc.) of the third network slice of the first session; the fourth network slice information (e.g., first NSSAI, first S-NSSAI, etc.) of the first network slice for uplink packets of the second session (e.g., when duplicating uplink packets of the first session); the fifth network slice information (e.g., second NSSAI, second S-NSSAI, etc.) of the second network slice for downlink packets of the second session (e.g., when duplicating downlink packets of the first session); and/or the like. In an example, the first network slice information may be same to the fourth network slice information. In an example, the second network slice information may be same to the fifth network slice information.

In an example, the first base station may send, to the SMF (e.g., via the AMF), a PDU session configuration request acknowledge in response to receiving the PDU session configuration request. In an example, the first base station may send, to the AMF, the PDU session configuration request acknowledge (e.g., the AMF may send, to the SMF, PDU session response parameters of the PDU session configuration request acknowledge). The PDU session configuration request acknowledge may comprise at least one of: the first downlink TEID for the first session; and/or the second downlink TEID for the second session. In an example, the first base station may send the PDU session configuration request acknowledge to the AMF via the control plane connection (e.g., N2 interface, S1 control plane interface, etc.). The PDU session configuration request acknowledge may be at least one of: PDU session resource setup response, PDU session resource modify response, initial context setup response message, UE context modification response message, and/or the like. The PDU session configuration request acknowledge may comprise at least one of: Message Type of the PDU session configuration request, AMF UE NGAP ID (e.g., identifier of the wireless device), RAN UE NGAP ID (e.g., identifier of the wireless device), RAN Paging Priority, NAS-PDU (e.g., NAS message and/or NAS parameters for the wireless device), PDU session resource setup response list (e.g., for one or more PDU sessions: PDU session ID, PDU session NAS-PDU, network slice information, S-NSSAI, PDU session resource setup/modify response transfer (e.g., a message from the first base station to the SMF), etc.) for one or more PDU sessions (e.g., comprising the first session and/or the second session) of the wireless device, PDU session resource failed to setup list (e.g., for one or more failed-to-setup PDU sessions: PDU session ID, PDU session NAS-PDU, network slice information, S-NSSAI, PDU session resource setup/modify unsuccessful transfer (e.g., a message from the first base station to the SMF), etc.) for one or more PDU sessions (e.g., comprising the first session and/or the second session) of the wireless device, and/or the like.

In an example, the first base station may accept the first session and the second session. In an example, the first base station may accept the first session and reject the second session. In an example, the first base station may reject the first session and the second session. In an example, based on rejecting the first session (or in response to rejecting the first session), the first base station may reject the second session. In an example, the first base station may send the PDU session configuration request acknowledge to the AMF and/or the SMF via the N2 interface that may be setup between the first base station and the AMF.

In an example, the first base station may communicate (e.g., send/receive) uplink packets and downlink packets via the at least one first bearer of the first session. The first base station may receive uplink packets of the first session via the at least one first bearer from the wireless device and may send the uplink packets via the first session to the UPF. The first base station may receive downlink packets via the first session from the UPF and may send the downlink packets of the first session via the at least one first bearer to the wireless device. Based on the PDU session configuration request and/or the NAS information, the first base station may perform one of: receiving the duplication of the uplink packets of the first session via the at least one second bearer of the second session from the wireless device (and/or sending the duplication of the uplink packets of the first session via the second session to the UPF); or sending the duplication of the downlink packets of the first session via the at least one second bearer of the second session to the wireless device (and/or receiving the duplication of the downlink packets of the first session via the second session from the UPF).

In an example, the SMF may send, to the UPF, a modification request based on the PDU session configuration request acknowledge. The modification request may comprise the first downlink TEID for the first session and/or the second downlink TEID for the second session. The modification request may indicate session configurations based on the setup or failure (e.g., indicated in the PDU session configuration request acknowledge) of each PDU session and/or QoS update of the PDU session.

In an example, the PDU session configuration request and/or the PDU session resource setup/modify request transfer (e.g., the message from the SMF to the first base station) for the one or more PDU sessions of the PDU session configuration request may indicate that the second session needs to be configured via a different base station than a base station via which the first session is configured. In an example, the PDU session configuration request and/or the PDU session resource setup/modify request transfer may indicate that the second session needs to be configured via a secondary base station (e.g., the second base station) of the wireless device. In an example, based on the PDU session configuration request and/or the PDU session resource setup/modify request transfer, the first base station may determine to configure the first session via the first base station and the second session via the second base station. In an example, based on the PDU session configuration request and/or the PDU session resource setup/modify request transfer, the first base station may determine to configure the first session via the second base station and the second session via the first base station. In an example, the first base station may determine to configure the first session and the second session via the same base station (e.g., the first base station or the second base station). In an example, the first base station may determine to configure the first session via the first base station and the second session via the second base station. In an example, the first base station may determine to configure the first session via the second base station and the second session via the first base station.

In an example, the first base station may send, to the second base station, at least one secondary node configuration request message comprising session configuration parameters of the second session and/or the first session) and bearer configuration parameters of the at least one second bearer and/or the at least one first bearer). In an example, based on determining to configure the first session via the first base station and the second session via the second base station, the first base station may send, to the second base station, the at least one secondary node configuration request message comprising the session configuration parameters of the second session and the bearer configuration parameters of the at least one second bearer. In an example, based on determining to configure the second session via the first base station and the first session via the second base station, the first base station may send, to the second base station, the at least one secondary node configuration request message comprising the session configuration parameters of the first session and the bearer configuration parameters of the at least one first bearer. In an example, based on determining to configure the first session and the second session via the second base station, the first base station may send, to the second base station, the at least one secondary node configuration request message comprising the session configuration parameters of the first session and the second session and the bearer configuration parameters of the at least one first bearer and the at least one second bearer.

In an example, one or more information elements of the at least one secondary node configuration request message may be based on the PDU session configuration request and/or the PDU session resource setup/modify request transfer (e.g., the message from the SMF to the first base station) for the one or more PDU sessions of the PDU session configuration request. In an example, the at least one secondary node configuration request message may indicate that the second session is for transmitting the duplication of the one of uplink or downlink packets. The at least one secondary node configuration request message may indicate that the second session is for transmitting the duplication of the one of uplink or downlink packets of the first session. In an example, the at least one secondary node configuration request message may be sent via the direct interface (e.g., the Xn interface and/or the X2 interface) and/or via the indirect interface (e.g., one or more N2 interface, one or more S1 interface, one or more AMF, one or more SMF, etc.). In an example, the at least one secondary node configuration request message may be at least one of: secondary node addition request message, secondary node modification request message, secondary node modification confirm message, and/or the like.

In an example, the at least one secondary node configuration request message may comprise at least one of: Message Type, M-NG-RAN node UE XnAP ID (e.g., identifier of the wireless device), UE Security Capabilities, S-NG-RAN node Security Key, S-NG-RAN node UE AMBR, Selected PLMN, Mobility Restriction List, Index to RAT/Frequency Selection Priority, PDU Session Resources To Be Added/Modified List (e.g., for each PDU session: PDU Session ID, S-NSSAI, network slice information, S-NG-RAN node PDU Session AMBR, PDU Session Resource Setup/Modification Info—SN terminated, PDU Session Resource Setup/Modification Info—MN terminated, etc.), M-NG-RAN node to S-NG-RAN node Container, S-NG-RAN node UE XnAP ID, Expected UE Behavior, Requested Split SRBs, PCell ID, Desired Activity Notification Level, Available DRB IDs, S-NG-RAN node Maximum Integrity Protected Data Rate Uplink, S-NG-RAN node Maximum Integrity Protected Data Rate Downlink, Location Information at S-NODE reporting, MR-DC Resource Coordination Information, Masked IMEISV, NE-DC TDM Pattern, and/or the like. In an example, the PDU session resource setup/modification info—SN terminated and/or the PDU session resource setup/modification info—SN terminated of the at least one secondary node configuration request message may comprise at least one of: UL NG-U UP TNL Information at UPF (e.g., the first uplink TEID for the first session and/or the second uplink TEID for the second session), PDU Session Type (e.g., IP, non-IP, ethernet, IPv4, IPv6, IPv4v6, unstructured, etc.), Network Instance (e.g., for selecting a particular transport network resource), QoS Flows To Be Setup/Modified List (e.g., for each QoS flow: QoS Flow Identifier, QoS Flow Level QoS Parameters, Offered GBR QoS Flow Information, etc.), Data Forwarding and Offloading Info from source NG-RAN node, Security Indication, Security Result, Common Network Instance, radio bearers (RBs) To Be Setup/Modified List (e.g., for each bearers: DRB ID, MN UL PDCP UP TNL Information, RLC Mode, UL Configuration, DRB QoS, PDCP SN Length, secondary MN UL PDCP UP TNL Information, Duplication Activation, QoS Flow Identifier, QoS Flow Level QoS Parameters, etc.), and/or the like.

In an example, the QoS flow level QoS parameters of the QoS Flows To Be Setup/Modified List and/or RBs To Be Setup/Modified List may comprise at least one of: QoS Class Identifier (QCI), 5G QoS Indicator (5QI: dynamic and/or non-dynamic), priority level, allocation and retention priority (ARP: priority level, pre-emption capability, pre-emption vulnerability, etc.), latency requirement (e.g., tolerable packet transmission latency/delay), reliability requirement (e.g., maximum error rate), session aggregate maximum bit rate (AMBR), session type (e.g., PDU session type: IP, non-IP, ethernet, IPv4, IPv6, IPv4v6, unstructured, etc.), QoS flow identifier, QoS level parameters, averaging window, maximum data burst volume, packet delay budget, packet error rate, delay critical indication (e.g., critical or non-critical), maximum flow bit rate downlink, maximum flow bit rate uplink, guaranteed flow bit rate downlink, guaranteed flow bit rate uplink, notification control (e.g., indicating notification requested), maximum packet loss rate downlink, maximum packet loss rate uplink, and/or the like.

In an example, the at least one secondary node configuration request message may comprise at least one of: the first network slice information (e.g., first NSSAI, first S-NSSAI, etc.) of the first network slice for uplink packets of the first session; second network slice information (e.g., second NSSAI, second S-NSSAI, etc.) of the second network slice for downlink packets of the first session; third network slice information (e.g., third NSSAI, third S-NSSAI, etc.) of the third network slice of the first session; fourth network slice information (e.g., first NSSAI, first S-NSSAI, etc.) of the first network slice for uplink packets of the second session (e.g., when duplicating uplink packets of the first session); fifth network slice information (e.g., second NSSAI, second S-NSSAI, etc.) of the second network slice for downlink packets of the second session (e.g., when duplicating downlink packets of the first session); and/or the like.

In an example, based on the at least one secondary node configuration request message, the second base station may configure the second session and/or the at least one second bearer of the second session for the wireless device. In an example, if the first session and the second session are configured to setup at the second base station by the first base station (e.g., via the at least one secondary node configuration request message), the second base station may configure the first session (and/or the at least one first bearer of the first session) and the second session (and/or the at least one second bearer of the second session) at the second base station. Based on the at least one secondary node configuration request message and/or RRC measurement information of the wireless device, the second base station may determine a secondary cell group (SCG) for the wireless device. In an example, if the second session is setup at the second base station (e.g., as indicated via the at least one secondary node configuration request message), the second base station may configure one or more cells of the SCG for the at least one second bearer of the second session of the wireless device. In an example, if the first session is setup at the second base station (e.g., as indicated via the at least one secondary node configuration request message), the second base station may configure one or more cells of the SCG for the at least one first bearer of the first session of the wireless device. In an example, if the first session and the second session are setup at the second base station (e.g., as indicated via the at least one secondary node configuration request message), the second base station may configure at least one first secondary cells of the SCG for the at least one first bearer of the first session and at least one second secondary cells of the SCG for the at least one second bearer of the second session. The second base station may configure resources for the first session (e.g., the at least one first bearer) and/or the second session (e.g., the at least one second bearer) based on QoS parameters (e.g., the QoS flow level QoS parameters of the QoS Flows To Be Setup/ Modified List and/or RBs To Be Setup/Modified List) of the at least one secondary node configuration request message.

In an example, the first base station may receive, from the second base station, at least one secondary node configuration request acknowledge message indicating configuration of the first session (e.g., the at least one first bearer) and/or the second session (e.g., the at least one second bearer) based on the at least one secondary node configuration request message. In an example, the at least one secondary node configuration request acknowledge message may be in response to the at least one secondary node configuration request message. The at least one secondary node configuration request acknowledge message may comprise the first downlink TEID for the first session (e.g., if the first session is configured at the second base station) and/or the second downlink TEID for the second session (e.g., if the second session is configured at the second base station). In an example, the first base station may send, to the AMF (and/or the SMF), the PDU session configuration request acknowledge based on the at least one secondary node configuration request acknowledge message. In an example, the at least one secondary node configuration request acknowledge message may be sent via the direct interface (e.g., the Xn interface and/or the X2 interface) and/or via the indirect interface (e.g., one or more N2 interface, one or more S1 interface, one or more AMF, one or more SMF, etc.). In an example, the at least one secondary node configuration request acknowledge message may be at least one of: secondary node addition request acknowledge message, secondary node modification request acknowledge message, secondary node modification required message, and/or the like.

In an example, the at least one secondary node configuration request acknowledge message may comprise at least one of: Message Type of the at least one secondary node configuration request acknowledge message, M-NG-RAN node UE XnAP ID (e.g., identifier of the wireless device), S-NG-RAN node UE XnAP ID (e.g., identifier of the wireless device), PDU Session Resources Admitted To Be Added List (e.g., for one or more PDU sessions: PDU session ID, PDU Session Resource Setup Response Info—SN terminated, PDU Session Resource Setup Response Info—MN terminated, etc.) for one or more PDU sessions (e.g., comprising the first session and/or the second session) of the wireless device, PDU Session Resources Not Admitted List (e.g., for one or more failed-to-setup PDU sessions: PDU session ID, PDU Session Resources Not Admitted List—SN terminated, PDU Session Resources Not Admitted List—MN terminated, cause for not-admitting, etc.) for one or more PDU sessions (e.g., comprising the first session and/or the second session) of the wireless device, S-NG-RAN node to M-NG-RAN node Container, Admitted Split SRBs, RRC Config Indication, Location Information at S-NODE, MR-DC Resource Coordination Information, and/or the like. In an example, the PDU Session Resource Setup Response Info—SN terminated and/or the PDU Session Resource Setup Response Info—MN terminated may indicate at least one of: DL NG-U UP TNL Information at NG-RAN (e.g., user plane TEID), DRBs To Be Setup/admitted List (e.g., for each allowed DRB: DRB ID, SN UL PDCP UP TNL Information, DRB QoS, PDCP SN Length, RLC Mode, secondary SN UL PDCP UP TNL Information, Duplication Activation, UL Configuration, SN DL SCG UP TNL Information (e.g., downlink TEID), secondary SN DL SCG UP TNL Information (e.g., downlink TEID), LCID, etc.), QoS Flows Mapped To DRB List in the DRBs To Be Setup List (e.g., QoS Flow Identifier, MCG requested GBR QoS Flow Information, QoS Flow Mapping Indication), Data Forwarding Info from target NG-RAN node, QoS Flows Not Admitted List, and/or the like.

In an example, the at least one secondary node configuration request acknowledge message (e.g., the RRC Config Indication) may comprise information of the SCG for the wireless device. The information of the SCG for the wireless device may comprise configuration parameters for at least one of: the one or more cells of the SCG for the at least one second bearer of the second session and/or for the at least one first bearer of the first session; the at least one first secondary cells of the SCG for the at least one first bearer of the first session; the at least one second secondary cells of the SCG for the at least one second bearer of the second session; and/or the like.

In an example, if the at least one secondary node configuration request message indicates that the second base station configures both the first session and the second session, the second base station may at least one of: accept the first session and the second session; accept the first session and reject the second session; and/or reject the first session and the second session. In an example, if the at least one secondary node configuration request message indicates that the second base station configures both the first session and the second session, based on rejecting the first session (or in response to rejecting the first session), the second base station may reject the second session.

In an example, if the first session is configured at the second base station, the second base station may communicate (e.g., send/receive) uplink packets and downlink packets via the at least one first bearer of the first session. If the first session is configured at the second base station, the second base station may receive uplink packets of the first session via the at least one first bearer from the wireless device and may send the uplink packets via the first session to the UPF. If the first session is configured at the second base station, the first base station may receive downlink packets via the first session from the UPF and may send the downlink packets of the first session via the at least one first bearer to the wireless device.

Based on the at least one secondary node configuration request message, the second base station may perform one of: receiving the duplication of the uplink packets of the first session via the at least one second bearer of the second session from the wireless device (and/or sending the duplication of the uplink packets of the first session via the second session to the UPF); or sending the duplication of the downlink packets of the first session via the at least one second bearer of the second session to the wireless device (and/or receiving the duplication of the downlink packets of the first session via the second session from the UPF).

In an example, the first base station may comprise a base station central unit (e.g., gNB-CU) and at least one base station distributed unit (e.g., gNB-DU). The base station central unit may configure the first session (e.g., the at least one first QoS flow, the at least one first bearer) on a first base station distributed unit and the second session (e.g., the at least one second QoS flow, the at least one second bearer) on a second base station distributed unit. The base station central unit may comprise upper sublayer functions (e.g., RRC layer, SDAP layer, PDCP layer; or SDAP layer, PDCP layer, RLC layer, MAC layer, and/or partial PHY layer; etc.). The at least one base station distributed unit (e.g., the first base station distributed unit and/or the second base station distributed unit) may comprise lower sublayer functions (e.g., RLC layer, MAC layer, PHY layer; or partial PHY layer; etc.).

In an example, the first base station (e.g., and/or the second base station) may send at least one radio resource (RRC) configuration message. In an example, the wireless device may receive, from the first base station (e.g., and/or the second base station), the at least one RRC configuration message. The at least one RRC configuration message may be based on the PDU session configuration request that the SMF sends to the first base station. The at least one RRC configuration may be based on at least one of: the PDU session configuration request, the at least one secondary node configuration request message, the at least one secondary node configuration request acknowledge message, and/or the PDU session configuration request acknowledge. In an example, the at least one RRC configuration message may be at least one of: RRC reconfiguration message, RRC reestablishment message, RRC resume message, RRC setup message, downlink information transfer message, and/or the like.

The at least one RRC configuration message may comprise configuration parameters of the at least one first bearer of the first session and/or the at least one second bearer of the second session. The configuration parameters of the at least one first bearer and/or the at least one second bearer may indicate that the at least one second bearer is for transmitting the duplication of the one of uplink or downlink packets of the at least one first bearer. The at least one RRC configuration message may indicate separate SDAP entities (e.g., a first SDAP entity for the first session and a second SDAP entity for the second session) for the first session and the second session. The at least one RRC configuration message may indicate separate PDCP entities (e.g., a first PDCP entity for the first session and/or the at least one first bearer; and a second PDCP entity for the second session and/or the at least one second bearer) for the first session (e.g., the at least one first bearer) and the second session (e.g., the at least one second bearer). The configuration parameters of the at least one RRC configuration message may comprise SDAP configuration parameters (e.g., of the first SDAP entity), PDCP configuration parameters (e.g., of the first PDCP entity), RLC configuration parameters, MAC configuration parameters, and/or PHY configuration parameters for the first session, at least one first QoS flow of the first session, and/or the at least one first bearer. The configuration parameters of the at least one RRC configuration message may comprise SDAP configuration parameters (e.g., of the second SDAP entity), PDCP configuration parameters (e.g., of the second PDCP entity), RLC configuration parameters, MAC configuration parameters, and/or PHY configuration parameters for the second session, at least one second QoS flow of the first session, and/or the at least one second bearer.

In an example, the at least one RRC configuration message may comprise at least one of: at least one first bearer identifier of the at least one first bearer; at least one second bearer identifier of the at least one second bearer; at least one first QoS flow identifier of the at least one first QoS flow; at least one second QoS flow identifier of the at least one second QoS flow; a first session identifier of the first session; a second session identifier of the second session; and/or the like. In an example, the first session identifier may be identical to the second session identifier. In an example, the at least one first QoS flow identifier may be identical to the at least one second QoS flow identifier. In an example, the at least one first bearer identifier may be identical to the at least one second bearer identifier.

In an example, the at least one RRC configuration message may comprise non-access stratum (NAS) information (e.g., DedicatedNAS-Message). The NAS information may indicate that the second session (e.g., the at least one second QoS flow) is for transmitting the duplication of the one of uplink or downlink packets of the first session (e.g., the at least one first QoS flow). The NAS information may comprise session configuration parameters of the first session and/or the second session. In an example, The NAS information may indicate establishment and/or modification of the first session and the second session. In an example, the NAS information may comprise at least one of: PDU Session ID (e.g., identifiers of the first session and/or the second session), N1 SM container (e.g., PDU Session Establishment Accept, PDU Session Modification Command/Acknowledgement, etc.), and/or the like.

In an example, the at least one RRC configuration message (e.g., the configuration parameters of the at least one first bearer and/or the at least one second bearer; the NAS information; etc.) may comprise network slice information of the first session (e.g., the at least one first QoS flow, the at least one first bearer) and/or the second session (e.g., the at least one second QoS flow, the at least one second bearer). The network slice information of the first session and/or the second session may comprise the first network slice information (e.g., uplink network slice: first NSSAI, first S-NSSAI, etc.) of the first network slice for uplink packets of the first session; the second network slice information (e.g., downlink network slice: second NSSAI, second S-NSSAI, etc.) of the second network slice for downlink packets of the first session; the third network slice information (e.g., third NSSAI, third S-NSSAI, etc.) of the third network slice of the sec-first session; the fourth network slice information (e.g., first NSSAI, first S-NSSAI, etc.) of the first network slice for uplink packets of the second session (e.g., when duplicating uplink packets of the first session); the fifth network slice information (e.g., second NSSAI, second S-NSSAI, etc.) of the second network slice for downlink packets of the second session (e.g., when duplicating downlink packets of the first session); and/or the like. In an example, the first network slice information may be same to the fourth network slice information. In an example, the second network slice information may be same to the fifth network slice information.

In an example, the at least one RRC configuration message may indicate that the at least one first bearer may be configured to use one or more first cells; and/or that the at least one second bearer may be configured to use one or more second cells. The at least one RRC configuration message may comprise cell configuration parameters of the one or more first cells and/or the one or more second cells. The cell configuration parameters may comprise at least one of: power control parameters, activation/deactivation timer, PDCCH/PDSCH/PUCCH/PUSCH configuration parameters, control resource set configuration parameters, cell group configuration, cell identifier (e.g., PCI, CGI, GCI, etc.), cross carrier scheduling parameters, BWP configuration parameters, synchronization signal configuration, reference signal (e.g., CSI-RS, DM-RS, etc.) parameters, beam configuration parameters (e.g., beam failure recovery, SSB, CSI-RS, etc.), CSI report configuration, SRS configuration, frequency information, bandwidth information, carrier information, and/or the like.

In an example, the first base station may comprise the one or more first cells and the one or more second cells. In an example, the second base station may comprise the one or more first cells (e.g., the at least one first secondary cell of the SCG) and the one or more second cells (e.g., the at least one second secondary cell of the SCG). In an example, the first base station may be a master base station (e.g., MgNB, MeNB, M-node, etc.) of the wireless device and/or may provide a master cell group (MCG) of the wireless device; and/or the second base station may be a secondary base station (e.g., SgNB, SeNB, S-node, etc.) of the wireless device and/or may provide a secondary cell group (SCG) of the wireless device. In an example, the MCG (e.g., the first base station) of the wireless device may comprise the one or more first cells that the at least one first bearer is configured to use; and/or the SCG (e.g., the second base station) of the wireless device may comprise the one or more second cells that the at least one second bearer is configured to use.

In an example, the at least one first bearer may be configured between the first base station and the wireless device and the at least one second bearer may be configured between the second base station and the wireless device. In an example, the at least one first bearer may be configured between the second base station and the wireless device and the at least one second bearer may be configured between the first base station and the wireless device. In an example, the at least one first bearer and the at least one second bearer may be configured between the first base station and the wireless device. In an example, the at least one first bearer and the at least one second bearer may be configured between the second base station and the wireless device.

In an example, the configuration parameters of the at least one RRC configuration message may comprise at least one of: first QoS parameters (e.g., first uplink QoS parameter and/or first downlink QoS parameters) for uplink and/or downlink of the at least one first bearer; and/or second QoS parameters (e.g., second uplink QoS parameter and/or second downlink QoS parameters) for uplink or downlink of the at least one second bearer. The first QoS parameters and/or the second QoS parameters may be based on the first QoS information of the first session and/or the second QoS information of the second session. The first base station may determine information elements of the at least one RRC configuration message and/or the configuration parameters of the at least one RRC configuration message based on the first QoS information of the first session and/or the second QoS information of the second session. The first uplink QoS parameters may be the second uplink QoS parameters. The first downlink QoS parameters may be the second downlink QoS parameters.

In an example, if downlink packets of the first session are for URLLC services, the first base station may configure reliable downlink resources (e.g., SPS resource, resources for transmission repetition, etc.) for the first session and/or the second session, small TTI/numerology for downlink transmission of the first session and/or the second session, large size downlink resources for the first session and/or the second session, low MCS (modulation coding scheme level) for downlink transmission of the first session and/or the second session, PDCP packet duplication of downlink packets of the at least one first bearer of the first session and/or the at least one second bearer of the second session (e.g., not uplink PDCP packet duplication) (e.g., in addition to the duplication of the downlink packets of the first session by configuring the second session), and/or the like.

In an example, if uplink packets of the first session are for URLLC services, the first base station may configure reliable uplink resources (e.g., configured grant resources, resources for transmission repetition, etc.) for the first session and/or the second session, small TTI/numerology for uplink transmission of the first session and/or the second session, large size uplink resources for the first session and/or the second session, low MCS (modulation coding scheme level) for uplink transmission of the first session and/or the second session, PDCP packet duplication of uplink packets of the at least one first bearer of the first session and/or the at least one second bearer of the second session (e.g., not uplink PDCP packet duplication) (e.g., in addition to the duplication of the downlink packets of the first session by configuring the second session), and/or the like.

In an example, the NAS information of the at least one RRC configuration message may indicate the first QoS information of the first session and/or the second QoS information of the second session. The first QoS information may comprise QoS information of uplink packets of the first session and QoS information of downlink packets of the first session. If the second session is for duplication of uplink packets of the first session (e.g., the QoS information of uplink packets of the first session is for URLLC service), the second QoS information may comprise QoS information of uplink packets of the second session (e.g., the QoS information of uplink packets of the second session may or may not same to the QoS information of uplink packets of the first session). If the second session is for duplication of downlink packets of the first session (e.g., the QoS information of downlink packets of the first session is for URLLC service), the second QoS information may comprise QoS information of downlink packets of the second session (e.g., the QoS information of downlink packets of the second session may or may not same to the QoS information of downlink packets of the first session). In an example, QoS information (e.g., the first QoS information, the second QoS information, the QoS information of uplink packets of the first session, the QoS information of downlink packets of the first session, the QoS information of uplink packets of the second session, the QoS information of downlink packets of the second session, QoS information of QoS flow of the first session and/or the second session, etc.) may comprise at least one of: QoS Class Identifier (QCI), 5G QoS Indicator (5QI: dynamic and/or non-dynamic), priority level, allocation and retention priority (ARP: priority level, pre-emption capability, pre-emption vulnerability, etc.), latency requirement (e.g., tolerable packet transmission latency/delay), reliability requirement (e.g., maximum error rate), session aggregate maximum bit rate (AMBR), session type (e.g., PDU session type: IP, non-IP, ethernet, IPv4, IPv6, IPv4v6, unstructured, etc.), QoS flow identifier, QoS flow level QoS parameters, averaging window, maximum data burst volume, packet delay budget, packet error rate, delay critical indication (e.g., critical or non-critical), maximum flow bit rate downlink, maximum flow bit rate uplink, guaranteed flow bit rate downlink, guaranteed flow bit rate uplink, notification control (e.g., indicating notification requested), maximum packet loss rate downlink, maximum packet loss rate uplink, and/or the like.

In an example, the wireless device may transmit, to the first base station (e.g., and/or the second base station), at least one RRC configuration complete message indicating completion of configuration based on the at least one RRC configuration message and/or the configuration parameters of the at least one RRC configuration message. The first base station (e.g., and/or the second base station) may receive, from the wireless device the at least one RRC configuration complete message. In an example, the at least one RRC configuration complete message may be at least one of: RRC reconfiguration complete message, RRC reestablishment complete message, RRC resume complete message, RRC setup complete message, uplink information transfer message, and/or the like.

In an example, the wireless device may communicate/transmit/receive, with/to/from the first base station and/or the second base station via the at least one first bearer of the first session, the uplink packets and the downlink packets of the at least one first bearer and/or the first session (e.g., based on the first QoS parameters of the at least one first bearer and/or the first QoS information of the first session). In an example, the wireless device may communicate/transmit/receive, with/to/from the first base station and/or the second base station via the at least one second bearer of the second session, the duplication of the one of uplink or downlink packets (e.g., uplink packets and not downlink packets; or downlink packets and not uplink packets) of the at least one first bearer (e.g., based on the second QoS parameters of the at least one first bearer and/or the second QoS information of the first session).

In an example, based on the NAS information and/or the at least one RRC configuration message, the wireless device may perform one of: transmitting the duplication of the uplink packets of the first session via the at least one second bearer of the second session (e.g., if the second session is for duplication of uplink packets of the first session); or receiving the duplication of the downlink packets of the first session via the at least one second bearer of the second session (e.g., if the second session is for duplication of downlink packets of the first session). The transmitting, by the wireless device, the duplication of the uplink packets of the first session via the at least one second bearer may comprise transmitting the duplication of the uplink packets of the first session based on the second uplink QoS parameters (e.g., that may be same to the first uplink QoS parameters of the at least one first bearer) of the at least one second bearer and/or the second QoS information (e.g., QoS information for uplink packets) of the second session. The receiving, by the wireless device, the duplication of the downlink packets of the first session via the at least one second bearer may comprise receiving the duplication of the downlink packets of the first session based on the second QoS parameters (e.g., that may be same to the first downlink QoS parameters of the at least one first bearer) of the at least one second bearer and/or the second QoS information (e.g., QoS information for downlink packets) of the second session.

In an example, the uplink packets of the at least one first bearer and/or the first session may be associated with the first network slice. The downlink packets of the at least one first bearer and/or the first session may be associated with the second network slice. A third network slice may comprise the first network slice and the second network slice. The first session may be for the third network slice. If the second session is for transmitting duplication of uplink packets of the first session, a network slice of the second session (e.g., uplink packets of the second session) may be the first network slice. If the second session is for transmitting duplication of downlink packets of the first session, a network slice of the second session (e.g., downlink packets of the second session) may be the second network slice.

In an example, the wireless device may receive, from the first base station, an activation indication of the duplication. The transmitting, by the wireless device, the duplication of the uplink packets of the first session via the at least one second bearer may be in response to receiving the activation indication. In an example, the configuration parameters or the non-access stratum information of the at least one RRC configuration message may comprise the activation indication. In an example, the receiving, by the wireless device, the activation indication may comprise receiving the activation indication via at least one of: an RRC reconfiguration message; a NAS message; one or more user plane packets; a medium access control control element (MAC CE); a downlink control information (DCI) via a physical downlink control channel (PDCCH); and/or the like.

In an example, the wireless device may receive, from the first base station, a deactivation indication of the duplication. The wireless device may stop transmitting the duplication of the uplink packets in response to receiving the deactivation indication. In an example, the receiving, by the wireless device, the deactivation indication may comprise receiving the deactivation indication via at least one of: an RRC reconfiguration message; a NAS message; one or more user plane packets; a MAC CE; a DCI via a PDCCH; and/or the like.

In an example, the UPF may communicate, with the wireless device, the uplink packets and the downlink packets via the first session. The UPF may receive the uplink packets via the first session. The UPF may send the downlink packets via the first session. Based on the session configuration request from the SMF, the UPF may receive the duplication of the uplink packets of the first session via the second session or send the duplication of the downlink packets of the first session via the second session. In an example, the UPF may discard one of the uplink packets of the first session or the duplication of the uplink packets of the first session. The UPF may generate the duplication of the downlink packets of the first session.

In an example, a wireless device may receive, from a first base station, at least one RRC configuration message. The at least one RRC configuration message may comprise at least one of: configuration parameters of at least one first bearer of a first session and at least one second bearer of a second session; and/or NAS information. The NAS information may indicate that the second session is for transmitting a duplication of uplink packets of the first session. The wireless device may communicate the uplink packets and downlink packets of the first session via the at least one first bearer of the first session. Based on the NAS information, the wireless device may transmit the duplication of the uplink packets of the first session via the at least one second bearer of the second session and may not receive duplication of the downlink packets of the first session via the at least one second bearer of the second session.

In an example, a wireless device may receive, from a first base station, at least one RRC configuration message. The at least one RRC configuration message may comprise at least one of: configuration parameters of at least one first bearer of a first session and at least one second bearer of a second session; and/or NAS information. The NAS information may indicate that the second session is for transmitting a duplication of downlink packets of the first session. The wireless device may communicate the downlink packets and uplink packets of the first session via the at least one first bearer of the first session. Based on the NAS information, the wireless device may receive the duplication of the downlink packets of the first session via the at least one second bearer of the second session and may not transmit duplication of the uplink packets of the first session via the at least one second bearer of the second session.

Figure 26:
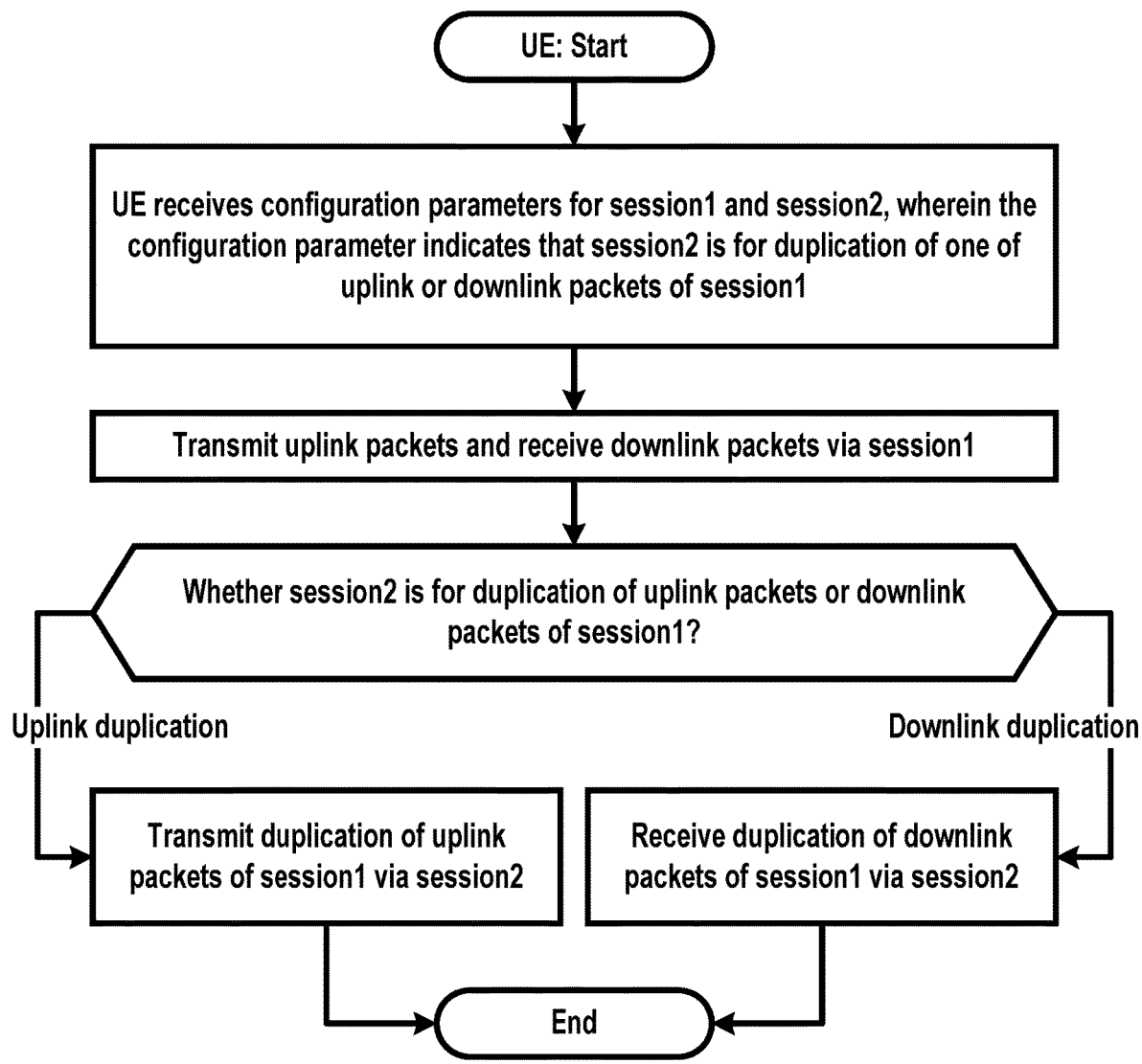
FIG. 26 is a flow diagram of an aspect of an example embodiment of the present disclosure.

In an example, as shown in FIG. 26, a wireless device may receive, from a first base station, at least one radio resource control (RRC) configuration message. The at least one RRC configuration message may comprise configuration parameters of at least one first bearer of a first session and/or at least one second bearer of a second session. The at least one RRC configuration message may comprise non-access stratum (NAS) information. The NAS information may indicate that the second session is for transmitting a duplication of one of uplink or downlink packets of the first session. The wireless device may communicate the uplink packets and the downlink packets via the at least one first bearer of the first session. Based on the NAS information, the wireless device may perform one of: transmitting the duplication of the uplink packets of the first session via the at least one second bearer of the second session; or receiving the duplication of the downlink packets of the first session via the at least one second bearer of the second session.

In an example, the at least one first bearer may be configured to use one or more first cells. The at least one second bearer may be configured to use one or more second cells. The first base station may comprise the one or more first cells and the one or more second cells. In an example, a master cell group (MCG) of the wireless device may comprise the one or more first cells. A secondary cell group (SCG) of the wireless device may comprise the one or more second cells. In an example, at least one first bearer identifier of the at least one first bearer may be identical to at least one second bearer identifier of the at least one second bearer. In an example, the at least one first bearer may be configured between the first base station and the wireless device. The at least one second bearer may be configured between the second base station and the wireless device. The first base station may be a master base station of the wireless device. The second base station may be a secondary base station of the wireless device.

In an example, the first session may be configured between the wireless device and a user plan function (UPF) via the first base station. The second session may be configured between the wireless device and the user plan function via the second base station.

In an example, the wireless device may transmit, to the first base station, at least one RRC configuration complete message indicating completion of configuration based on the at least one RRC configuration message.

In an example, the uplink packets of the at least one first bearer may be associated with a first network slice. The downlink packets of the at least one first bearer may be associated with a second network slice. A third network slice may comprise the first network slice and the second network slice. The first session may be for the third network slice.

In an example, the configuration parameters of the at least one RRC configuration message may comprise at least one of: first quality-of-service (QoS) parameters for uplink of the at least one first bearer and/or second QoS parameters for downlink of the at least one first bearer. The communicating, by the wireless device, the uplink packets and the downlink packets via the at least one first bearer may comprise at least one of: transmitting the uplink packets based on the first QoS parameters; and/or receiving the downlink packets based on the second QoS parameters. In an example, the transmitting, by the wireless device, the duplication of the uplink packets of the first session via the at least one second bearer may comprise transmitting the duplication of the uplink packets based on the first QoS parameters. The receiving, by the wireless device, the duplication of the downlink packets of the first session via the at least one second bearer may comprise receiving the duplication of the downlink packets based on the second QoS parameters. The configuration parameters of the at least one RRC configuration message may comprise at least one of: third QoS parameters for uplink of the at least one second bearer; or fourth QoS parameters for downlink of the at least one second bearer.

The first QoS parameters may be the third QoS parameters. The second QoS parameters may be the fourth QoS parameters.

In an example, the second session may be for transmitting the duplication of the uplink packets of the first session and not for transmitting the duplication of the downlink packets of the first session. In an example, the second session may be for transmitting the duplication of the downlink packets of the first session and not for transmitting the duplication of the uplink packets of the first session. In an example, the second session may be one of: an uplink only session; or a downlink only session. The first session may be for at least one asymmetric service.

In an example, the wireless device may receive, from the first base station, an activation indication of the duplication. The transmitting, by the wireless device, the duplication of the uplink packets of the first session via the at least one second bearer may be in response to receiving the activation indication. In an example, the configuration parameters or the non-access stratum information of the at least one RRC configuration message may comprise the activation indication. In an example, the receiving, by the wireless device, the activation indication may comprise receiving the activation indication via at least one of: an RRC reconfiguration message; a NAS message; one or more user plane packets; a medium access control control element (MAC CE); a downlink control information (DCI) via a physical downlink control channel (PDCCH); and/or the like.

In an example, the wireless device may receive, from the first base station, a deactivation indication of the duplication. The wireless device may stop transmitting the duplication of the uplink packets in response to receiving the deactivation indication. In an example, the receiving, by the wireless device, the deactivation indication may comprise receiving the deactivation indication via at least one of: an RRC reconfiguration message; a NAS message; one or more user plane packets; a MAC CE; a DCI via a PDCCH; and/or the like.

In an example, the first base station may receive, from a session management function (SMF) via an access and mobility management function (AMF), a packet data unit (PDU) session configuration request. The PDU session configuration request may indicate that the second session is for transmitting the duplication of one of uplink or downlink packets of the first session. The at least one RRC configuration message may be based on the PDU session configuration request. The first base station may send, to the SMF, a PDU session configuration request acknowledge in response to receiving the PDU session configuration request. The PDU session configuration request acknowledge may comprise at least one of: a first downlink tunnel endpoint identifier (TEID) for the first session; and/or a second downlink tunnel endpoint identifier (TEID) for the second session.

In an example, the first base station may send, to the second base station, at least one secondary node configuration request message comprising session configuration parameters of the second session and bearer configuration parameters of the at least one second bearer. The first base station may receive, from the second base station, at least one secondary node configuration request acknowledge message indicating configuration based on the at least one secondary node configuration request message. The at least one secondary node configuration request acknowledge message may comprise a second downlink tunnel endpoint identifier (TEID) for the second session.

In an example, the SMF may receive, from a first network function, QoS requirement information of a service associated with the first session. The QoS requirement information of the service may indicate that the one of the uplink or downlink packets of the first session need at least one of: an ultra-reliable transmission; and/or a low-latency transmission. The SMF may determine, based on the QoS requirement information, the duplication of one of uplink or downlink packets of the first session. In an example, the first network function may comprise at least one of: an application function; a network repository function (NRF); a policy control function (PCF); an operation and management (OAM) function; and/or the like.

In an example, the SMF may send, to the UPF, a session configuration request indicating that the second session is for transmitting the duplication of one of uplink or downlink packets of the first session. The SMF may receive, from the UPF, a session configuration request acknowledge indicating configuration of the first session and the second session. The session configuration request acknowledge may comprise at least one of: a first uplink tunnel endpoint identifier (UL TEID) for the first session; and/or a second uplink tunnel endpoint identifier (UL TEID) for the second session.

In an example, the UPF may receive the uplink packets via the first session. The UPF may send the downlink packets via the first session. Based on the session configuration request, the UPF may receive the duplication of the uplink packets of the first session via the second session or send the duplication of the downlink packets of the first session via the second session. In an example, the UPF may discard one of the uplink packets or the duplication of the uplink packets of the first session. The UPF may generate the duplication of the downlink packets of the first session.

In an example, the first base station may receive the NAS information from the SMF via the AMF. In an example, the SMF may receive, from the wireless device, session establishment request for the first session. The session establishment request may indicate that the one of the uplink or downlink packets of the first session need at least one of: an ultra-reliable transmission; and/or a low latency transmission. The SMF may determine, based on the session establishment request, the duplication of one of uplink or downlink packets of the first session.

In an example, a wireless device may receive, from a first base station, at least one RRC configuration message. The at least one RRC configuration message may comprise at least one of: configuration parameters of at least one first bearer of a first session and at least one second bearer of a second session; and/or NAS information. The NAS information may indicate that the second session is for transmitting a duplication of uplink packets of the first session. The wireless device may communicate the uplink packets and downlink packets of the first session via the at least one first bearer of the first session. Based on the NAS information, the wireless device may transmit the duplication of the uplink packets of the first session via the at least one second bearer of the second session and may not receive duplication of the downlink packets of the first session via the at least one second bearer of the second session.

In an example, a wireless device may receive, from a first base station, at least one RRC configuration message. The at least one RRC configuration message may comprise at least one of: configuration parameters of at least one first bearer of a first session and at least one second bearer of a second session; and/or NAS information. The NAS information may indicate that the second session is for transmitting a duplication of downlink packets of the first session. The wireless device may communicate the downlink packets and uplink packets of the first session via the at least one first bearer of the first session. Based on the NAS information, the wireless device may receive the duplication of the downlink packets of the first session via the at least one second bearer of the second session and may not transmit duplication of the uplink packets of the first session via the at least one second bearer of the second session.

Figure 27:
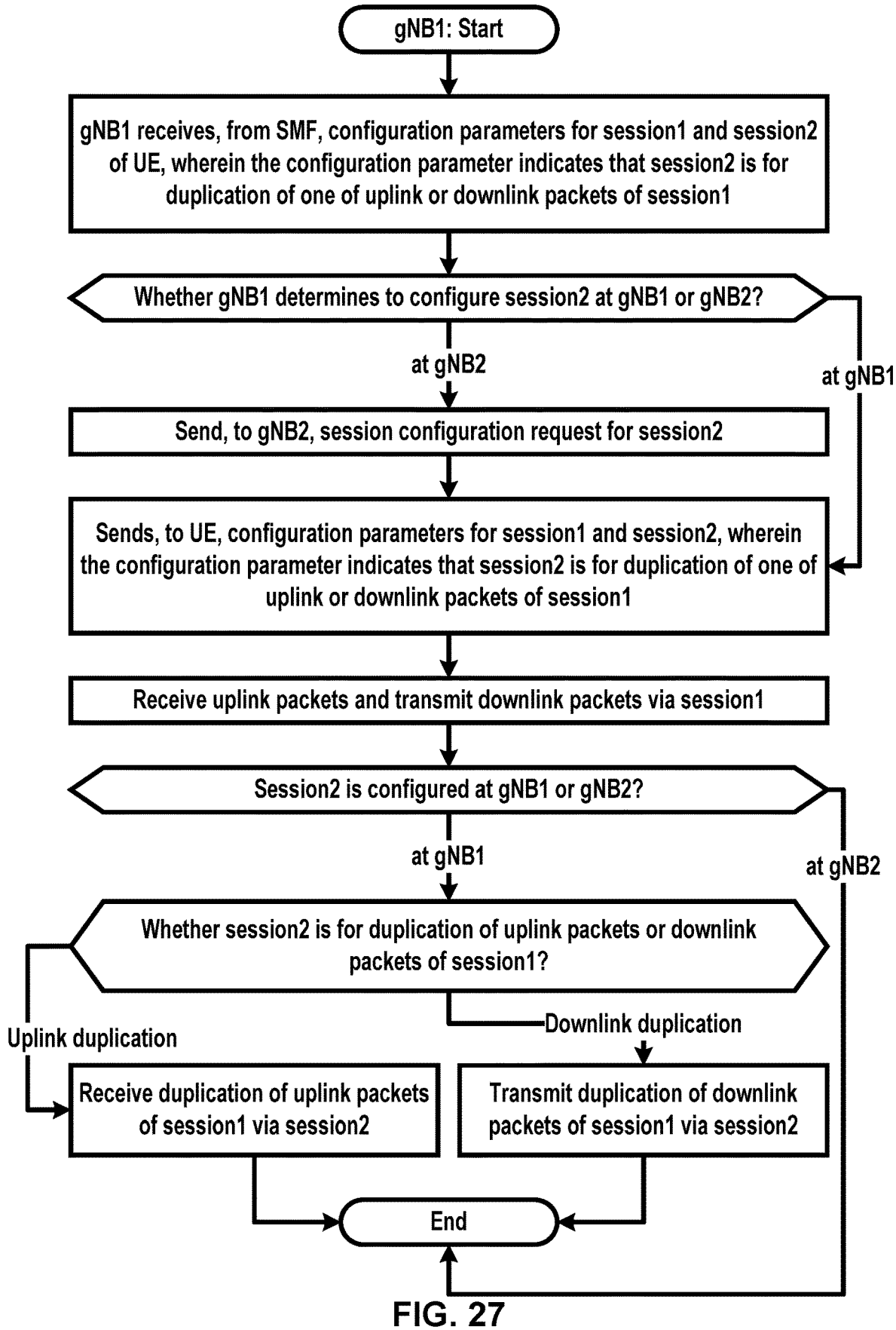
FIG. 27 is a flow diagram of an aspect of an example embodiment of the present disclosure.

In an example, as shown in FIG. 27, a first base station may receive, from an SMF via an AMF, a PDU session configuration request for configuration of a first session and a second session of a wireless device. The PDU session configuration request may indicate that the second session is for transmitting a duplication of one of uplink or downlink packets of the first session. The first base station may send, to the wireless device, at least one RRC configuration message. The at least one RRC configuration message may comprise at least one of: configuration parameters of at least one first bearer of the first session and at least one second bearer of the second session; and/or NAS information. The NAS information may indicate that the second session is for transmitting the duplication of the one of the uplink or downlink packets of the first session. The first base station may communicate the uplink packets and the downlink packets via the at least one first bearer of the first session. Based on the NAS information, the first base station may perform one of: receiving the duplication of the uplink packets of the first session via the at least one second bearer of the second session; or sending the duplication of the downlink packets of the first session via the at least one second bearer of the second session.

Figure 28:
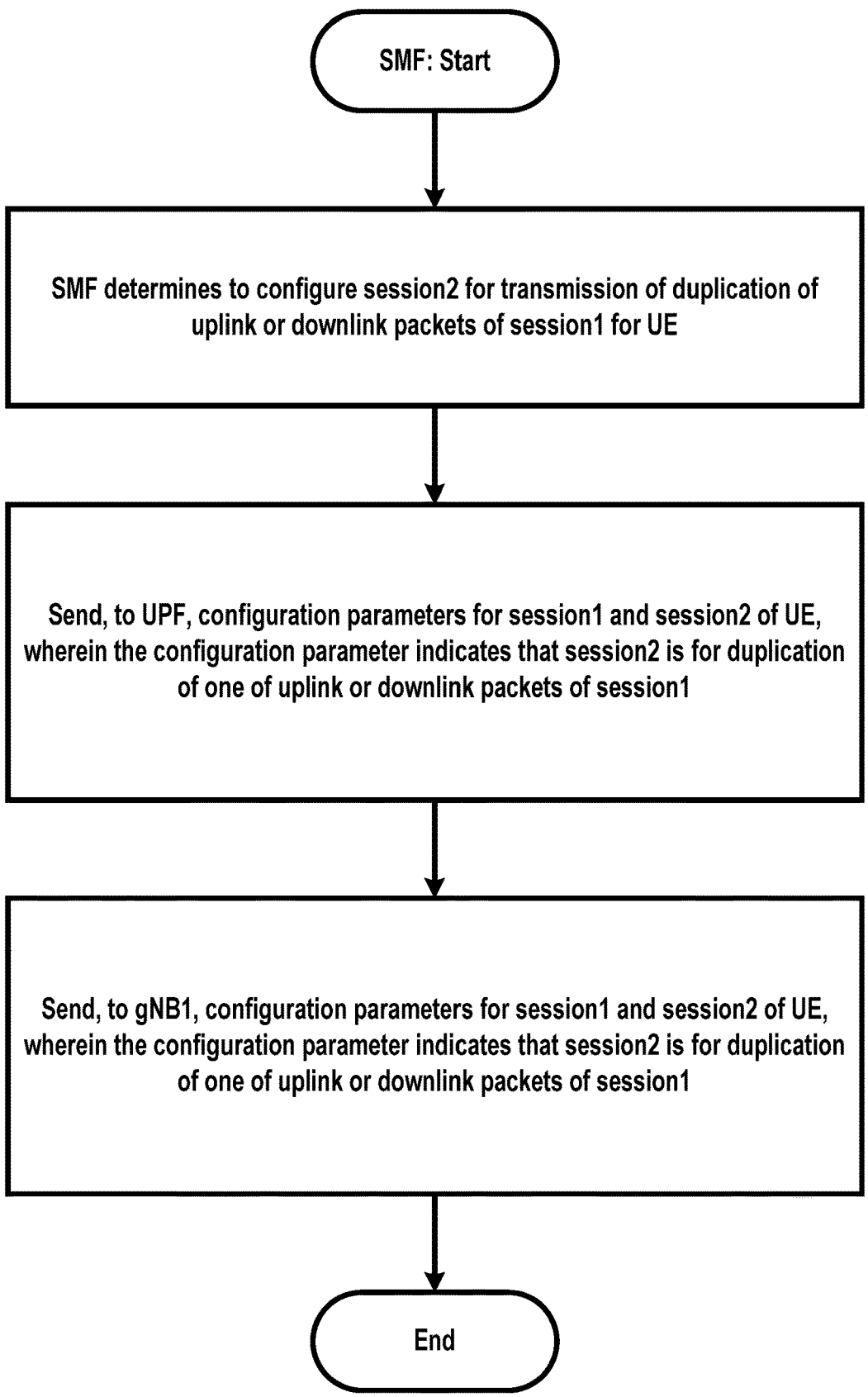
FIG. 28 is a flow diagram of an aspect of an example embodiment of the present disclosure.

In an example, as shown in FIG. 28, an SMF may receive, from a first network function, QoS requirement information of a service. The service may be associated with a first session of a wireless device. The QoS requirement information may indicate that one of uplink or downlink packets of the first session need at least one of: an ultra-reliable transmission and/or a low-latency transmission. The SMF may determine, based on the QoS requirement information, a duplication of the one of the uplink or downlink packets of the first session. The SMF may send, to a first base station via an AMF function, a PDU session configuration request for configuration of the first session and a second session of the wireless device. The PDU session configuration request may indicate that the second session is for transmitting the duplication of the one of the uplink or downlink packets of the first session.

Figure 29:
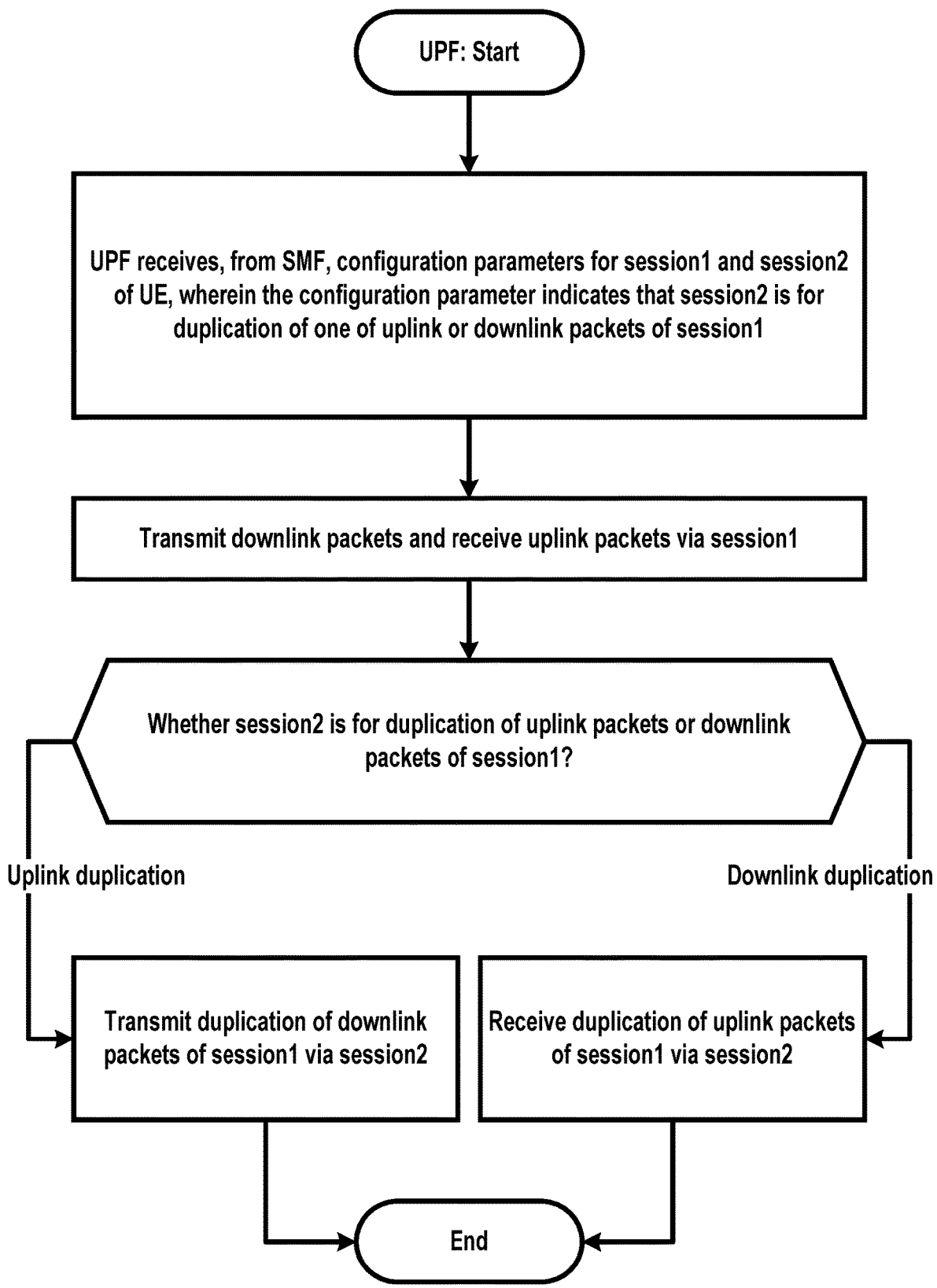
FIG. 29 is a flow diagram of an aspect of an example embodiment of the present disclosure.

In an example, as shown in FIG. 29, a UPF may receive, from an SMF, a session configuration request for configuration of a first session and a second session of a wireless device. The session configuration request may indicate that the second session is for transmitting a duplication of one of uplink or downlink packets of the first session. The UPF may communicate, with the wireless device, the uplink packets and the downlink packets via the first session. Based on the session configuration request, the UPF may perform one of: receiving, from the wireless device, the duplication of the uplink packets of the first session via the second session; or sending, to the wireless device, the duplication of the downlink packets of the first session via the second session. The UPF may send, to the SMF, a session configuration request acknowledge indicating configuration of the first session and the second session. The session configuration request acknowledge may comprise at least one of: a first uplink tunnel endpoint identifier (UL TEID) for the first session; and/or a second uplink tunnel endpoint identifier (UL TEID) for the second session.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 30:
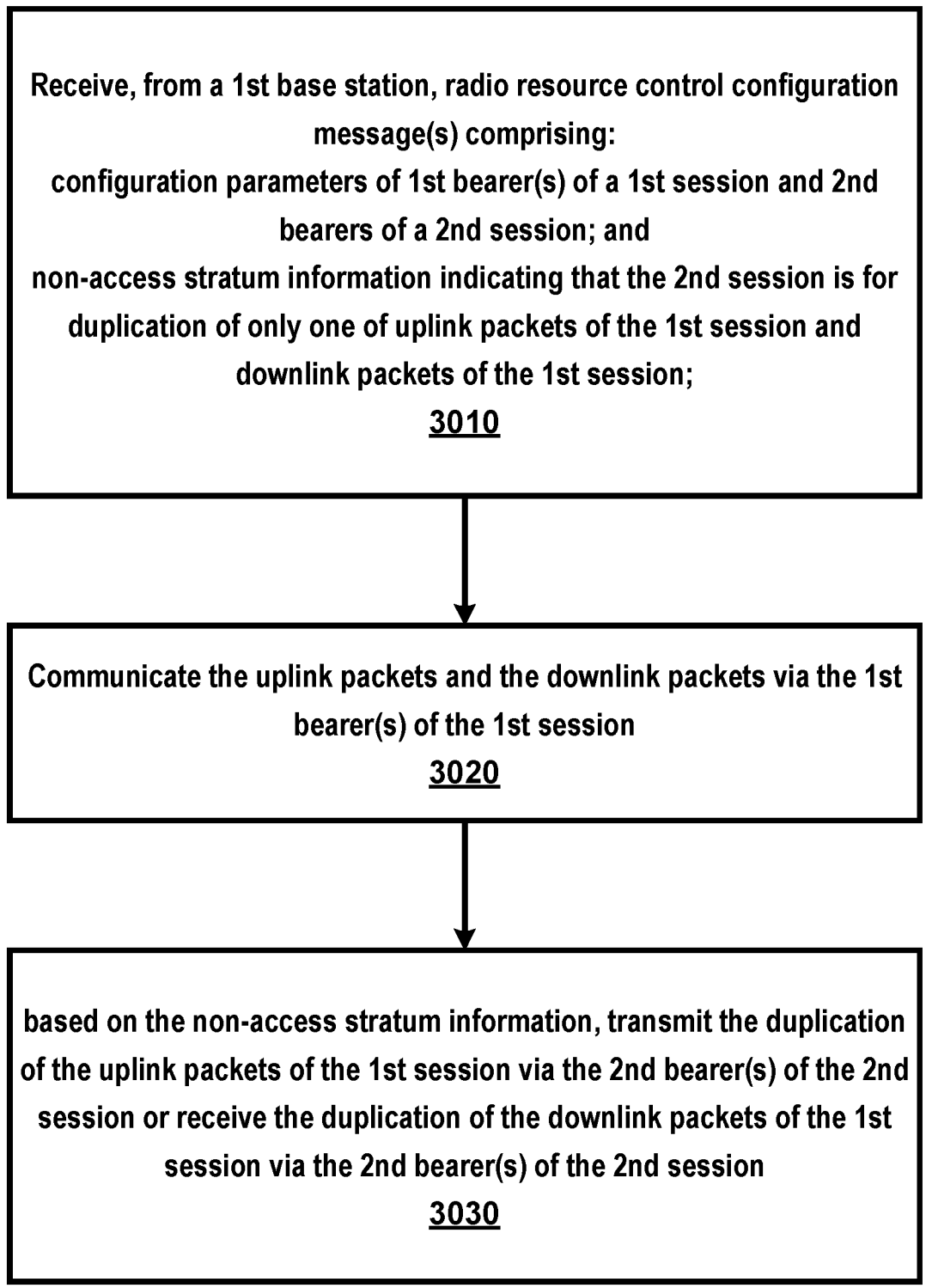
FIG. 30 is a flow diagram of an aspect of an example embodiment of the present disclosure.

FIG. 30 is a diagram of an aspect of an example embodiment of the present disclosure. At 3010, a wireless device may receive, from a first base station, at least one radio resource control configuration message. The at least one radio resource control configuration message may comprise configuration parameters. The at least one radio resource control configuration message may comprise non-access stratum information. The configuration parameters may be for at least one first bearer of a first session. The configuration parameters may be for at least one second bearer of a second session. The non-access stratum information may indicate that the second session is for applying session duplication of downlink packets of the first session. The non-access stratum information may indicate that the second session is for not applying session duplication of uplink packets of the first session. At 3020, the wireless device may communicate the uplink packets and the downlink packets via the at least one first bearer of the first session. At 3030, based on the non-access stratum information, the wireless device may not apply the session duplication for transmission of packets via the at least one second bearer of the second session. Based on the non-access stratum information, the wireless device may receive, via the at least one second bearer of the second session, duplication of the downlink packets of the first session with the session duplication.

According to an example embodiment, the at least one first bearer may be configured to use one or more first cells. According to an example embodiment, at least one second bearer may be configured to use one or more second cells. According to an example embodiment, the at least one first bearer may be configured between the first base station and the wireless device. According to an example embodiment, at least one second bearer may be configured between a second base station and the wireless device.

According to an example embodiment, the first session may be configured between the wireless device and a user plan function via the first base station. According to an example embodiment, the second session may be configured between the wireless device and the user plan function via the second base station. According to an example embodiment, uplink packets of the at least one first bearer may be for a first network slice. According to an example embodiment, downlink packets of the at least one first bearer may be for a second network slice. According to an example embodiment, a third network slice may comprise the first network slice and/or the second network slice.

According to an example embodiment, the configuration parameters may comprise first quality-of-service parameters for uplink of the at least one first bearer. According to an example embodiment, the configuration parameters may comprise second quality-of-service parameters for downlink of the at least one first bearer. According to an example embodiment, the communicating of the uplink packets and the downlink packets may comprise transmitting the uplink packets based on the first quality-of-service parameters. According to an example embodiment, the communicating of the uplink packets and the downlink packets may comprise receiving the downlink packets based on the second quality-of-service parameters.

According to an example embodiment, the wireless device may receive, from the first base station, an activation indication of the duplication. According to an example embodiment, the receiving of the duplication of the downlink packets may be in response to receiving the activation indication. According to an example embodiment, the wireless device may receive, from the first base station, a deactivation indication of the duplication. According to an example embodiment, the wireless device may stop, in response to receiving the deactivation indication, the receiving of the duplication of the downlink packets.

What is claimed is:

1. A method comprising:
   receiving, by a wireless device from a first base station, at least one radio resource control configuration message comprising:
       configuration parameters of:
           at least one first bearer of a first session; and
           at least one second bearer of a second session; and
       non-access stratum information indicating that the second session is for:
           applying session duplication of downlink packets of the first session; and
           not applying session duplication of uplink packets of the first session;
   communicating, by the wireless device, the uplink packets and the downlink packets via the at least one first bearer of the first session; and
   based on the non-access stratum information:
       not applying, by the wireless device, the session duplication for transmission of packets via the at least one second bearer of the second session; and
       receiving, by the wireless device via the at least one second bearer of the second session, duplication of the downlink packets of the first session with the session duplication.

2. The method of claim 1, wherein:
   the at least one first bearer is configured to use one or more first cells; and
   the at least one second bearer is configured to use one or more second cells.

3. The method of claim 1, wherein:
   the at least one first bearer is configured between:
       the first base station; and
       the wireless device; and
   the at least one second bearer is configured between:
       a second base station; and
       the wireless device.

4. The method of claim 3, wherein:
   the first session is configured between the wireless device and a user plan function via the first base station; and
   the second session is configured between the wireless device and the user plan function via the second base station.

5. The method of claim 1, wherein:
   the uplink packets of the at least one first bearer are for a first network slice; and
   the downlink packets of the at least one first bearer are for a second network slice.

6. The method of claim 5, wherein a third network slice comprises:
   the first network slice; and
   the second network slice.

7. The method of claim 1, wherein the configuration parameters comprise at least one of:
   first quality-of-service parameters for uplink of the at least one first bearer; or
   second quality-of-service parameters for downlink of the at least one first bearer.

8. The method of claim 7, wherein the communicating the uplink packets and the downlink packets comprises at least one of:
   transmitting the uplink packets based on the first quality-of-service parameters; and
   receiving the downlink packets based on the second quality-of-service parameters.

9. The method of claim 1, further comprising receiving, by the wireless device from the first base station, an activation indication of the duplication, wherein the receiving of the duplication of the downlink packets is in response to receiving the activation indication.

10. The method of claim 1, further comprising:
    receiving, by the wireless device from the first base station, a deactivation indication of the duplication; and
    stopping, in response to receiving the deactivation indication, the receiving of the duplication of the downlink packets.

11. A wireless device comprising:
    one or more processors; and
    memory storing instructions that, when executed by the one or more processors, cause the wireless device to:
        receive, from a first base station, at least one radio resource control configuration message comprising:
            configuration parameters of:
                at least one first bearer of a first session; and
                at least one second bearer of a second session; and
            non-access stratum information indicating that the second session is for:
                applying session duplication of downlink packets of the first session; and
                not applying session duplication of uplink packets of the first session;
        communicate the uplink packets and the downlink packets via the at least one first bearer of the first session; and
        based on the non-access stratum information:
            not apply the session duplication for transmission of packets via the at least one second bearer of the second session; and
            receive, via the at least one second bearer of the second session, duplication of the downlink packets of the first session with the session duplication.

12. The wireless device of claim 11, wherein:
    the at least one first bearer is configured to use one or more first cells; and
    the at least one second bearer is configured to use one or more second cells.

13. The wireless device of claim 11, wherein:
    the at least one first bearer is configured between:
        the first base station; and
        the wireless device; and
    the at least one second bearer is configured between:
        a second base station; and
        the wireless device.

14. The wireless device of claim 13, wherein:
    the first session is configured between the wireless device and a user plan function via the first base station; and
    the second session is configured between the wireless device and the user plan function via the second base station.

15. The wireless device of claim 11, wherein:
the uplink packets of the at least one first bearer are for a first network slice; and
the downlink packets of the at least one first bearer are for a second network slice.

16. The wireless device of claim 15, wherein a third network slice comprises:
the first network slice; and
the second network slice.

17. The wireless device of claim 11, wherein the configuration parameters comprise at least one of:
first quality-of-service parameters for uplink of the at least one first bearer; or
second quality-of-service parameters for downlink of the at least one first bearer.

18. The wireless device of claim 17, wherein the communicating the uplink packets and the downlink packets comprises at least one of:
transmitting the uplink packets based on the first quality-of-service parameters; and
receiving the downlink packets based on the second quality-of-service parameters.

19. The wireless device of claim 11, wherein the instructions, when executed by the one or more processors, further cause the wireless device to receive, from the first base station, an activation indication of the duplication, wherein the receiving of the duplication of the downlink packets is in response to receiving the activation indication.

20. A system comprising:
a wireless device comprising:
one or more first processors; and
first memory storing first instructions that, when executed by the one or more first processors of the wireless device, cause the wireless device to:
receive, from a first base station, at least one radio resource control configuration message comprising:
configuration parameters of:
at least one first bearer of a first session; and
at least one second bearer of a second session; and
non-access stratum information indicating that the second session is for:
applying session duplication of downlink packets of the first session; and
not applying session duplication of uplink packets of the first session;
communicate the uplink packets and the downlink packets via the at least one first bearer of the first session; and
based on the non-access stratum information:
not apply the session duplication for transmission of packets via the at least one second bearer of the second session; and
receive, via the at least one second bearer of the second session, duplication of the downlink packets of the first session with the session duplication; and
the first base station comprising:
one or more second processors; and
second memory storing second instructions that, when executed by the one or more second processors of the first base station, cause the first base station to:
transmit the at least one radio resource control configuration message to the wireless device;
communicate the uplink packets and the downlink packets via the at least one first bearer of the first session; and
based on the non-access stratum information:
not receive duplication of packets via the at least one second bearer of the second session; and
transmit, via the at least one second bearer of the second session, the duplication of the downlink packets of the first session with the session duplication.

\* \* \* \* \*